(12) United States Patent
Yura et al.

(10) Patent No.: US 9,357,471 B2
(45) Date of Patent: May 31, 2016

(54) NODE APPARATUS AND ALTERNATIVE PATH SEARCH METHOD

(71) Applicant: FUJITSU LIMITED, Kawasaki-shi, Kanagawa (JP)

(72) Inventors: Masakazu Yura, Gifu (JP); Tadashige Iwao, Kawasaki (JP); Shinichi Yamaguchi, Miyaki (JP); Miyuki Moriyama, Amagasaki (JP)

(73) Assignee: FUJITSU LIMITED, Kawasaki (JP)

( * ) Notice: Subject to any disclaimer, the term of this patent is extended or adjusted under 35 U.S.C. 154(b) by 311 days.

(21) Appl. No.: 13/627,105

(22) Filed: Sep. 26, 2012

(65) Prior Publication Data
US 2013/0021945 A1 Jan. 24, 2013

Related U.S. Application Data

(63) Continuation of application No. PCT/JP2010/002398, filed on Mar. 31, 2010.

(51) Int. Cl.
*H04L 12/28* (2006.01)
*H04W 40/02* (2009.01)
*H04L 12/707* (2013.01)
*H04L 12/703* (2013.01)
*H04W 84/18* (2009.01)
*H04W 40/24* (2009.01)

(52) U.S. Cl.
CPC ............. *H04W 40/02* (2013.01); *H04L 45/22* (2013.01); *H04L 45/28* (2013.01); *H04W 40/248* (2013.01); *H04W 84/18* (2013.01)

(58) Field of Classification Search
None
See application file for complete search history.

(56) References Cited

U.S. PATENT DOCUMENTS 6,041,353 A * 3/2000 Hirata .................... H04L 45/00
709/220
6,963,585 B1 * 11/2005 Le Pennec et al. ........... 370/468
(Continued)

FOREIGN PATENT DOCUMENTS

| JP | 3-117140 | 5/1991 |
| JP | 2005-64721 | 3/2005 |
| JP | 2006-135482 | 5/2006 |

OTHER PUBLICATIONS

International Search Report of Corresponding PCT Application PCT/JP2010/002398 mailed Jul. 6, 2010.
(Continued)

*Primary Examiner* — Ian N Moore
*Assistant Examiner* — Phong La
(74) *Attorney, Agent, or Firm* — Staas & Halsey LLP

(57) ABSTRACT

Anode apparatus includes: a receiver configured to receive data from a first node apparatus adjacent to the node apparatus, a transmission source of the data being a second node apparatus; a data generator configured to generate transmission data in which the second node apparatus is specified as a final destination; a transmitter configured to transmit the transmission data to an adjacent node apparatus of the node apparatus other than the first node apparatus; and a decision unit configured to decide that an alternative path for transmitting data via an adjacent node apparatus of the node apparatus other than the first node apparatus does not exist between the node apparatus and the second node apparatus, when the node apparatus receives the transmission data transmitted by the transmitter to all adjacent node apparatuses of the node apparatus other than the first node apparatus.

8 Claims, 37 Drawing Sheets

(56) References Cited

U.S. PATENT DOCUMENTS

| | | | |
|---|---|---|---|
| 6,990,111 B2* | 1/2006 | Lemoff et al. | 370/400 |
| 7,224,788 B1* | 5/2007 | Rhee et al. | 379/207.02 |
| 7,345,991 B1* | 3/2008 | Shabtay et al. | 370/221 |
| 2002/0133756 A1* | 9/2002 | Jain | 714/43 |
| 2004/0103210 A1* | 5/2004 | Fujii | H04L 45/00 709/239 |
| 2006/0159009 A1* | 7/2006 | Kim et al. | 370/216 |
| 2007/0047467 A1* | 3/2007 | Enoki et al. | 370/254 |
| 2007/0195768 A1* | 8/2007 | Kanazawa | H04L 45/00 370/390 |
| 2008/0013534 A1* | 1/2008 | Tsuzuki et al. | 370/389 |
| 2008/0095047 A1* | 4/2008 | Skalecki et al. | 370/225 |
| 2008/0181129 A1* | 7/2008 | Beyers et al. | 370/253 |
| 2008/0186984 A1* | 8/2008 | Nakano | 370/400 |
| 2008/0310340 A1 | 12/2008 | Isoza | |
| 2009/0073988 A1* | 3/2009 | Ghodrat et al. | 370/395.53 |

OTHER PUBLICATIONS

International Preliminary Report on Patent mailed Nov. 1, 2012 issued in corresponding PCT Application No. PCT/JP2010/002398.

Chinese Office Action mailed Oct. 8, 2014 issued in corresponding Chinese application No. 201080066071.1.

* cited by examiner

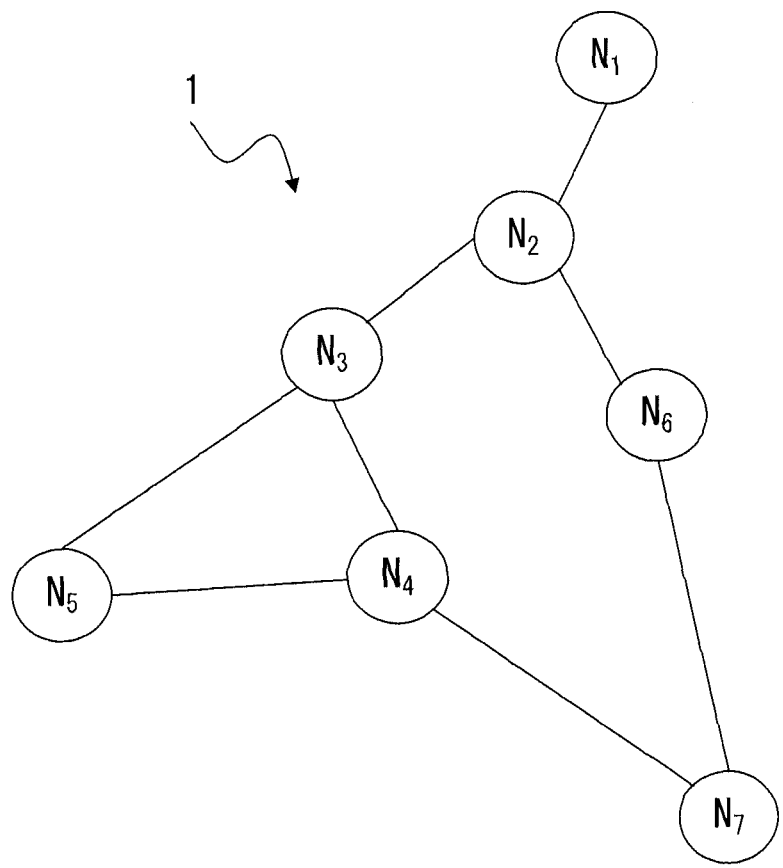
F I G. 1

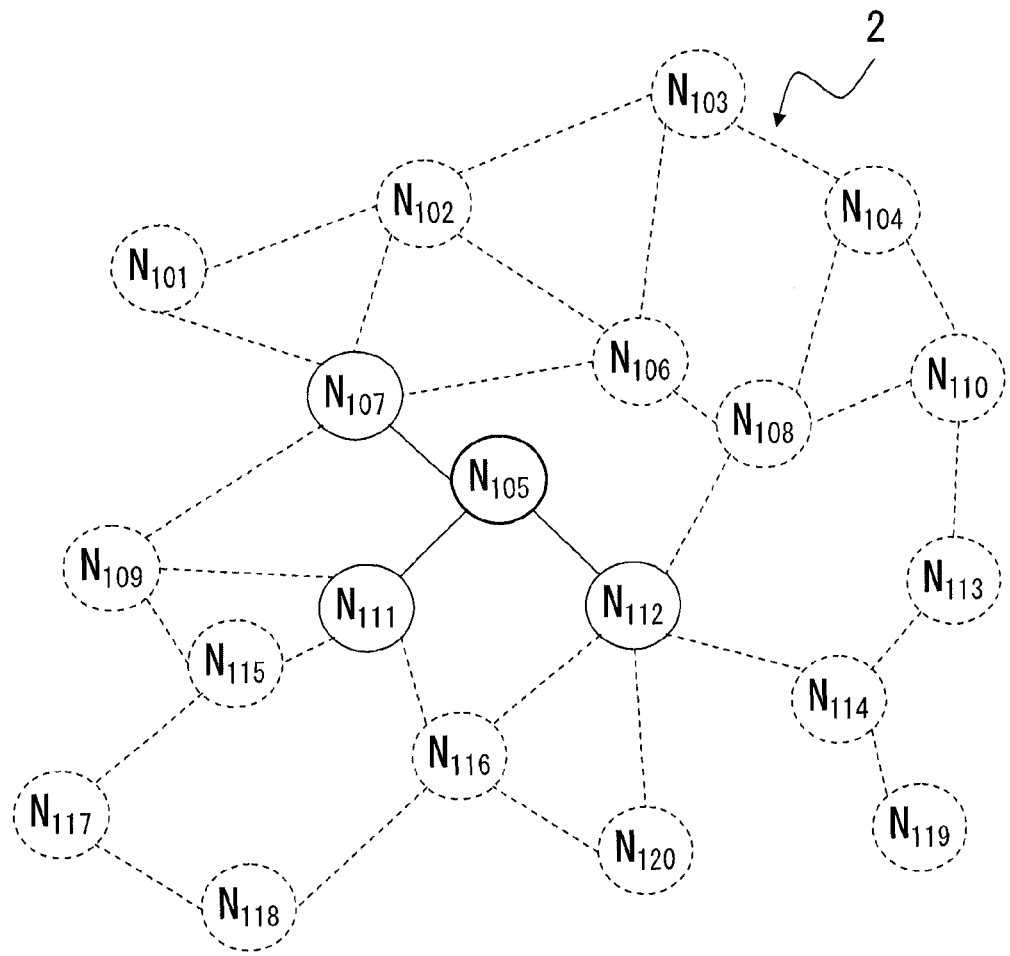
F I G. 2

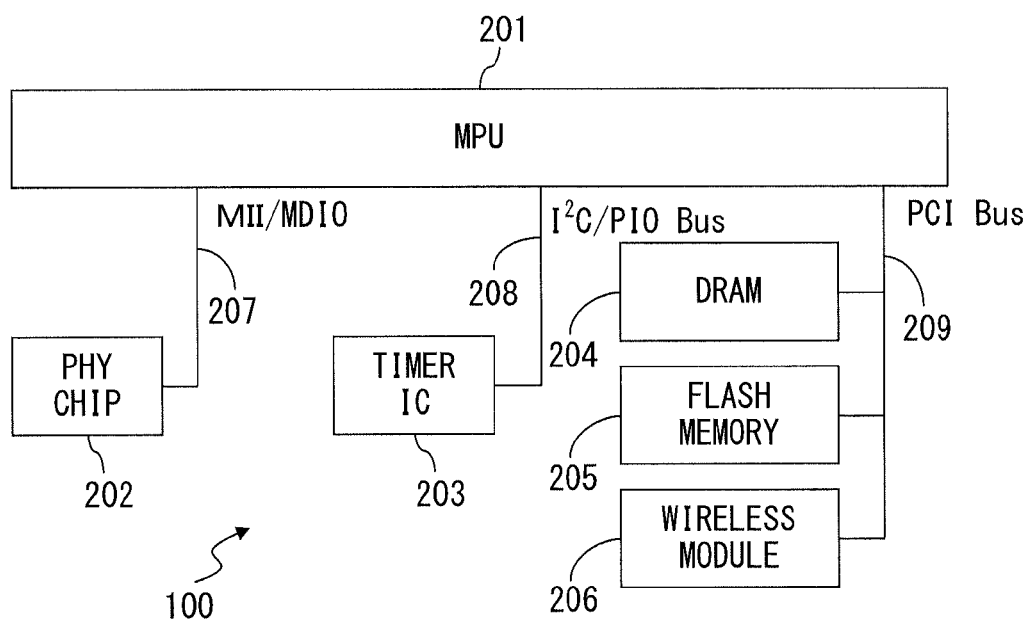
F I G. 4

| TIMEOUT TIME | DATA FRAME | | | | | | | |
|---|---|---|---|---|---|---|---|---|
| | LD | LS | GD | GS | FID | TYPE | LENGTH | PAYLOAD |
| $TI_{3,j}$ | $N_3$ | $N_2$ | $N_7$ | $N_1$ | $F_a$ | D | $P_a$ | ... |
| ⋮ | ⋮ | ⋮ | ⋮ | ⋮ | ⋮ | ⋮ | ⋮ | ⋮ |

| NODE ID | LAST UPDATE TIME |
|---------|------------------|
| $N_1$ | $TA_{2,1}$ |
| $N_3$ | $TA_{2,3}$ |
| $N_6$ | $TA_{2,6}$ |
| NODE ID | LAST UPDATE TIME |
|---------|------------------|
| $N_2$ | $TA_{3,2}$ |
| $N_4$ | $TA_{3,4}$ |
| $N_5$ | $TA_{3,5}$ |
F I G. 9

| GD | LAST UPDATE TIME | LD | WEIGHTING |
|---|---|---|---|
| $N_7$ | $TW_{3,7,2}$ | $N_2$ | $W_{3,7,2}$ |
| | $TW_{3,7,4}$ | $N_4$ | $W_{3,7,4}$ |
| | $TW_{3,7,5}$ | $N_5$ | $W_{3,7,5}$ |
| $N_4$ | $TW_{3,4,2}$ | $N_2$ | $W_{3,4,2}$ |
| | $TW_{3,4,4}$ | $N_4$ | $W_{3,4,4}$ |
| | $TW_{3,4,5}$ | $N_5$ | $W_{3,4,5}$ |
| ⋮ | ⋮ | ⋮ | ⋮ |

FIG. 10

| FID | GS | LD | OLS | LAST UPDATE TIME | 105-$N_1$ |
|---|---|---|---|---|---|
| ⋮ | ⋮ | ⋮ | ⋮ | ⋮ | |
| $F_a$ | $N_1$ | $N_2$ | $N_1$ | $TF_{101}$ | $E_1$ |

-------- S101

| FID | GS | LD | OLS | LAST UPDATE TIME | 105-$N_2$ |
|---|---|---|---|---|---|
| ⋮ | ⋮ | ⋮ | ⋮ | ⋮ | |
| $F_a$ | $N_1$ | $N_3$ | $N_1$ | $TF_{102}$ | $E_2$ |

-------- S102

| FID | GS | LD | OLS | LAST UPDATE TIME | 105-$N_3$ |
|---|---|---|---|---|---|
| ⋮ | ⋮ | ⋮ | ⋮ | ⋮ | |
| $F_a$ | $N_1$ | $N_4$ | $N_2$ | $TF_{103}$ | $E_3$ |

-------- S103

| FID | GS | LD | OLS | LAST UPDATE TIME | 105-$N_4$ |
|---|---|---|---|---|---|
| ⋮ | ⋮ | ⋮ | ⋮ | ⋮ | |
| $F_a$ | $N_1$ | $N_7$ | $N_3$ | $TF_{104}$ | $E_4$ |

-------- S104

| FID | GS | LD | OLS | LAST UPDATE TIME | 105-$N_4$ |
|---|---|---|---|---|---|
| ⋮ | ⋮ | ⋮ | ⋮ | ⋮ | |
| $F_a$ | $N_1$ | $N_5$ | $N_3$ | $TF_{105}$ | $E_4$ |

-------- S105

| FID | GS | LD | OLS | LAST UPDATE TIME | 105-$N_5$ |
|---|---|---|---|---|---|
| ⋮ | ⋮ | ⋮ | ⋮ | ⋮ | |
| $F_a$ | $N_1$ | $N_3$ | $N_4$ | $TF_{106}$ | $E_5$ |

-------- S106

F I G. 1 2

| FID | GS | LD | OLS | LAST UPDATE TIME | 105-$N_3$ |
|---|---|---|---|---|---|
| ⋮ | ⋮ | ⋮ | ⋮ | ⋮ | |
| $F_a$ | $N_1$ | $N_5$ | $N_2$ | $TF_{107}$ | $E_3$ ------- S107 |
| ⋮ | ⋮ | ⋮ | ⋮ | ⋮ | |

| FID | GS | LD | OLS | LAST UPDATE TIME | 105-$N_5$ |
|---|---|---|---|---|---|
| ⋮ | ⋮ | ⋮ | ⋮ | ⋮ | |
| $F_a$ | $N_1$ | $N_4$ | $N_4$ | $TF_{108}$ | $E_5$ ------- S108 |
| ⋮ | ⋮ | ⋮ | ⋮ | ⋮ | |

| FID | GS | LD | OLS | LAST UPDATE TIME | 105-$N_4$ |
|---|---|---|---|---|---|
| ⋮ | ⋮ | ⋮ | ⋮ | ⋮ | |
| $F_a$ | $N_1$ | $N_3$ | $N_3$ | $TF_{109}$ | $E_4$ ------- S109 |
| ⋮ | ⋮ | ⋮ | ⋮ | ⋮ | |

| FID | GS | LD | OLS | LAST UPDATE TIME | 105-$N_3$ |
|---|---|---|---|---|---|
| ⋮ | ⋮ | ⋮ | ⋮ | ⋮ | |
| $F_a$ | $N_1$ | $N_2$ | $N_2$ | $TF_{110}$ | $E_3$ ------- S110 |
| ⋮ | ⋮ | ⋮ | ⋮ | ⋮ | |

| FID | GS | LD | OLS | LAST UPDATE TIME | 105-$N_2$ |
|---|---|---|---|---|---|
| ⋮ | ⋮ | ⋮ | ⋮ | ⋮ | |
| $F_a$ | $N_1$ | $N_6$ | $N_1$ | $TF_{111}$ | $E_2$ ------- S111 |
| ⋮ | ⋮ | ⋮ | ⋮ | ⋮ | |

| FID | GS | LD | OLS | LAST UPDATE TIME | 105-$N_6$ |
|---|---|---|---|---|---|
| ⋮ | ⋮ | ⋮ | ⋮ | ⋮ | |
| $F_a$ | $N_1$ | $N_7$ | $N_2$ | $TF_{112}$ | $E_6$ ------- S112 |

FIG. 13

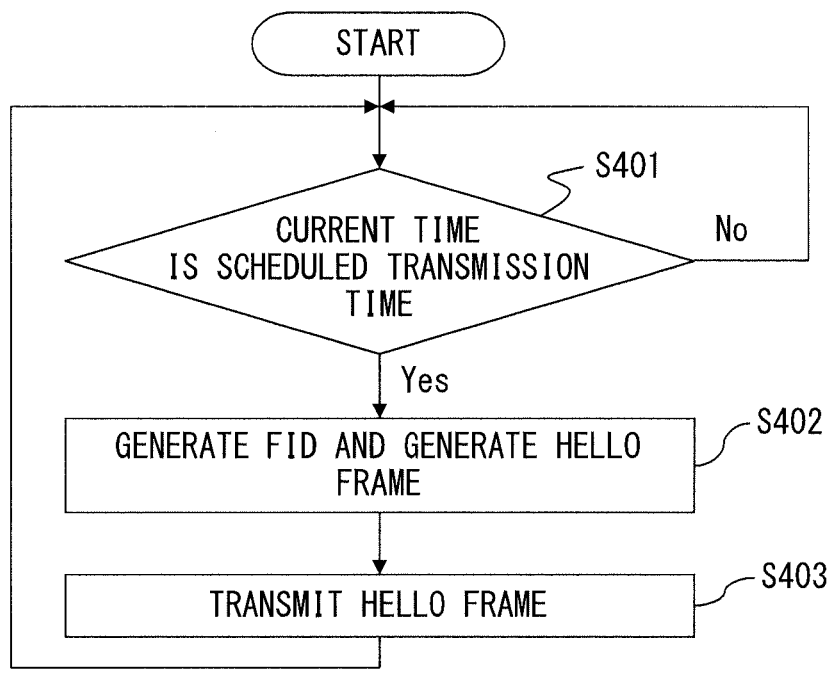
F I G. 1 6

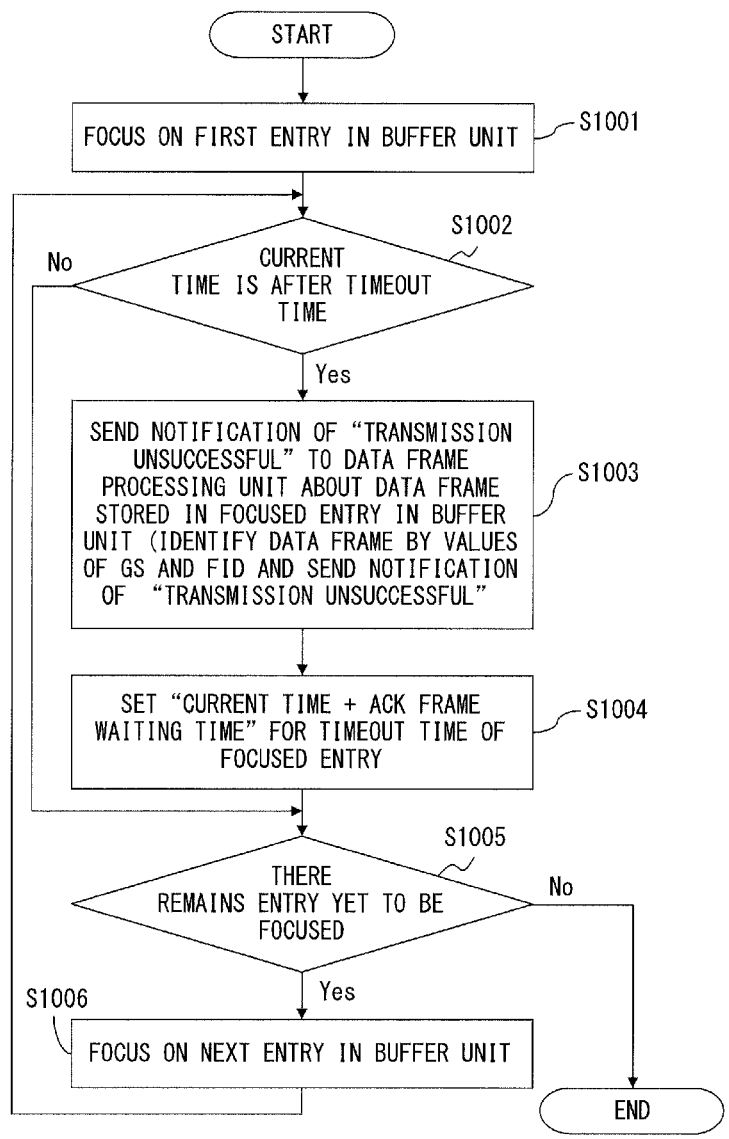
F I G. 2 6

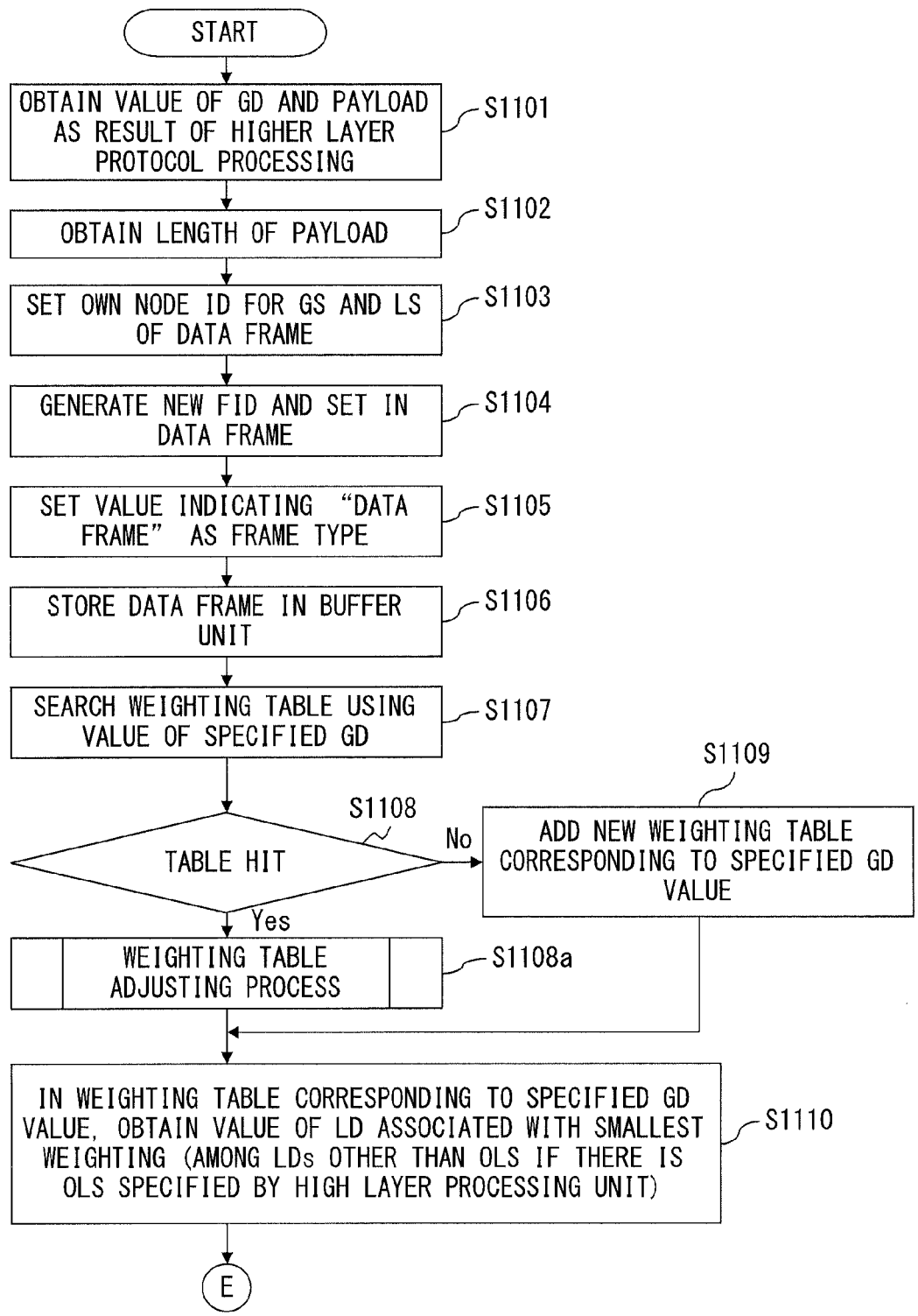
F I G. 27

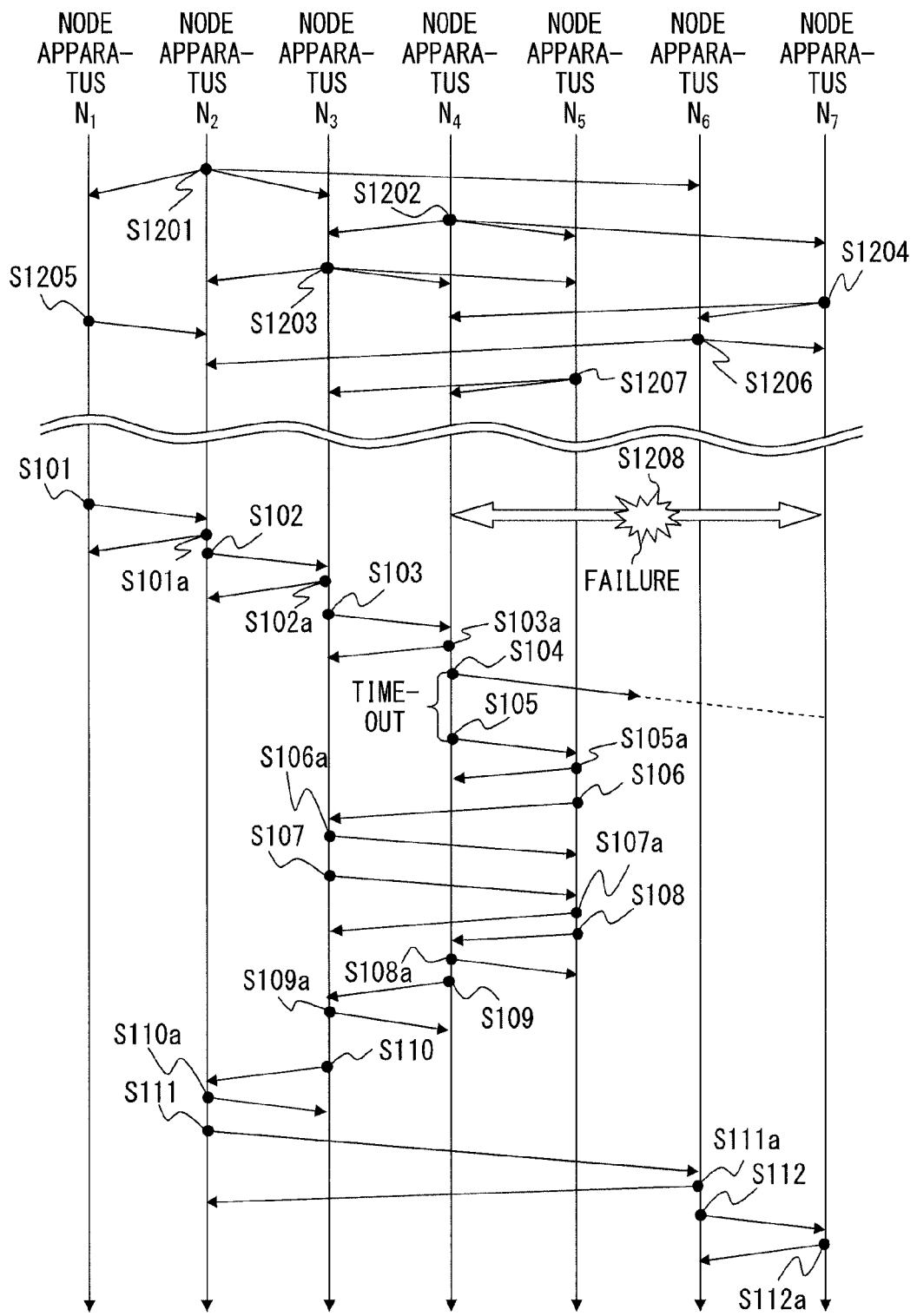
F I G. 30

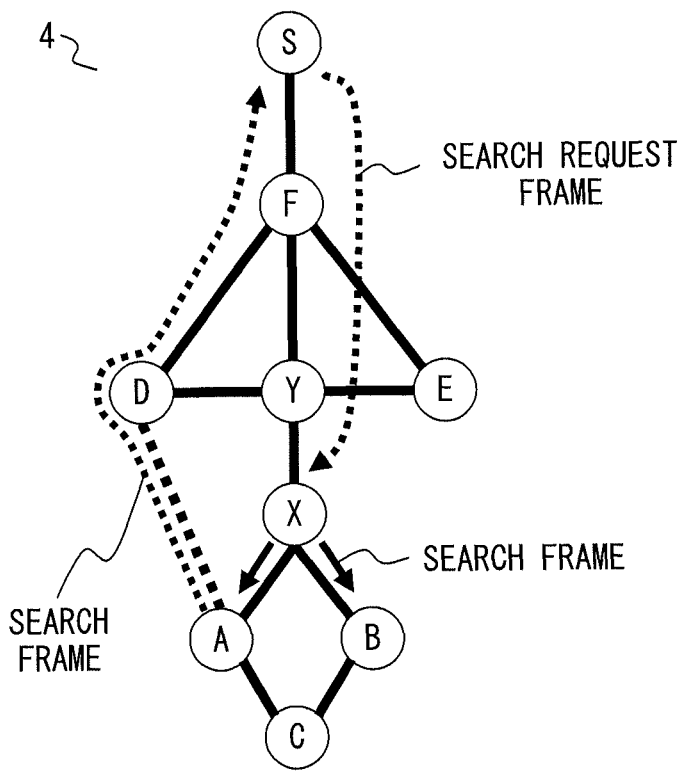
F I G. 3 2

| NODE ID | LAST UPDATE TIME |
|---------|------------------|
| A | $T_A$ |
| B | $T_B$ |
| Y | $T_Y$ |

F I G.  3 5

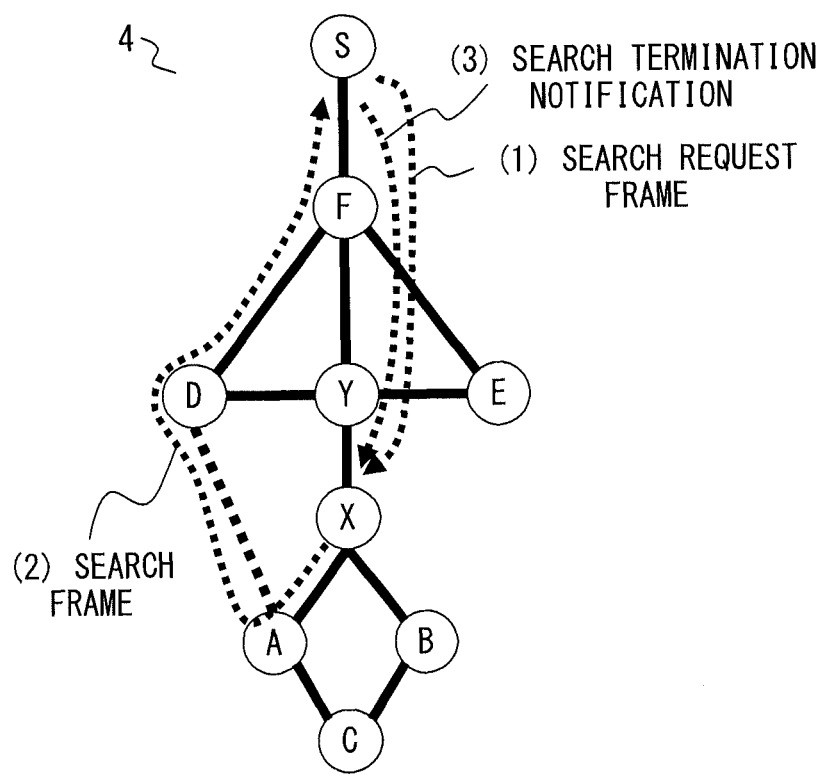
F I G. 3 6

NODE APPARATUS AND ALTERNATIVE PATH SEARCH METHOD

CROSS-REFERENCE TO RELATED APPLICATION

This application is a continuation application of International Application PCT/JP2010/002398 filed on Mar. 31, 2010 and designated the U.S., the entire contents of which are incorporated herein by reference.

FIELD

The embodiments described herein are related to a node apparatus and a method for alternative path search in a network including a plurality of node apparatuses.

BACKGROUND

As a form of networks including a plurality of node apparatuses, the ad-hoc network has been put to practical use. In the ad-hoc network, an autonomous path selection is performed in each node apparatus. That is, each node apparatus in the ad-hoc network has a function to operate as a router or a switch. Here, each node apparatus is able to recognize the surrounding network configuration by sending and receiving a message and the like to and from adjacent node apparatuses. Therefore, by adopting the ad-hoc (especially, wireless ad-hoc) scheme, a desired network may be established just by placing node apparatuses in an environment in which establishment of the network is desired, without providing a network management system that manages the network. Furthermore, in the ad-hoc network, addition or elimination of the node apparatus is easy, and the network configuration can be changed easily. Meanwhile, conventionally a wireless communication system in which the connection may be updated by adding a new node apparatus that is not on the path, without establishing the path again has been proposed (for example, Japanese Laid-open Patent Publication No. 2006-135482).

It is preferable that the network has an alternative path (or a redundant path or a detour path) so that even when a failure occurs, the communication may be continued. Especially in the wireless network, a link may be temporarily disconnected due to the radio wave environment, and it is important to check the presence/absence of an alternative path in advance. For this reason, a technique to recover from the failure by a distributed-type automatic bypass routing upon a link failure in a network including a plurality of node apparatuses has been proposed (for example, Japanese Laid-open Patent Publication No. 3-117140).

However, in the ad-hoc network, it is difficult to recognize the communication path across entire network. Therefore, in the ad-hoc network, it is not easy to recognize whether or not an alternative path exists for each communication path.

SUMMARY

According to an aspect of the embodiments, a node apparatus is used in a network including a plurality of node apparatuses. The node apparatus includes: a receiver configured to receive data from a first node apparatus adjacent to the node apparatus, a transmission source of the data being a second node apparatus; a data generator configured to generate transmission data in which the second node apparatus is specified as a final destination; a transmitter configured to transmit the transmission data to an adjacent node apparatus of the node apparatus other than the first node apparatus; and a decision unit configured to decide that an alternative path for transmitting data via an adjacent node apparatus of the node apparatus other than the first node apparatus does not exist between the node apparatus and the second node apparatus, when the node apparatus receives the transmission data transmitted by the transmitter to all adjacent node apparatuses of the node apparatus other than the first node apparatus, or when transmission to the adjacent node apparatuses fails.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating the first example of the network configuration.

FIG. 2 is a diagram illustrating the second example of the network configuration.

FIG. 4 is a diagram illustrating the hardware configuration of the node apparatus in an embodiment.

FIG. 8 is a diagram illustrating an example of data stored in the buffer unit in FIG. 3.

FIG. 9 is a diagram illustrating an example of the adjacent node managing table in FIG. 3.

FIG. 10 is a diagram illustrating an example of the weighting table in FIG. 3.

FIGS. 12 and 13 are diagrams illustrating an example of the FID managing table in FIG. 3.

FIG. 16 is a flowchart of a HELLO frame transmission process.

FIG. 26 is a flowchart illustrating a process in a case in which the ACK frame is not received by the timeout time.

FIGS. 27 and 28 are flowcharts of a transmission process in a case in which the node apparatus is GS and transmits the data frame.

FIG. 30 is a timing chart illustrating the recognition of an adjacent node by transmission/reception of a HELLO frame and path selection in FIG. 6.

FIG. 32 is a diagram illustrating the outline of a method to search the alternative path.

FIG. 35 is an example of an adjacent node managing table provided in the search execution node apparatus.

FIG. 36 is a diagram illustrating a search procedure in a case when an alternative path exists.

DESCRIPTION OF EMBODIMENTS

Figure 3:
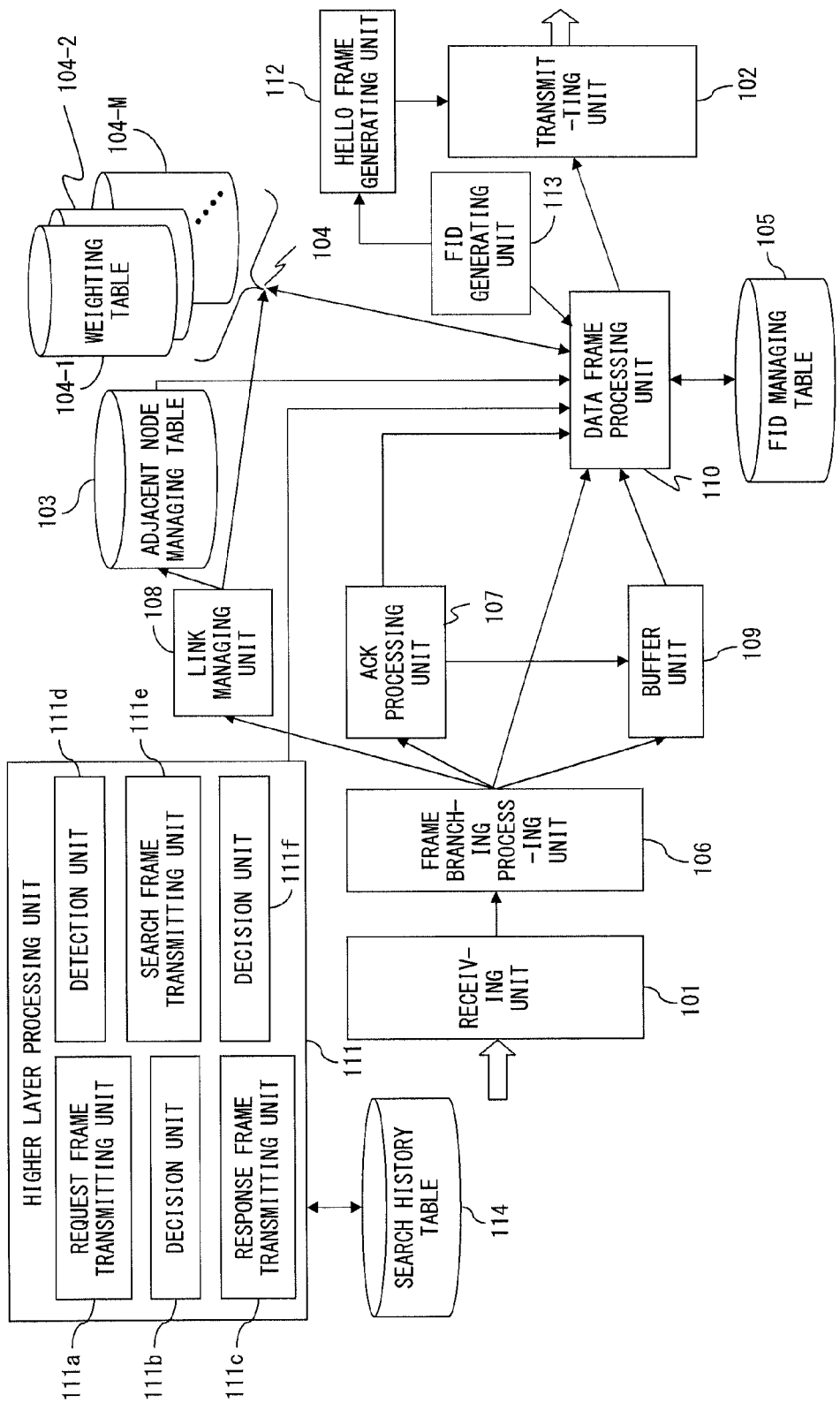
FIG. 3 is a function block diagram illustrating the configuration of a node apparatus in an embodiment.

Hereinafter, some embodiments are described in detail with reference to the drawings. Specifically, first, the configuration of the network according to an embodiment, and the configuration and operation of each node apparatus are explained. After that, a method to detect the presence/absence of the alternative path for a specified path in a network according to the embodiment is explained.

FIG. 1 is a diagram illustrating the first example of the network configuration. A network 1 in FIG. 1 is an example of an ad-hoc network to which the following embodiments may be applied, and includes a plurality of node apparatuses. Meanwhile, hereinafter, a "node apparatus" may simply be referred to as a "node" in following descriptions.

To each node apparatus within the network 1, identifying information within the network 1 (hereinafter, referred to as "node ID" is assigned in advance. Hereinafter, it is assumed that a reference symbol "$N_i$" indicates the node ID, and for example, a node apparatus to which $N_i$ is assigned as the node ID is referred to as "node apparatus $N_i$". Meanwhile, hereinafter, $N_i$ being the node ID assigned to itself for the node apparatus $N_i$ may be referred to as the "own node ID" (in FIG. 1, $1 \leq i \leq 7$).

In addition, a link is indicated by a solid line in FIG. 1. Specifically, the topology of the network 1 is as follows. That is, a link respectively exits between the node apparatuses $N_1$ and $N_2$, between the node apparatuses $N_2$ and $N_3$, between the node apparatuses $N_2$ and $N_6$, between the node apparatuses $N_3$ and $N_4$, between the node apparatuses $N_3$ and $N_5$, between the node apparatuses $N_4$ and $N_5$, between the node apparatuses $N_4$ and $N_7$, and between the node apparatuses $N_6$ and $N_7$.

Meanwhile, hereinafter, a "link" may be either a wireless link or a wired link. When node apparatuses $N_i$ and $N_j$ can directly and wirelessly communicate with each other without relaying by another node apparatus $N_k$, "a wireless link exists between the node apparatuses $N_i$ and $N_j$ (in FIG. 1, $1 \leq i, j, k \leq 7$). Meanwhile, when node apparatuses $N_i$ and $N_j$ are directly connected by a cable and the node apparatuses $N_i$ and $N_j$ can communicate with each other through the cable, "a wired link exists between the node apparatuses $N_i$ and $N_j$."

When a wireless or wired link exists between node apparatuses $N_i$ and $N_j$, "the node apparatuses $N_i$ and $N_j$ are adjacent to each other". In other words, the node apparatuses $N_j$ is an adjacent node apparatus for the node apparatuses $N_i$, and the node apparatuses $N_i$ is an adjacent node apparatus for the node apparatuses $N_j$.

In the network 1 in FIG. 1, a new node apparatus may be added, or any of the node apparatuses $N_1$-$N_7$ may be removed from the network 1. In addition, the link may not be fixed, and may change dynamically.

For example, a wireless link may be newly established or a wireless link that was established previously may disappear between the node apparatuses $N_i$ and $N_j$ by the influence of weather, a shielding matter and so on. If the node apparatus is mobile, the presence/absence of a link may change due to variation in the distance between the node apparatuses. In addition, a wired link may be newly established or a wired link that was established previously may disappear due to connection change of the cable, and a wired link may disappear due to a failure such as disconnection of the cable.

According to the embodiments described below, even in an environment where nodes and links change dynamically as described above, transmission of data is performed while an available and appropriate path is found dynamically according to the status of the network 1 at the time when the data is transmitted. Moreover, path selection according to the dynamic change of the topology is realized in an autonomously-distributed manner without the need that the node apparatuses $N_1$-$N_7$ recognize the topology of the entire network 1 that changes dynamically.

Note that, while details are to be described with FIG. 7, hereinafter, PDU (Protocol Data Unit) transmitted/received between node apparatuses and transmitted data itself are referred to as a "frame". Data transmission/reception within the network 1 is used using frames, and the node apparatus being the transmission source of a frame is referred to as "GS (global source)", and the node apparatus being the destination of a frame is referred to as "GD" (Global Destination). GD is a final destination node in the frame transmission in the network 1.

For example, when the node apparatus $N_1$ is the GS and the node apparatus $N_7$ is the GD, since the node apparatus $N_1$ and $N_7$ are not adjacent to each other in the network 1, the frame is relayed by another node apparatus, and as a result, the frame reaches the node apparatus $N_7$. For example, the frame may be transmitted from the node apparatus $N_1$ to the node apparatus $N_2$, transmitted from the node apparatus $N_2$ to the node apparatus $N_6$, and may be transmitted from the node apparatus $N_6$ to the node apparatus $N_7$. Hereinafter, the path is represented by a tuple such as $<N_1, N_2, N_6, N_7>$.

In the example of the path $<N_1, N_2, N_6, N_7>$, when a frame is transmitted from the node apparatus $N_1$ to the node apparatus $N_2$, while the final destination of the frame is the node apparatus $N_7$ being the GD, the direct destination of the frame is the node apparatus $N_2$ that is adjacent to the node apparatus $N_1$. Hereinafter, in the transmission of a frame between two adjacent node apparatuses as described above, the node apparatus being the transmission source of the frame is referred to as "LS (Local Source)", and the node apparatus being the destination of the frame is referred to as "LD (Local Destination)". LS is a source adjacent node in the frame transmission in the network 1.

For example, the LS and LD in a case in which a frame is relayed from the node apparatus $N_1$ to the node apparatus $N_7$ via the node apparatuses $N_2$ and N6 as described above are as follows. When the frame is transmitted from the node apparatus $N_1$ that is also the GS to the node apparatus $N_2$ that is adjacent to the node apparatus N1, the LS is the node apparatus $N_1$, and the LD is the node apparatus $N_2$. Next, when the frame is transmitted from the node apparatus $N_2$ to the node apparatus $N_6$ that is adjacent to the node apparatus $N_2$, the LS is the node apparatus $N_2$ and the LD is the node apparatus $N_6$. Then, when the frame is transmitted from the node apparatus $N_6$ to the node apparatus $N_7$ that is adjacent to the node apparatus $N_6$ and is also the GD, the LS is the node apparatus $N_6$, and the LD is the node apparatus $N_7$.

Note that, one or a plurality of node apparatus in the network 1 may be connected to a network device that is not illustrated in FIG. 1 belonging to another network (hereinafter, referred to as an "external network").

For example, the node apparatus $N_7$ may be connected to a gateway apparatus of the external network including a data managing server by a wired link or a wireless link. Then, data transmitted in the network 1 with the node apparatus $N_7$ being specified as the GD may be transmitted from the node apparatus $N_7$ to the data managing server via the gateway apparatus and may be managed in the data managing server.

Another example of the network is described with reference to FIG. 2. FIG. 2 is a diagram illustrating the second example of the network configuration. A network 2 in FIG. 2 is also an example of an ad-hoc network to which the following embodiments may be applied, including a plurality of node apparatuses. In addition, in the similar manner to the network 1 in FIG. 1, the network 2 may also be connected to an external network that is not illustrated in the drawing.

The network 2 includes node apparatuses $N_{101}$-$N_{120}$. FIG. 2 is a diagram of representation with a focus on a node apparatus $N_{105}$ in the node apparatuses $N_{101}$-$N_{120}$. That is, the node apparatus $N_{105}$ only needs to recognize the existence and the node IDs of the directly-communicable, adjacent three node apparatuses $N_{107}$, $N_{111}$, and $N_{112}$, and does not need to recognize the topology of the entire network 2. In addition, the node apparatus $N_{105}$ does not need to recognize the number of nodes in the network 2, and does not need to know node ID if a node apparatus being not adjacent to the node apparatus $N_{105}$.

In FIG. 2, the parts that the node apparatus $N_{105}$ recognizes are represented with a solid line, and the parts that the node apparatus $N_{105}$ does not need to recognize are represented with a broken line. That is, in FIG. 2, only the followings that exist within the range of one hop from the node apparatus $N_{105}$ are represented with a solid line.
(1) The node apparatus $N_{105}$ itself
(2) The node apparatuses $N_{107}$, $N_{111}$ and $N_{112}$ adjacent to the node apparatus $N_{105}$
(3) The links that respectively connect to the node apparatus $N_{105}$ to the adjacent node apparatuses $N_{107}$, $N_{111}$ and $N_{112}$.

According to the embodiments described below, each node apparatus in the network only needs to recognize adjacent node apparatuses. Therefore, when the scale of the network expands, it does not end up in a situation where "each node apparatus performs communication of control information to recognize the network topology, increasing the load on the network and impairing the performance for the communication system as a whole".

Hereinafter, the configuration of a network according to an embodiment, and the configuration and operation of each node apparatus are explained referring to FIGS. 3-30. After that, a method to search an alternative path in a network is explained.

FIG. 3 is a function block diagram illustrating the configuration of a node apparatus in the embodiment. Each node apparatus in FIG. 1 and FIG. 2 may be implemented by a node apparatus 100 illustrated in FIG. 3.

The node apparatus 100 has a receiving unit 101 to receive a frame and a transmitting unit 102 to transmit a frame. In addition, the node apparatus 100 has an adjacent node managing table 103, a weighting table 104, an FID (Frame Identification) managing table 105, and a search history table 114, to store various information used for transmission of a frame.

Furthermore the node apparatus 100 has a frame branching processing unit 106 to judge the type of a frame received by the receiving unit 101. While details of the form are to be described later with FIG. 7, at least three types of frames "data frame", "HELLO frame" and "ACK (ACKnowledgment) frame" are used.

The node apparatus 100 has an ACK processing unit 107 to perform processing regarding the ACK frame, and a link managing unit 108 to perform processing in response to reception of a HELLO frame. In addition, the node apparatus 100 has a buffer unit 109 and a data frame processing unit 110 for performing processing in response to reception of a data frame. Furthermore the node apparatus 100 has a higher layer processing unit 111, a HELLO frame generating unit 112 and an FID generating unit 113.

Each unit of the node apparatus 100 operates as follows

The receiving unit 101 receives a frame, and outputs the received frame to the frame branching processing unit 106. Then, the frame branching processing unit 106 judges the type of the frame.

When a HELLO frame is received, the frame branching processing unit 106 guides the received HELLO frame to the link managing unit 108. The link managing unit 108 manages the adjacent node managing table 103, and is further involved in the management of the weighting table 104 as well.

Here, the HELLO frame is one of the control frames for communicating control information. The node apparatus 100 can send notification of existence of the node apparatus 100 to other node apparatuses by the HELLO frame. Therefore, as details are described later with FIG. 15, the link managing unit 108 recognizes existence of an adjacent node apparatus by the reception of a HELLO frame as a trigger, and reflects the recognition result to the adjacent node managing table 103. That is, the adjacent node managing table 103 is a table for the node apparatus 100 to memorize other node apparatuses that are adjacent to the node apparatus 100.

Meanwhile, since the status of the network may change dynamically, in some cases, another node apparatus that has been recognized by the link managing unit 108 as an adjacent node apparatus may become unrecognizable as an adjacent node apparatus. Therefore, as details are described later with FIG. 17, the link managing unit 108 also performs an aging process to delete an entry related to the node apparatus that has become unrecognizable as an adjacent node apparatus from the adjacent node managing table 103.

In addition, in this embodiment, the link managing unit 108 performs addition, deletion or update of the weighting table 104 in accordance with change in adjacent node apparatuses.

Here, the weighting table 104 manages information for deciding to which adjacent node apparatus a frame is to be transmitted, for each GD. FIG. 3 illustrates weighting tables 104-1 through 104-M provided corresponding to each of M GDs. The "weighting table 104" herein is a generic term for the weighting tables 104-1 through 104-M. In addition, at the time when the operation of the node apparatus 100 starts, the weighting table 104 does not exist, where M=0.

Specifically, the weighting table 104 manages, for each GD, "which adjacent node apparatus the node apparatus 100 may select, in order to make the frame reach the GD eventually". In other words, the weighting table 104 holds, regarding one or more node apparatuses that are adjacent to the node apparatus 100, the priority in selecting the adjacent node as the LD, as weighting.

From another perspective, when an adjacent node apparatus is "selectable as the LD", a frame "can be transmitted" to the adjacent node apparatus. Meanwhile, when an adjacent node apparatus is "not selectable as the LD", a frame "cannot be transmitted" to the adjacent node apparatus, and the priority of the adjacent node apparatus is a specified lowest priority.

Therefore, when adjacent nodes apparatuses of the node apparatus 100 change in accordance with change in the status of the network, the link managing unit 108 adds, updates or deletes the weighting table 104 in accordance with the change in the adjacent node apparatuses, as details are described later with FIG. 15 and FIG. 17.

Meanwhile, when an ACK frame is received, the frame branching processing unit 106 guides the received ACK frame to the ACK processing unit 107. Here, the ACK frame is one of control frames, which is a frame for sending notification of reception of the data frame. Thus, the node apparatus 100 receives an ACK frame from an adjacent node after the node apparatus 100 transmits a data frame to the adjacent node being a LD.

Therefore, reception of an ACK frame means success of transmission of a data frame, and time out without reception of any ACK frame after a specified period of time passed means failure in transmission of a data frame. The ACK processing unit 107 performing time out monitoring of the ACK frame reception illustrated in FIG. 25 to be described later.

The buffer unit 109 stores the data frame in case of transmission failure and retransmission of the data frame. Therefore, as details are described later with FIG. 25, upon recognizing transmission success of a data frame with reception of an ACK frame as a trigger, the ACK processing unit 107 deletes the data frame that has become unwanted from the buffer unit 109. In addition, the ACK processing unit 107 sends notification of the success/failure of transmission of the data frame to the data frame processing unit 110.

When a data frame is received, the frame branching unit 106 stores the received data frame in the buffer unit 109, and requests the data frame processing unit 110 to perform processes in FIG. 20-FIG. 23 described later.

Here, the data frame includes data that the node apparatus being the GS attempts to deliver to the node apparatus being the GD as payload. In other words, the PDU of a protocol defined in a higher layer than the layer in which the frame is defined in this embodiment is included in the data frame as payload.

The higher layer processing unit 111 may process PDU of the higher layer included in the data frame as payload, when the node apparatus 100 is the GS or the GD. Here, the higher layer processing unit 111 includes, to realize the function to search an alternative path on the network in the embodiment, a request frame transmitting unit 111a, a decision unit 111b, a response frame transmitting unit 111c, a detection unit 111d, a search frame transmitting unit 111e, and a decision unit 111f. The operation of the elements 111a-111f is described later.

The outline of the operation of the data frame processing unit 110 that has received request for the data frame processing from the frame branching processing unit 106 is as follows.

The data frame processing unit 110 request the transmitting unit 102 to transmit an ACK frame in response to a data frame received by the receiving unit 101. In addition, the data frame processing unit 110 determines whether or not the value of the GD of the received data frame is equal to the own node ID of the node apparatus 100. When the value of the GD of the received data frame is different from the own node ID of the node apparatus 100, the data frame processing unit 110 determines which of (A1) and (A2) below the current reception corresponds to, by referring to the FID managing table 105.

(A1) A data frame that was transmitted from the node apparatus 100 being the LS has returned to the node apparatus 100 while being relayed within the network and has been received by the receiving unit 101.

(A2) A new frame other than (A1) above has been received by the receiving unit 101.

Upon determining that the current reception corresponds to (A2), the data frame processing unit 110 refers to the weighting table 104, selects an adjacent node apparatus to specify as the LD for forwarding the received data frame, and requests the transmitting unit 102 to forward the data frame.

On the other hand, upon determining that the current reception corresponds to (A1), the data frame processing unit 110 recognizes that the adjacent node apparatus selected previously as the LD was not an appropriate LD, and reflects the result of recognition to the weighting table 104. Then, the data frame processing unit 110 refers to the weighting table 104 to determine whether or not there still remains an adjacent node apparatus that is selectable as the LD.

In addition, the data frame processing unit 110 receives notification of transmission success or transmission failure of a data frame from the ACK processing unit 107, recognizes whether or not the adjacent node apparatus selected as the LD of the data frame is appropriate, and reflects the result of recognition to the weighting table 104.

Meanwhile, a given node apparatus $N_i$ being "selectable as the LD" intuitively means "it is worth selecting the adjacent node $N_i$ as the LD and seeing whether or not the frame successfully reaches the GD". Specifically, a node apparatus $N_i$ being "selectable as the LD" means that it is "neither (B1) nor (B2) below". Meanwhile, more detail meaning of the term "selectable" is apparent from description regarding FIG. 5 and description (F1)-(F2) and (G1)-(G4) regarding FIG. 22 below.

(B1) The node apparatus 100 selected the adjacent node apparatus $N_i$ as the LD previously, and a certain failure has occurred such as a loop. As a result, it has already become clear that "the node apparatus $N_i$ is inappropriate as the LD".

(B2) The LS (hereinafter, referred to as "Original Local Source" and "OLS" for short) at the time when the receiving unit 101 first received the data frame that the receiving unit 101 received this time was the node apparatus $N_i$.

When there remains another adjacent node apparatus selectable as the LD, the data frame processing unit 110 selects the selectable adjacent node apparatus and specifies the selected node apparatus as the LD, and requests the transmitting unit 102 to forward the data frame. On the contrary, when there remains no adjacent node apparatus selectable as the LD, the data frame processing unit 110 operates as (C1) or (C2) below.

(C1) When the GS of the data frame received this time is other than the node apparatus 100, the data frame processing unit 110 selects the OLS as the LD to return the data frame to the OLS and requests the transmitting unit 102 to forward the data frame. This operation makes an adjacent node apparatus being the OLS recognize that "it is not appropriate to select the node apparatus 100 as the LD", which corresponds to backtracking in the path search as described later.

(C2) When the GS of the data frame received this time is the node apparatus 100 itself, it is the higher layer processing unit 111 that originally generated the data frame. Therefore, the data frame processing unit 110 sends notification of transmission failure of the data frame to the higher layer processing unit 111, and discards the data frame stored in the buffer unit 109.

Meanwhile, in order to realize the operation of the data frame processing unit 110 described above, it is necessary for the data frame processing unit 110 to distinguish (A1) from (A2) described above. Therefore, in this embodiment, frame identifying information with which a data frame may be uniquely identified is included in each data frame, and the FID managing table 105 stores the frame identifying information.

The frame identifying information in this embodiment is, for example, a combination of the node ID of the node apparatus being the GS of the data frame and FID. The FID is identifying information to uniquely identify each of a plurality of frames transmitted from a node apparatus transmits at the GS. FID may be a sequence number or a timestamp.

That is, since individual node apparatus generates FID independently, a plurality of different node apparatuses may generate the same FID by chance. However, the frame identifying information is a combination of the node ID of the node apparatus being the GS of the data frame and the FID. Then, the node ID is information to uniquely identify the node apparatus within the network, as described above. Therefore, even if a plurality of different node apparatuses generate the same FID by chance, frames transmitted from different node apparatuses being the GS have different frame identifying information, and are distinguishable.

The frame identifying information is not to be rewritten by a node apparatus that relays the data frame even if the data frame is forwarded in the network via one or more node apparatuses, and therefore does not change. By recording the frame identifying information of the data frame for which the transmitting unit 102 is requested for transmission in the FID managing table 105, the data frame processing unit 110 may recognize, when the data frame has returned to the node apparatus 110 afterwards, that it corresponds to (A1) described above.

Note that the node apparatus 110 may perform other processes for which reception of a frame is not a trigger. For example, the HELLO frame generation unit 112 periodically generates a HELLO frame using the FID that the FID generation unit 113 generates, and outputs to the transmitting unit 102. Then, the transmitting unit 102 transmits the HELLO frame to adjacent nodes, making it possible for the node apparatus 100 to send notification of existence of the node apparatus 100 itself to its adjacent nodes periodically.

In addition, the higher layer processing unit 111 may output, at any timing, data to be transmitted while being included in a data frame as payload, to the data frame processing unit 110. Then, the data frame processing unit 110 generates a data frame in accordance with the request from the higher layer processing unit 111, and instructs the transmitting unit 102 to transmit the data frame. At this time, the node apparatus 100 becomes the GS with respect to the data frame.

FIG. 4 is a diagram illustrating the hardware configuration of the node apparatus in this embodiment. The node apparatus 100 in FIG. 3 may be realized by various hardware illustrated in FIG. 4 for example.

In the example in FIG. 4, the node apparatus 100 has an MPU (Micro Processing Unit) 201, a PHY (PHYsical layer) chip 202, and a timer IC (Integrated Circuit) 203. In addition, the node apparatus 100 has a DRAM (Dynamic Random access Memory) 204, a flash memory 205 and a wireless module 206.

The communication interface that connects the MPU 201 and the PHY chip 202 is, for example, an MII/MDIO (Media Independent Interface or Management Data Input/Output) 207. The MII and MDIO are both an interface between the physical layer and the MAC sublayer (Media Access Control sublayer). In addition, the MPU 201 and the timer IC 203 are connected via, for example, an I2C/PIO (Inter-Integrated Circuit or Parallel Input/Output) bus 208. The DRAM 204 and the flash memory 205 and the wireless module 206 are connected to the MPU 201 via, for example, a PCI (Peripheral Component Interconnect) bus 209.

The MPU 201 loads a program such as firmware stored in the flash memory 205 being a type of nonvolatile storage apparatus onto the DRAM 204, and performs various processes while using the DRAM 204 as a working memory. The MPU 201 may operate as the frame branching processing unit 106, the ACK processing unit 107, the link managing unit 108, the data frame processing unit 110, the higher layer processing unit 111, the HELLO frame processing unit 112, and the FID generation unit 113.

The program such as firmware may be provided while being stored in a computer-readable storage medium, and may be installed in the node apparatus 100. Alternatively, the program may be downloaded from a network via the PHY chip 202 or the wireless module 206, and may be installed in the node apparatus 100.

Note that, according to the embodiment, another type of storage device other than the DRAM 204 or the flash memory 205 may be used. For example, the node apparatus 100 may have a storage device such as CAM (Content Addressable Memory), SRAM (Static Random Access Memory), SDRAM (Synchronous Dynamic Random Access Memory).

The adjacent node apparatus managing table 103, the weighting table 104, the FID managing table 105, the buffer unit 109, and the search history table 114 are realized by the DRAM 204, the flash memory 205 or another storage device that is not illustrated in the drawing. In addition, the flash memory 205 may store not only the program but also information that is unique to the node apparatus 100, such as the node ID of the node apparatus 100.

The PHY chip 202 is a circuit that performs processing in the physical layer in wired connection. Since this embodiment is applied to a wireless network, the node apparatus 100 does not have to have the PHY chip 202. However, the node apparatus 100 may have the PHY chip 202 for connection of the node apparatus 100 with an external network.

For example, the node apparatus 100 may have a wired LAN port that complies with the Ethernet (registered trademark), and may be connected to a gateway apparatus and the like of an external network through a cable connected to the wired LAN port.

In that case, the MPU 201 may generate an Ethernet frame and may outputs it to the PHY chip 202 through the MII/MDIO 207. Then, the PHY chip 202 converts the output from the MPU 201 (that is, a logic signal representing the Ethernet frame) into a signal in accordance with the type of the cable (that is, an electric signal or an optical signal), and outputs to the cable. Thus, the node apparatus 100 may transmit data to an external network using the PHY chip 202.

In addition, the PHY chip 202 may convert an electric signal or an optical signal input from an external network through the cable and LAN port into a logic signal, and may output it to the MPU 201 through the MII/MDIO 207. Thus, the node apparatus 100 may receive data from an external network using the PHY chip 202.

The wireless module 206 is hardware that performs the processing of the physical layer in wireless connection. The wireless module 206 includes, for example, an antenna, and ADC (Analog-to-Digital Converter), a DAC (Digital-to-Analog Converter), a modulator, a demodulator, an encoder, a decoder and the like.

In this embodiment, the receiving unit 101 and the transmitting unit 102 in FIG. 3 are realized by the wireless module 206 in FIG. 4. That is, in this embodiment, the link in the network is a wireless link.

The timer IC 203 performs the count up operation until a specified period of time has passed, and when the specified period of time has passed, the timer IC 203 outputs an interrupt signal. For example, the timer IC may output an interrupt signal to execute the aging process of the adjacent node managing table 103, the weighting table 104, and the FID managing table 105 respectively at a specified interval.

Note that, according to the embodiment, the hardware configuration of the node apparatus may be different from FIG. 4, and hardware other than the standard/type illustrated in FIG. 4 may be used for the node apparatus.

For example, the frame branching processing unit 106, the ACK processing unit 107, the link managing unit 108, the data frame processing unit 110, the higher layer processing unit 111, the HELLO frame generating unit 112, or the FID generating unit 113 may be realized by a hardware circuit. In this case, each of these function elements in FIG. 3 may be realized by a reconfigurable circuit such as FPGA (Field Programmable Gate Array) and ASIC (Application Specific Integrated Circuit), and the like. In addition, each function element in FIG. 3 may be realized by both the MPU 201 and the hardware circuit.

Meanwhile, in description below, in order to make the description clear, a reference numeral in which the node ID is attached after the reference numeral of each part in FIG. 3 and FIG. 4 may be used. For example, the adjacent node managing table 103 in FIG. 3 that the node apparatus $N_1$ has may be referred to by a reference numeral "103-$N_1$".

Next, the outline of the operation of the individual node apparatuses is described with reference to FIG. 5, and path selection realized in the network as a whole as a result of the operation of the individual node apparatuses is described with reference to FIG. 6.

Figure 5:
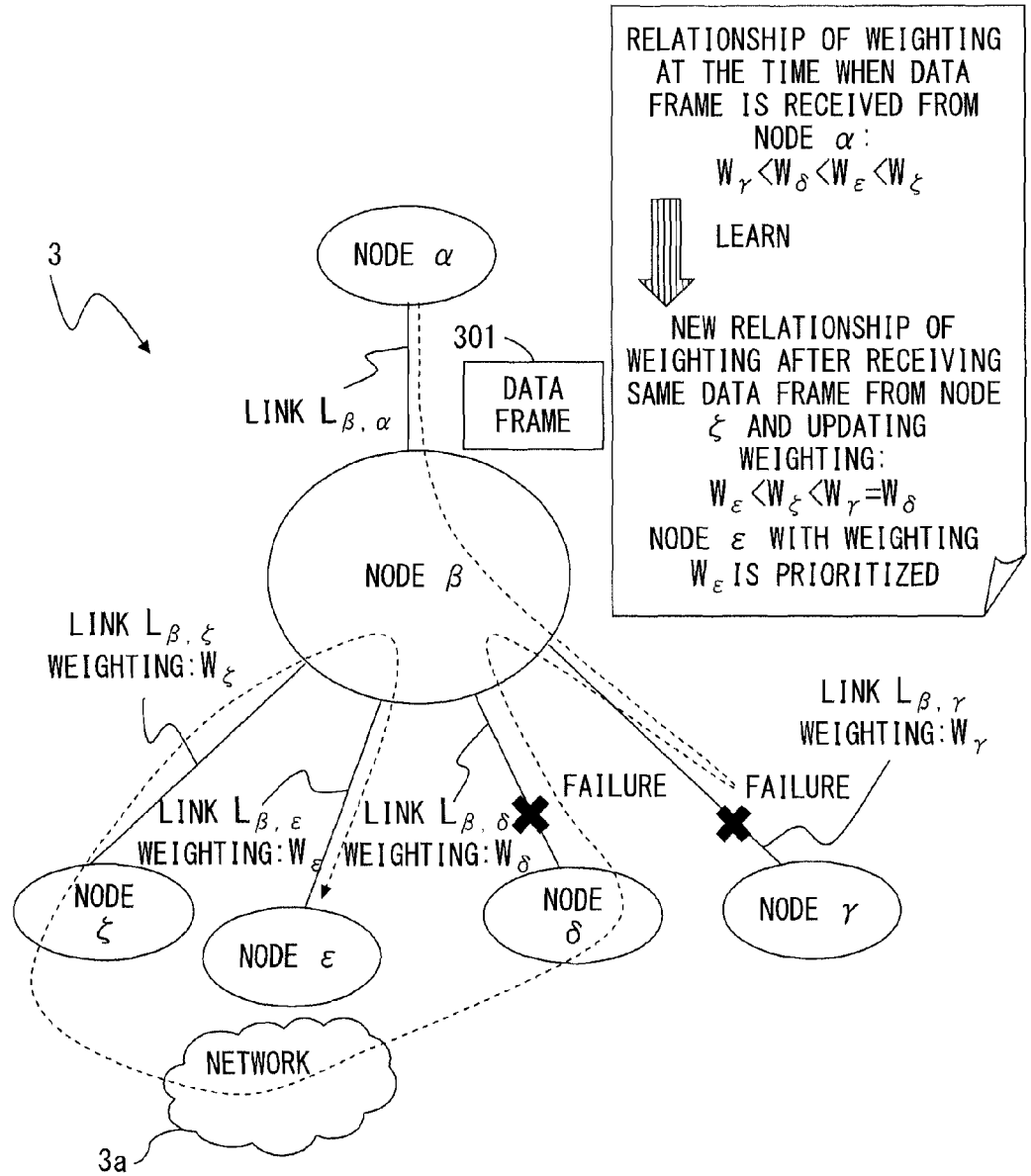
FIG. 5 is a diagram describing learning of weighting focusing on a node apparatus.

FIG. 5 is a diagram describing the learning of weighting while focusing on one node apparatus. FIG. 5 extracts and illustrates six node apparatuses in the network 3 as "node α" through "node ζ". As illustrated in FIG. 5, the nodes α, γ, δ, ε, and ζ are adjacent to the node β, and in FIG. 5, the following five links are illustrated with a solid line.

Link $L_{\beta,\alpha}$ between the nodes β and α
Link $L_{\beta,\gamma}$ between the nodes β and γ
Link $L_{\beta,\delta}$ between the nodes β and δ
Link $L_{\beta,\epsilon}$ between the nodes β and ε
Link $L_{\beta,\zeta}$ between the nodes β and ζ

A network 3a illustrated schematically in the form of a cloud is the part of the network 3. The network 3a includes, for example, a link that directly connects the nodes δ and ζ, or a path that connects the nodes δ and ζ indirectly via one or more nodes and two or more links that are not illustrated in the drawing.

Hereinafter, in FIG. 5, a focus is put on the node β, to described the learning of weighting in the node β is described.

At a certain time, the node β receives a data frame 301 having a certain node (hereinafter, referred to as "node η" for convenience) as the GD from the node a through the link $L_{\beta,\alpha}$. The node β has the weighting tables 104 in FIG. 3, and among them, the weighting table corresponding to the node η is referred to with a reference numeral "104-h" in the description of FIG. 5 for convenience.

While details are to be described later with FIG. 10 and FIG. 11, each of the weighting tables 104 managed for each GD stores correspondence of adjacent nodes and weightings. Since the nodes α, γ, δ, ε, and ζ are adjacent to the node β, in the weighting table 104-h, the node α and weighting $W_\alpha$, the node γ and weighting $W_\gamma$, the node δ and weighting $W_\delta$, the node ε and weighting $W_\epsilon$, the node and weighting $W_\zeta$ are associated.

For convenience of description, it is assumed that the relationship between the weightings at the time when the node β receives the data frame 301 from the node α is as in expression (1).

$$W_\gamma < W_\delta < W_\epsilon < W_\zeta \quad (1)$$

Hereinafter, in this embodiment, it is assumed for convenience of description that weighting takes a value equal to or larger than 0 and equal to or smaller than 1, and the smaller the value of weighting, the higher the priority of the node corresponding to the weighting.

Therefore, based on the expression (1), the node β recognizes that the priority of the node γ associated with the smallest weighting is the highest among the adjacent nodes α, γ, δ, ε, and ζ. Therefore, the node β selects the node γ first from the adjacent nodes α, γ, δ, ε, and ζ as the LD for transmitting the data frame 301, and transmits the data frame to the node γ.

Here, if the transmission from the node β to the node γ fails, the node β learns that "it is inappropriate to select the node γ when transmitting the data frame having the node η as the GD". Then, as a result of the learning, the node β reduces the priority of the node γ. That is, the node β increases the value of the weighting $W_\gamma$.

There are several types of transmission failure, and the node β learns that "it is inappropriate to select the node γ when transmitting the data frame having the node η as the GD" as in (D1) or (D2) below.

(D1) In the case of a link failure

If a failure is occurring in the link $L_{\beta,\gamma}$ or in the node γ at the time when the node β forwards the data frame 301 to the node γ, the node β recognizes that the transmission to the node γ failed.

When the link $L_{\beta,\gamma}$ is a wireless link, if no ACK frame is returned from the node γ in response to the data frame 301, the node β experiences timeout, and determines that "transmission of the data frame 301 to the node γ failed". Then, the node β learns that "it is inappropriate to select the node γ when transmitting the data frame having the node η as the GD", and increases the value of the weighting $W_\gamma$ associated with the node γ selected as the LD.

Note that, since the quality of a wireless link easily changes, the link failure may be solved again. For this reason, in this embodiment, the weighting $W_\gamma$ is not set to the maximum value at once, but is increased by a specified value only. By doing so, the LD becoming inappropriate with occurrence of a link failure for only once may be avoided.

(D2) In the case in which the data frame 301 returns from the node γ to the node β

The node β once succeeds in the transmission of the data frame to the node γ. For example, the node β recognizes that the transmission of the data frame 301 to the node γ was successful, by receiving an ACK frame in response to the data frame 301. In this case, the node β reduces the value of the weighing $W_\gamma$ associated with the node γ selected as the LD.

However, after that, if no path through which the data frame 301 may be forwarded from the node γ to the node η is found in the network 3, the node γ sends the data frame 301 back to the node β by a backtracking operation described later. For example, when the node γ is adjacent only to the node β, the node γ is unable to find a path through which the data frame 301 may be forwarded from the node γ to the node 11. In addition, even in a case in which the node γ is adjacent to several nodes other than the node β, the node η may not be reachable from the node γ, depending on the topology of the network 3.

When the node γ performs the backtracking operation, the node β receives the data frame 301 that the node β transmitted to the node γ previously, which enables the node β to recognize that "transmission to the node γ failed". As a result of the recognition, the node β leans that "it is inappropriate to select the node γ as the LD when transmitting the data frame with the node η being the GD", and increases the value of the weighting $W_\gamma$ associated with the node γ selected as the LD.

In this embodiment, when the node β recognizes the transmission failure by receiving the data frame 301 that the node β previously transmitted as in (D2), the node β sets the maximum value for the value of the weighting $W_\gamma$.

Hereinafter, for convenience of description, it is assumed that the node β recognizes the transmission failure as in (D2) in the example in FIG. 5, and set the value of the weighting $W_\gamma$ to the maximum value. As a result, expression (2) is established.

$$W_\delta < W_\epsilon < W_\zeta < W_\gamma \qquad (2)$$

Next, the node β selects, as the LD, an adjacent node other than the node γ that has proved to be inappropriate to be the LD, to deliver the data frame 301 to the node being the GD that is not illustrated in the drawing, and tries to retransmit the data frame 301. In this case, based on the expression (2), the node β selects the node δ associated currently with the smallest weighting $W_\delta$ as the LD, and transmits the data frame 301 to the node δ.

In the example in FIG. 5, the node β receives an ACK frame in response to the data frame 301 from the node δ, and the node β recognizes the success of transmission. Upon recognizing the success of the transmission, the node β reduces the value of the weighting $W_\delta$ associated with the node δ selected as the LD. As a result, the expression (2) is established as well.

Next, it is assumed that the data frame 301 reaches the node ζ from the node δ via the network 3a. In addition, it is assumed that the node ζ selects the node β as the LD.

Then, the node β receives, from the node ζ, the data frame 301 that the node β sent to the node δ, which makes the node β recognize that "transmission to the node δ failed due to existence of a loop". As a result of the recognition, the node β learns that "it is inappropriate to select the node δ as the LD when transmitting the data frame with the node η as the GD", and increases the value of the weighting $W_\delta$.

Here, in the case in which the node β receives the data frame 301 returned from the node ζ due to looping, it is similar to the case in (D2) above in that "the node β recognizes the transmission failure by receiving the data frame 301 that the node β previously transmitted. Therefore, the node β leans that "it is inappropriate to select the node δ as the LD when transmitting the data frame with the node η being the GD", and sets the value of the weighting $W_\delta$ associated with the node δ as the LD to the maximum value. As a result, expression (3) is established.

$$W_\epsilon < W_\zeta < W_\gamma = W_\delta \qquad (3)$$

FIG. 5 illustrates the expression (3) as new relationship of weightings resulting from updating the weightings upon receiving the data frame 301 from the node ζ.

Next, the node β selects, as the LD, an adjacent node other than the nodes γ and δ that have proved to be inappropriate to be the LD, to deliver the data frame 301 to the node η being the GD that is not illustrated in the drawing, and tries to retransmit the data frame 301. That is, based on the expression (3), the node β selects the node ε associated currently with the smallest weighting $W_\epsilon$ as the LD, and transmits the data frame 301 to the node ε.

In the example in FIG. 5, the node β receives an ACK frame from the node ε in response to the data frame 301, and the node β recognizes the success of transmission. Upon recognizing the success of the transmission, the node β reduces the value of the weighting $W_\epsilon$ associated with the node ε selected as the LD. As a result, the expression (3) is established as well.

Here, temporarily, it is assumed that the data frame 301 is never returned to the node β from the node ε by backtracking. In addition, it is also assumed that the data frame 301 is never received by the node β from any of adjacent nodes of the node β due to looping in the network 3.

Then, from the expression (3), the node β selects the node ε associated with the smallest weight $W_\epsilon$ with priority, when it receives another data frame indicating the node η as the GD in the same manner as the data frame 301 from one of the adjacent nodes α, γ, δ, ζ.

Figure 6:
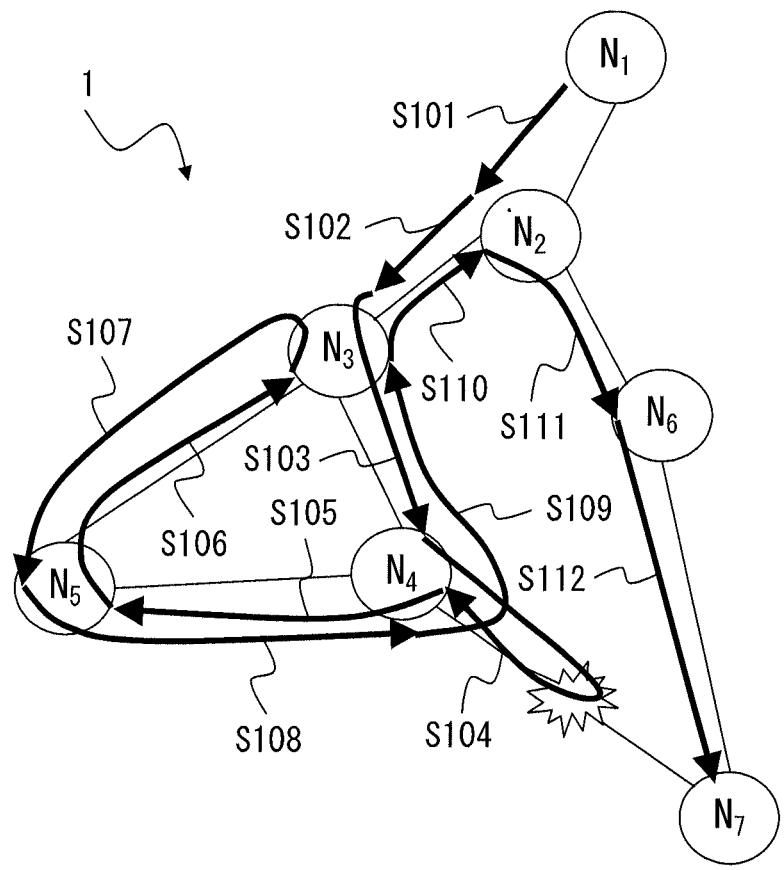
FIG. 6 is a diagram describing the way in which a path is selected dynamically and in an autonomously-distributed manner in the network in FIG. 1.

FIG. 6 is a diagram describing the way in which a path is selected dynamically and in an autonomously-distributed manner. Specifically, FIG. 6 illustrates the way of path selection in the network 1 in a case in which the node apparatus $N_1$ becomes the GS and transmits a data frame with the node apparatus $N_7$ specified as the GD.

FIG. 6 illustrates the network 1 in FIG. 1 and a failure that has occurred between the node apparatuses $N_4$ and $N_7$. In addition, 12 arrows S101-S112 in FIG. 6 represent the way in which the data frame is forwarded from the GS (that is, the node apparatus $N_1$) to the GD (that is, the node apparatus $N_7$) in the network 1 while the path is selected dynamically.

Meanwhile, hereinafter, among weighting tables 104-$N_i$ of the node apparatus $N_i$, the one corresponding to the node apparatus $N_7$ is referred to with a reference numeral "104-$h_i$-$N_i$**," for convenience. ($1 \leq i \leq 6$).

In addition, in the description of FIG. 6, it is assumed that transmission of a data frame is successful and an ACK frame is returned unless stated particularly, and description is simplified by omitting returning of the ACK frame. The flow of the series of processes including the returning of the ACK frame is to be described later with FIG. 30.

In step S101, the node apparatus $N_i$ being the GS selects the node apparatus $N_2$ being the only one adjacent to the node apparatus $N_1$, and transmits the data frame to the node apparatus $N_2$. Other than the node apparatus $N_1$ being the LS of the data frame transmitted in step S101, the node apparatuses $N_3$ and $N_6$ are adjacent to the node apparatus $N_2$. It is assumed that, of the two adjacent node apparatuses $N_3$ and $N_6$, the node apparatus $N_3$ is associated with a smaller weighting in the weighting table 104-$h_2$-$N_2$.

In step S102, the node apparatus $N_2$ selects the node apparatus $N_3$ as the LD for forwarding the data frame received in step S101, and transmits the data frame to the node apparatus $N_3$.

Other than the node apparatus $N_2$ being the LS of the data frame transmitted in step S102, the node apparatuses $N_4$ and $N_5$ are adjacent to the node apparatus $N_3$. It is assumed that, of the two adjacent node apparatuses Ng and $N_5$, the node apparatus $N_4$ is associated with a smaller weighting in the weighting table 104-$h_3$-$N_3$.

In step S103, the node apparatus $N_3$ selects the node apparatus $N_4$ as the LD for forwarding the data frame received in step S102, and transmits the data frame to the node apparatus $N_4$.

Other than the node apparatus $N_3$ being the LS of the data frame transmitted in step S103, the node apparatuses $N_5$ and $N_7$ are adjacent to the node apparatus $N_4$. It is assumed that, of the two adjacent node apparatuses $N_5$ and $N_7$, the node apparatus $N_7$ is associated with a smaller weighting in the weighting table $104$-$4_4$-$N_4$.

In step S104, the node apparatus $N_4$ selects the node apparatus $N_7$ as the LD for forwarding the data frame received in step S103, and transmits the data frame to the node apparatus $N_4$. The node apparatus $N_7$ is the GS of the data frame.

However, as illustrated in FIG. 6, a failure is occurring in the link between the node apparatuses $N_4$ and $N_7$ at the time when the node apparatus $N_4$ transmits the data frame to the node apparatus $N_7$, so the transmission fails. That is, since no ACK frame is returned from the node apparatus $N_7$ after waiting for a specified period of time, the node apparatus $N_4$ recognizes transmission failure due to time-out.

The node apparatus $N_4$ in step S104 corresponds to the node β that failed as in (D1) above in transmission of a data frame to the node γ in FIG. 5. Therefore, the node apparatus $N_4$ updates the weighting table $104$-$h_4$-$N_4$ in accordance with the transmission failure (for example, increases the value of the weighting associated with the node apparatus $N_7$ being the LD in the transmission in step S104).

In step S105, the node apparatus $N_4$ selects another adjacent node apparatus $N_5$ that has not been tried yet as the LD for forwarding the data frame received in step S103, and transmits the data frame to the node apparatus $N_5$.

Other than the node apparatus $N_4$ being the LS of the data frame transmitted in step S104, only the node apparatus $N_3$ is adjacent to the node apparatus $N_5$. Thus, in step S106, the node apparatus $N_5$ selects the node apparatus $N_3$ as the LD for forwarding the data frame received in step S105, and transmits the data frame to the node apparatus $N_3$.

In step S106, the node apparatus $N_3$ recognizes that "the same data frame that the node apparatus $N_3$ transmitted in step S103 has been received". That is, the node apparatus $N_3$ instep S106 corresponds to the node β that received the looped data frame from the node ζ. Therefore, the node apparatus $N_3$ updates the weighting table $104$-$h_3$-$N_3$ in the same manner as in FIG. 5 (for example, sets the value of the weighting associated with the node apparatus $N_4$ being the LD of the transmission in step S103 to the maximum value).

In step S107, the node apparatus $N_3$ searches, among the adjacent node apparatuses other than the OLS (that is, the node apparatus $N_2$ being the LD at the time when the node apparatus $N_3$ first received the data frame in step S102), for one that has not been tried as the LD. Here, the adjacent node apparatuses other than the OLS are the node apparatus $N_4$ and $N_5$, and the node apparatus $N_4$ was already been selected in step S103. Therefore, in step S107, the node apparatus $N_3$ selects the node apparatus $N_5$ not yet selected as the LD, and transmits the data frame to the node apparatus $N_5$. That is, the node apparatus $N_3$ in step S107 corresponds to the node β that reselects the node ε as the LD and transmits the data frame to the node ε in FIG. 5.

Then, in step S107, the node apparatus $N_5$ recognizes that "the same data frame that the node apparatus $N_5$ transmitted in step S105 has been received". That is, the node apparatus $N_5$ in step S107 corresponds to the node β that failed at transmission of a data frame to the node γ as in (D2) in FIG. 5. Therefore, the node apparatus $N_5$ updates the weighting table $104$-$h_5$-$N_5$ in the same manner as in FIG. 5 (for example, sets the value of the weighting associated with the node apparatus $N_3$ being the LD of the transmission in step S106 to the maximum value).

Then, for the node apparatus $N_5$, the adjacent node apparatus other than the OLS (that is, the node apparatus $N_4$ being the LS at the time when the node apparatus $N_5$ first received the data frame in step S105) is only the node apparatus $N_3$ that has proved with transmission failure. Therefore, there is no more adjacent node apparatus that can be selected as the LD.

Therefore, in step S108, the node apparatus $N_5$ sends the data frame back to the node apparatus $N_4$ being the OLS. Step S108 is a back tracking operation, and the node apparatus $N_5$ can notify the node apparatus $N_4$ of the fact that "in transmission of the data frame with the node apparatus $N_7$ being the GD, the path beyond the node apparatus $N_5$ has become a dead end".

In step S108, the node apparatus $N_4$ recognizes that "the same data frame that the node apparatus $N_4$ transmitted in step S105 has been received". That is, the node apparatus $N_4$ in step S108 corresponds to the node β that failed at transmission of a data frame to the node γ as in (D2) in FIG. 5. Therefore, the node apparatus $N_4$ updates the weighting table $104$-$h_4$-$N_4$ in the same manner as in FIG. 5 (for example, sets the value of the weighting associated with the node apparatus $N_5$ being the LD of the transmission in step S105 to the maximum value).

However, while the node β in FIG. 5 still has the node δ and the like that can be selected as the LD when transmission of the data frame to the node γ failed, for the node apparatus $N_4$ in step S108, there is no adjacent node that can be selected as the LD. That is, the two adjacent nodes $N_7$ and $N_5$ other than the OLS were already selected in steps S104 and S5105, and it has become clear that both results in transmission failure.

Therefore, the node apparatus $N_4$ sends the data frame back to the node apparatus $N_3$ being the OLS in step S109. Step S109 is also a backtracking operation, and the node apparatus $N_4$ can notify the node apparatus $N_3$ of the fact that "in transmission of the data frame with the node apparatus $N_7$ being the GD, the path beyond the node apparatus $N_4$ has become a dead end".

In step S109, the node apparatus $N_3$ recognizes that "the same data frame that the node apparatus $N_3$ transmitted in step S107 has been received". That is, the node apparatus $N_3$ in step S109 corresponds to the node β that received the looped data frame from the node ζ in FIG. 5. Therefore, the node apparatus $N_3$ updates the weighting table $104$-$h_3$-$N_3$ in the same manner as in FIG. 5 (for example, sets the value of the weighting associated with the node apparatus $N_5$ being the LD of the transmission in step S107 to the maximum value).

However, while the node β in FIG. 5 still has the node ε and the like that can be selected as the LD when transmission of the data frame to the node δ failed, for the node apparatus $N_3$ in step S109, there is no adjacent node that can be selected as the LD. That is, the two adjacent nodes $N_4$ and $N_5$ other than the OLS were already selected in steps S103 and S107, and it has become clear that both results in transmission failure.

Therefore, the node apparatus $N_3$ sends the data frame back to the node apparatus $N_2$ being the OLS in step S110. Step S110 is also a backtracking operation, and the node apparatus $N_3$ can notify the node apparatus $N_2$ of the fact that "in transmission of the data frame with the node apparatus $N_7$ being the GD, the path beyond the node apparatus $N_3$ has become a dead end".

In step S110, the node apparatus $N_2$ recognizes that "the same data frame that the node apparatus $N_2$ transmitted in step S102 has been received". That is, the node apparatus $N_2$ in step S110 corresponds to the node β that failed at transmission of a data frame to the node γ as in (D2) in FIG. 5. Therefore, the node apparatus $N_2$ updates the weighting table $104$-$h_2$-$N_2$ in the same manner as in FIG. 5 (for example, sets the value of the weighting associated with the node apparatus $N_3$ being the LD of the transmission in step S102 to the maximum value).

In step S111, the node apparatus $N_2$ selects another node apparatus $N_6$ that has not been tried, as the LD for forwarding the data frame, and transmits the data frame to the node apparatus $N_6$. Other than the node apparatus $N_2$ being the LS of the data frame transmitted in step S111, only the node apparatus $N_7$ is adjacent to the node apparatus $N_6$. Thus, in step S112, the node apparatus $N_6$ selects the node apparatus $N_7$ as the LD for forwarding the data frame received in step S111, and transmits the data frame to the node apparatus $N_7$.

Thus, even if a failure occurs in the network 1, with each node apparatus behaving in an autonomously-distributed manner, the data frame reaches the GD successfully. In addition, in the forwarding of the data frame, even if an inappropriate node apparatus is selected as the LD locally, in the network as a whole, eventually, a path from the GS leading to the GD is selected. This is because each node apparatus sequentially selects anode apparatus that can be selected as the LD and performs a backtracking operation if there is no more node apparatus that may be selected.

For example, in the example in FIG. 6, the selection of the node apparatus $N_3$ as the LD by the node apparatus $N_2$ in step S102 eventually proves to be inappropriate in step S110. However, by the operations in steps S103-S110, the network as a whole eventually succeeds in selecting a path $<N_1, N_2, N_6, N_7>$.

The path selected as described above is learned and contributes to make subsequent forwarding of data frames more efficient. Specific description of improvement in efficiency by learning is as follows.

As a result of the reception of the data frame in step S110, the node apparatus $N_2$ performs learning of the weighting table $104\text{-}h_2\text{-}N_2$ and sets the weighting associated with the node apparatus $N_3$ to the maximum value. Therefore, upon receiving a new data frame with the node apparatus $N_7$ being the GD from the adjacent node apparatus $N_1$, the node apparatus $N_2$ selects the node apparatus $N_6$ as the LD in the beginning. That is, it becomes possible for the network 1 as a whole to transmit the data frame to the GD effectively through the path $<N_1, N_2, N_6 N_7>$ without trial and error including backtracking, as a result of the learning in an autonomously-distributed manner.

Furthermore, according to this embodiment, influence of selection of an inappropriate LD or a local failure does not affect the network 1 as a whole, and is limited locally. That is, according to this embodiment, even if a failure occurs in the link between the node apparatuses $N_4$ and $N_7$ for example, it does not lead to flooding of a control frame for inquiring an alternative path to all the node apparatuses in the entire network 1. Therefore, according to this embodiment, even if a failure or loop occurs locally, it does not lead to a situation such as generation of a broadcast storm in the entire network 1.

In addition, in the example in FIG. 6, it is obvious that the node apparatus $N_1$ does not recognize the failure in the link between the node apparatuses $N_4$ and $N_7$ and the path $<N_1, N_2, N_6, N_7>$ at all. This means that influence from selection of an inappropriate LD or a local failure is limited locally and does not affect the network 1 as a whole.

Limitation of influence of a problem locally means that a local problem is never fed back positively for the entire network 1 and spread, and that the network is stable as a system. Another example of limitation of influence of a problem locally is as follows.

For example, it is assumed that there is also a link between the node apparatuses $N_5$ and $N_7$, and in the weighting table $104\text{-}h_5\text{-}N_5$, the node apparatus $N_7$ is associated with a smaller weighting than the node apparatus $N_3$. Then, immediately after step S105, the node apparatus $N_5$ selects the node apparatus $N_7$ as the LD and transmits the data frame to the node apparatus $N_7$. As a result, transmission in steps S108-S112 is not performed, and not only the node apparatus $N_1$ but also node apparatuses $N_2$ and $N_3$ do not recognize the occurrence of the failure at all/Thus, the problems such as occurrence of a link failure and a loop only affect a minimum local area according to the location at which the problem occurs.

Next, the configuration and operation of the node apparatus 100 described above and an autonomously-distributed coordinated operation realized in the network 1 as a whole are described in greater detail.

Figure 7:
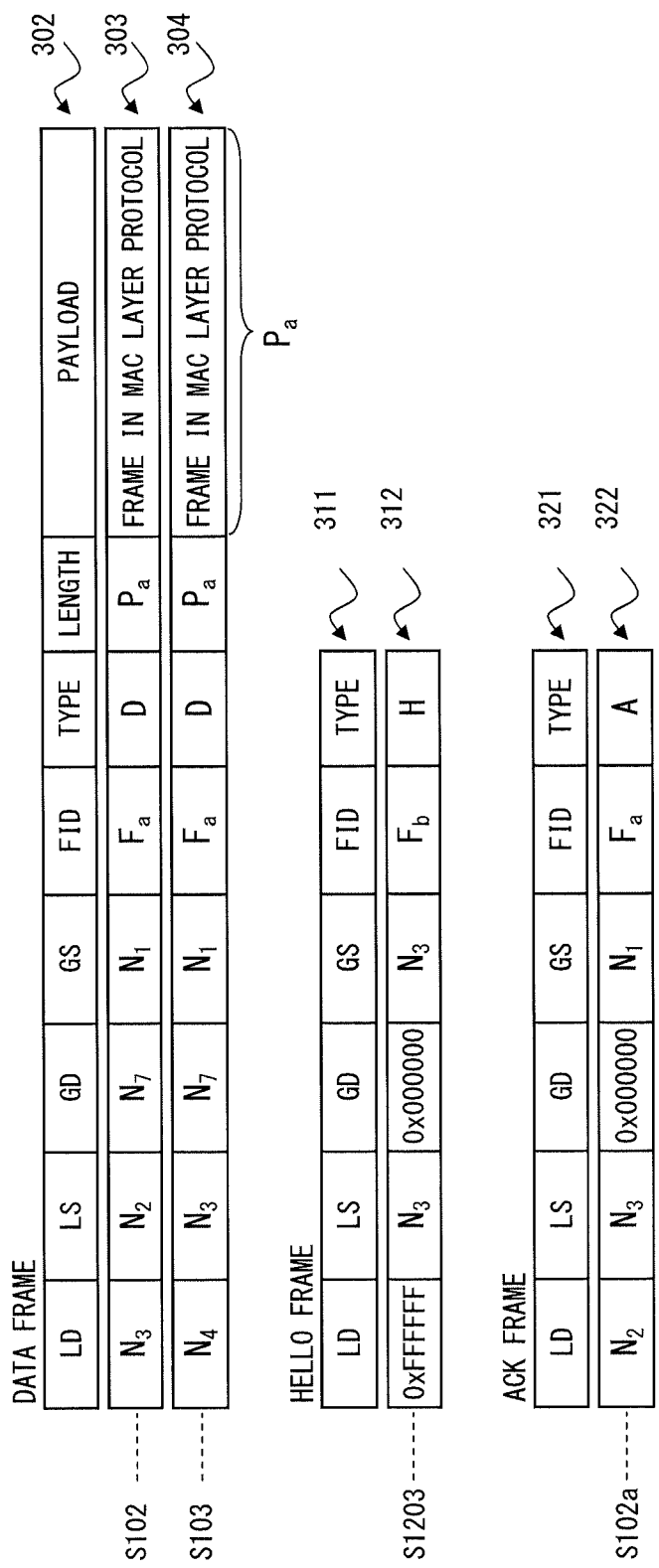
FIG. 7 is a diagram illustrating an example of a frame.

FIG. 7 is a diagram illustrating an example of a frame. The data frame in this embodiment includes, as a data frame 302 in FIG. 7, a header including each field for LD, LS, GD, GS, FID, type and length, and a payload. For example, the data frame 301 in FIG. 5 is in the same format as the data frame 302.

In the LD field, the LS field, the GD field and the GS field, the node ID of each node apparatus being the LD, LS, GD and GS of the data frame 302 are specified, respectively. In the FID field of the data frame 302, the FID generated and assigned to the data frame 302 by the node apparatus being the GS of the data frame 302 is specified.

In the type field of the data frame 302, a specified constant number indicating the type "data frame" is written. In the length field of the data frame 302, the length of the payload is specified. The payload of the data frame 302 is PDU of the protocol of a higher layer than the protocol in which the data frame 302 is defined.

For example, division of the MAC sublayer further into two sublayers virtually is assumed. The frame in this embodiment may be defined in the lower layer of the two virtual sublayers, that is, it may include PDU of another protocol (Ethernet and the like for example) defined in the MAC sublayer in the payload. In other words, the frame in this embodiment may be a frame that capsulate the Ethernet frame defined in the second layer. In this case, since the higher layer processing unit 111 is a processing unit that processes the Ethernet frame, it may be realized using a known MAC chip.

Hereinafter, for convenience of description, the payload of the data frame 302 is assumed to a frame of the protocol of the MAC layer (specifically, the Ethernet frame). However, of course, depending on the implementation, the payload of the data frame 302 may be PDU of a protocol defined in the network layer (the third layer) and above, or may be raw data that is irrelevant to any particular communication protocol. For example, the payload of the data frame 302 may be IP (Internet Protocol) datagram. In this case, the higher layer processing unit 111 is a processing unit to process the IP datagram.

While the format of the data frame 302 is as described above, it is illustrated in detail using specific values as data frames 303 and 304.

The data frame 303 is a data frame that the node apparatus $N_2$ transmits to the node apparatus $N_3$ in step S102 in FIG. 6. Specific contents of the data frame 303 are as follows.

In the LD field, the node ID (that is, $N_3$) of the node apparatus $N_3$ selected as the LD in transmission in step S102 is specified. In the LS field, the node ID (that is, $N_2$) of the node apparatus $N_2$ being the LS of in transmission in step S102 is specified.

In the GD field, the node ID (that is, $N_7$) of the node apparatus $N_7$ that the node apparatus $N_1$ being the GS specified at the time of transmission in step S101 is specified. In the GS field, the node ID (that is, $N_1$) of the node apparatus $N_1$ being the GS is specified.

In the FID field, the FID (hereinafter, referred to as $F_a$) that the node apparatus $N_1$ being the GS generated is specified. In the type field, a predetermined constant number D indicating the type "data frame" is specified. For example, the type may be expressed in two bits, as $D=(00)_2$.

In the length field, the length $P_a$ of the payload of the data frame 302 is specified. Meanwhile, the length may be expressed in units of bytes, or may be expressed in other units. As a payload, a frame in the MAC layer protocol (for example, the Ethernet frame) is included.

The data frame 304 in FIG. 7 is transmitted from the node apparatus $N_3$ to the node apparatus $N_4$ in step S103 in FIG. 6 upon receiving the data frame 303. Specific contents of the data frame 304 are as follows.

In the LD field, the node ID (that is, $N_4$) of the node apparatus $N_4$ which is selected as the LD in transmission in step S103 is specified. That is, upon forwarding, the node apparatus $N_3$ rewrites the LD field. In the LS field, the node ID (that is, $N_3$) of the node apparatus $N_3$ being the LS in transmission in step S103 is specified. That is, upon forwarding, the node apparatus $N_3$ rewrites the LS field, to set the own node ID.

Each field for the GD, GS, FID, type, length and contents of the payload are the same as the data frame 303 that the node apparatus $N_3$ received.

The HELLO frame in this embodiment has a header including each field for the LD, LS, GD, GS, FID and type as a HELLO frame 311 in FIG. 7, but has no payload. One example of the HELLO frame 311 is a HELLO frame 312. The HELLO frame 312 is transmitted by the node apparatus $N_3$ in step S1203 in FIG. 30 described later.

In the LD field of the HELLO frame 311, a special value indicating broadcast to all the node apparatuses adjacent to the node apparatus that transmits the HELLO frame 311 is specified. Note that "broadcast" here is "broadcast to all the adjacent node apparatuses", but it is not "flooding to the entire network 1".

Hereinafter, for convenient of description, it is assumed that the node ID is expressed in three bytes in this embodiment, and that "0x" represents a hexadecimal number. In addition, it is assumed that 0x000000 and 0xFFFFFF are reserved, and are not used as a normal node ID.

In the all HELLO frames in this embodiment, as illustrated with the HELLO frame 312, in the LD field, 0xFFFFFF is specified as a special value indicating broadcast to all the node apparatuses adjacent to the node apparatus that transmits the HELLO frame.

In the LS field of the HELLO frame 311, the node ID of the node apparatus that transmits the HELLO frame 311 is specified. Therefore, in the LS field of the HELLO frame 312 transmitted by the node apparatus $N_3$, the node ID of the node apparatus $N_3$ is specified.

In all the HELLO frames in this embodiment, a special value 0x000000 indicating null is specified in the GD field. This is because the HELLO frame is only used by the adjacent node apparatus and is not to be forwarded.

In the GS field of the HELLO frame 311, in the same manner as in the LS field, the node ID of the node apparatus that transmits the HELLO frame 311 is specified. Therefore, in the GS field of the HELLO frame 312, the node ID of the node apparatus $N_3$ is specified.

In the FID field of the HELLO frame 311, the FID that the node apparatus that transmits the HELLO frame 311 generated and assigned to the HELLO frame 311 is specified. Thus, in the FID field of the HELLO frame 312, the FID (hereinafter, referred to as $F_b$) that the node apparatus $N_3$ that transmits the HELLO frame 312 generated and assigned to the HELLO frame 312 is specified.

In the type field of the HELLO frame 311, a specified constant number indicating the type "HELLO frame" is written. For example, the type "HELLO frame" is represented by a specified constant number H as illustrated in the HELLO frame 312, which may be $H=(10)_2$ for example.

The ACK frame in this embodiment has a header including each field for the LD, LS, GD, GS, FID and type as the ACK frame 321 in FIG. 7, but has no payload. One example of the ACK frame 321 is an ACK frame 322. The ACK frame 322 is the ACK frame that the node apparatus $N_3$ returns to the node apparatus $N_2$ when the node apparatus $N_2$ transmits a data frame to the node apparatus $N_3$ in step S102 in FIG. 6. In FIG. 30 described later, return of the ASK frame 322 from the node apparatus $N_3$ to the node apparatus $N_2$ is presented as step S102a.

In the LD field of the ACK frame 321, the node ID of the adjacent node apparatus that transmitted the data that triggered the transmission of the ACK frame 321 is specified. Therefore, for example, in the LD field of the ACK frame 322, the node ID of the adjacent node apparatus $N_2$ is assigned, because the node apparatus $N_3$ transmits the ACK frame in response to the data frame from the node apparatus $N_2$.

In the LS field of the ACK frame 321, the node ID of the node apparatus that transmits the ACK frame 321 is specified. Therefore, in the LS field of the ACK frame 322 that the node apparatus $N_3$ transmits, the node ID of the node apparatus $N_3$ is specified.

In addition, since the ACK frame is not to be forwarded similar to the HELLO frame, in all the ACK frames in this embodiment, a special value 0x000000 indicating null is specified in the GD field.

In the GS field and the FID field of the ACK frame 321, the values of the GD field and the FID field of the data frame that triggered the transmission of the ACK frame 321 are copied. As described above, by the combination of the values of the GS field and the FID field, the data frame is uniquely identified in the network. Therefore, with the node apparatus that transmits the ACK frame copying the values from the received data frame, the node apparatus that receives the ACK frame 321 can identify which data frame the ACK frame 321 corresponds.

Therefore, in the ACK frame 322 transmitted in response to the data frame 303, for example, the values of the GS field and the FID field are the same as in the data frame 303, being $N_1$ and $F_a$, respectively.

In the type field of the ACK frame 321, a specified constant number indicating the type "ACK frame" is written. For example, the type "ACK frame" is represented by a specified constant number A as illustrated in the ACK frame 322, which may be $A=(11)_2$ for example.

The format of the frame illustrated in FIG. 7 is only an example, and according to the embodiment, the order of the arrangement of the fields included in the frame may be determined as needed, and the frame may include other fields that are not illustrated in the drawing. In addition, the frame may further include a trailer such as FCS (Frame Check Sequence).

Meanwhile, hereinafter, in order to simplify the description, when there is no concern for confusion, for example, the "LD field" may be referred to simply as "LD". The same applies to other fields.

FIG. 8 is a diagram illustrating an example of data stored in the buffer unit 109 in FIG. 3. The buffer unit 109 includes a plurality of entries that correspond respectively to individual data frames that the receiving unit 101 receives. Each entry includes a timeout time and a received data frame.

FIG. 8 illustrates an entry in the buffer unit 109-$N_3$ in the node apparatus $N_3$. When the node apparatus $N_3$ receives the data frame 303 in FIG. 7 from the node apparatus $N_2$ in step S102 of FIG. 6, an entry including a timeout time $TI_{3,j}$ and the data frame 303 is created in the buffer unit 109-$N_3$. Details of the creation of the entry in the buffer unit 109 are to be described later with FIG. 14. Meanwhile, the meaning of the timeout time $TI_{3,j}$ is as follows.

The node apparatus $N_3$ rewrites the header of the data frame 303 that is received in step S102 as the data frame 304 in FIG. 7 in step S103. Then, the node apparatus $N_3$ transmits the data frame 304 in step S103.

The timeout time $TI_{3,j}$ in FIG. 8 indicates reception of an ACK frame is to be waited until when after the node apparatus $N_3$ transmits the data frame 304. That is, if the node apparatus $N_3$ receives no ACK frame from the node apparatus $N_4$ by the timeout time $TI_{3,j}$, timeout occurs and the node apparatus $N_3$ determines that transmission of the data frame 304 to the node apparatus $N_4$ has failed.

Figure 22:
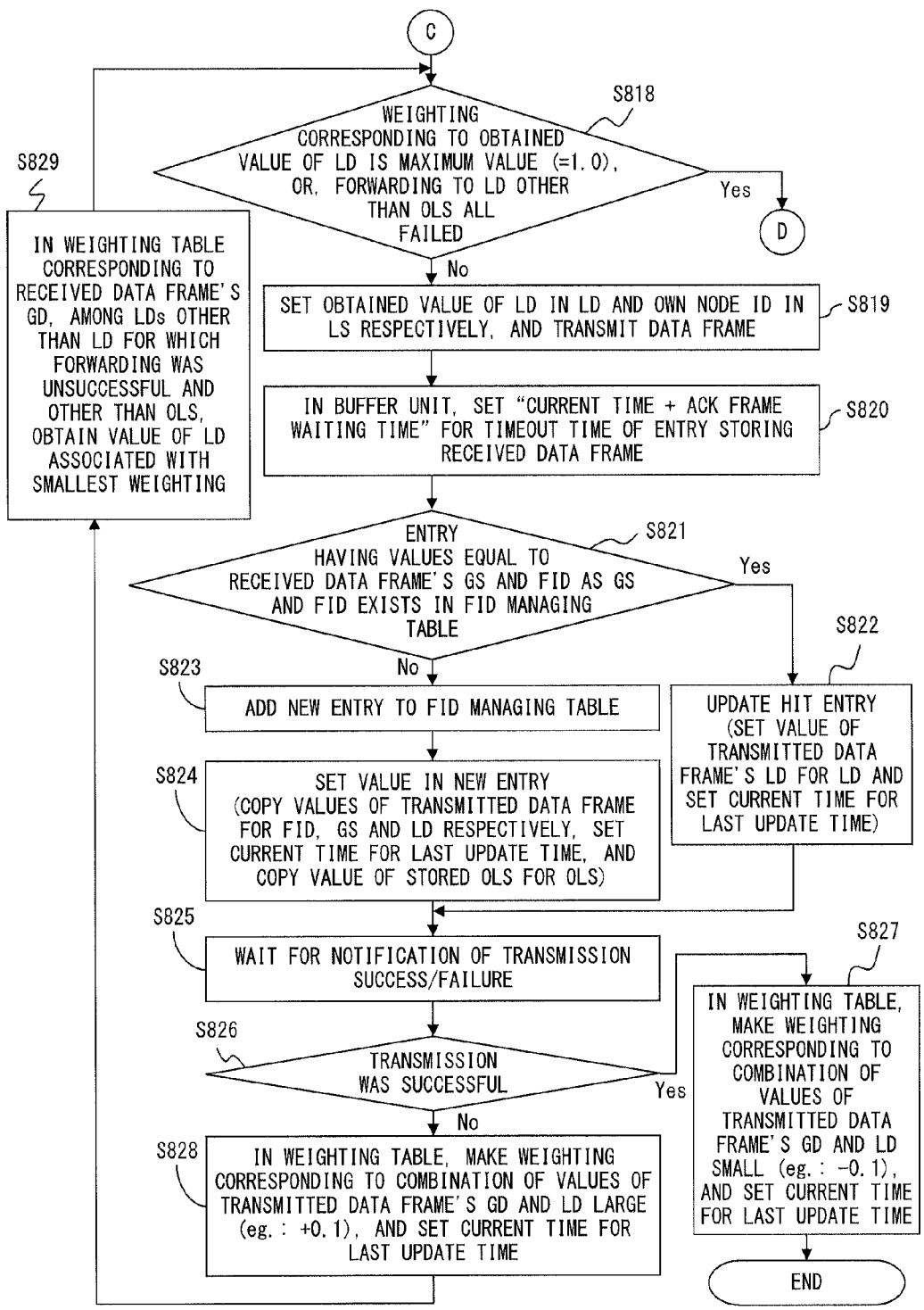
Figure 28:
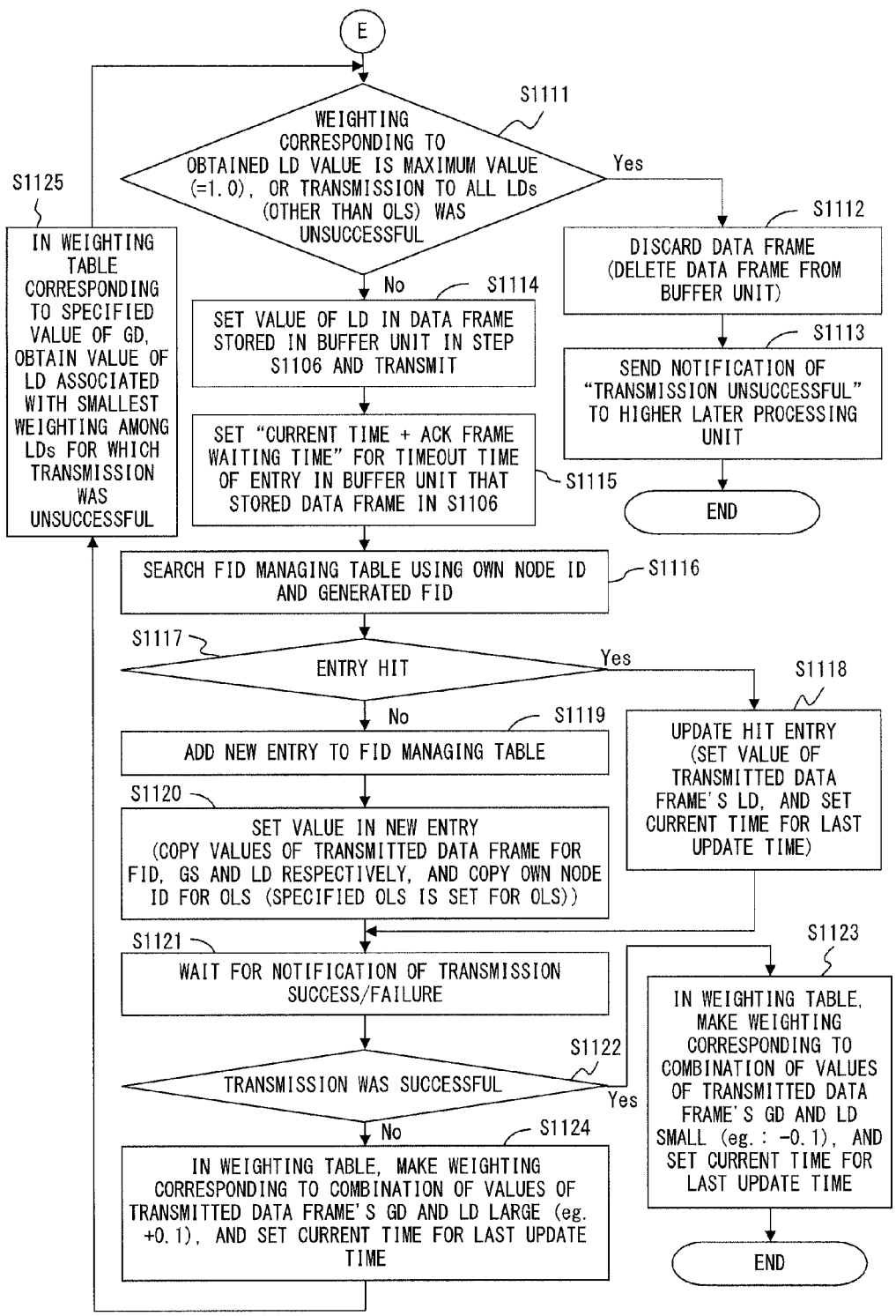

Meanwhile, while details are illustrated in FIG. 22, FIG. 26 and FIG. 28, the timeout time set in the buffer unit 109 may be overwritten. For example, the node apparatus $N_4$ that failed in transmission of the data frame to the node apparatus $N_7$ in step S104 in FIG. 6 updates the timeout time in the buffer unit 109-$N_4$ corresponding to the data frame received from the node apparatus $N_3$ in step S105. Specifically, the timeout time after the update represents until when the node apparatus $N_4$ is to wait for reception of an ACK frame for the data frame transmitted to the node apparatus $N_5$ in step S105.

FIG. 9 is a diagram illustrating an example of the adjacent node managing table 103 in FIG. 3. There are a node ID field and a last update time field in the adjacent node managing table 103.

For example, in the network 1 in FIG. 1, node apparatuses $N_1$, $N_3$, $N_5$ are adjacent to the node apparatus $N_2$. Therefore, the adjacent node managing table 103-$N_2$ of the node apparatus $N_2$ has three entries corresponding to the three adjacent node apparatuses $N_1$, $N_3$ and $N_6$, respectively. In the entry corresponding to the adjacent node apparatus $N_i$ (i=1, 3, 6), $N_i$ being the node ID of the adjacent node apparatus $N_i$ is stored in the node ID field, and a time $TA_{2,i}$ at which the entry was last updated is stored in the last update time field.

Meanwhile, in the network 1 in FIG. 1, node apparatuses $N_2$, $N_4$, $N_5$ are adjacent to the node apparatus $N_3$. Therefore, the adjacent node managing table 103-$N_3$ of the node apparatus $N_3$ has three entries corresponding to the three adjacent node apparatuses $N_2$, $N_4$, $N_5$, respectively. In the entry corresponding to the adjacent node apparatus $N_i$ (i=2, 4, 5), $N_i$ being the node ID of the adjacent node apparatus $N_i$ is stored in the node ID field, and a time $TA_{3,i}$ at which the entry was last updated is stored in the last update time field.

FIG. 10 is a diagram illustrating the weighting table 104 in FIG. 3. FIG. 10 illustrates, as an example, the weighting table 104-$N_3$ of the node apparatus $N_3$ in FIG. 1.

As illustrated in FIG. 3, the "weighting table 104" is a generic term for the plurality of weighting tables 104-1 through 104-M managed for each GD. Each weighting table 104-$i$ (1≤i≤M) stores information for corresponding GD.

Each weighting table 104-$i$ (1≤i≤M) has one or more entries, and each entry has a last update time field, an LD field and a weighting field. The last update time field stores the time at which the entry was last updated for learning weighting, the LD field stores the node ID of an adjacent node apparatus, and the weighting field stores the value of the weighting associated with the adjacent node apparatus.

In the example in FIG. 10, since the weighting table 104-1-$N_3$ is a table for transmitting a data frame to the node apparatus $N_7$ specified as the GD, it stores $N_7$ being the node ID of the node apparatus $N_7$ as the GD.

In addition, in the network 1 in FIG. 1, node apparatuses $N_2$, $N_4$, $N_5$ are adjacent to the node apparatus $N_3$. Therefore, the weighting table 104-1-$N_3$ has three entries corresponding to the three adjacent node apparatuses $N_2$, $N_4$, $N_5$, respectively. In the weighting table 104-1-$N_3$, contents of each entry corresponding to the adjacent node apparatus $N_i$ (i=2, 4, 5), are as follows.

In the last update time field, the last update time $TW_{3,7,i}$ of the entry is stored. In the LD field, $N_i$ being the node ID of the adjacent node apparatus $N_i$ is stored. In the weighting field, the weighting $W_{3,7,i}$ associated with the adjacent node apparatus $N_i$ is stored. The weighting $W_{3,7,i}$ is the weighting corresponding to the adjacent node apparatus $N_i$ that is referred to when the node apparatus $N_3$ transmits a data frame that specifies the node apparatus $N_7$ (that is, the GD corresponding to the weighting table 104-1-$N_3$) as the GD.

In the same manner, in example in FIG. 10, since the weighting table 104-2-$N_3$ is a table for transmitting a data frame to the node apparatus $N_4$ specified as the GD, it stores $N_4$ being the node ID of the node apparatus $N_4$ as the GD.

In addition, in the network 1 in FIG. 1, since node apparatuses $N_2$, $N_4$, $N_5$ are adjacent to the node apparatus $N_3$/the weighting table 104-2-$N_3$ also has three entries corresponding to the three adjacent node apparatuses $N_2$, $N_4$, $N_5$, respectively. In the weighting table 104-2-$N_3$, contents of each entry corresponding to the adjacent node apparatus $N_i$ (i=2, 4, 5), are as follows.

In the last update time field, the last update time $TW_{3,4,i}$ of the entry is stored. In the LD field, $N_i$ being the node ID of the adjacent node apparatus $N_i$ is stored. In the weighting field, the weighting $W_{3,4,i}$ associated with the adjacent node apparatus $N_i$ is stored. The weighting table 104-$N_3$ may further include a table 104-$j$-$N_3$ (j>2) associated with a yet another GD.

Meanwhile, the following point should be noted. That is, in the weighting table 104, as long as the GD is the same, even when a data frame with a different combination of the FID and GS is received, with every transmission, the weighting of the LD that became the transmission destination is updated. For example, at the time of transmitting a data frame, even if the weighting of a particular LD become larger for a link failure (the priority becomes smaller), if the link failure is recovered and transmission becomes successful shortly with transmission of another data frame (with the same GD and LD), the weighting of the LD becomes smaller (the priority becomes higher). On the contrary, it is also possible that if a plurality of different data frames (the GD and LD are the same) successively suffer transmission failure due to a link failure, even if the attempt is made only once for transmission of the data frame with the same combination of the FID and GS, the weighting of the LD becomes the maximum value.

Figure 11:
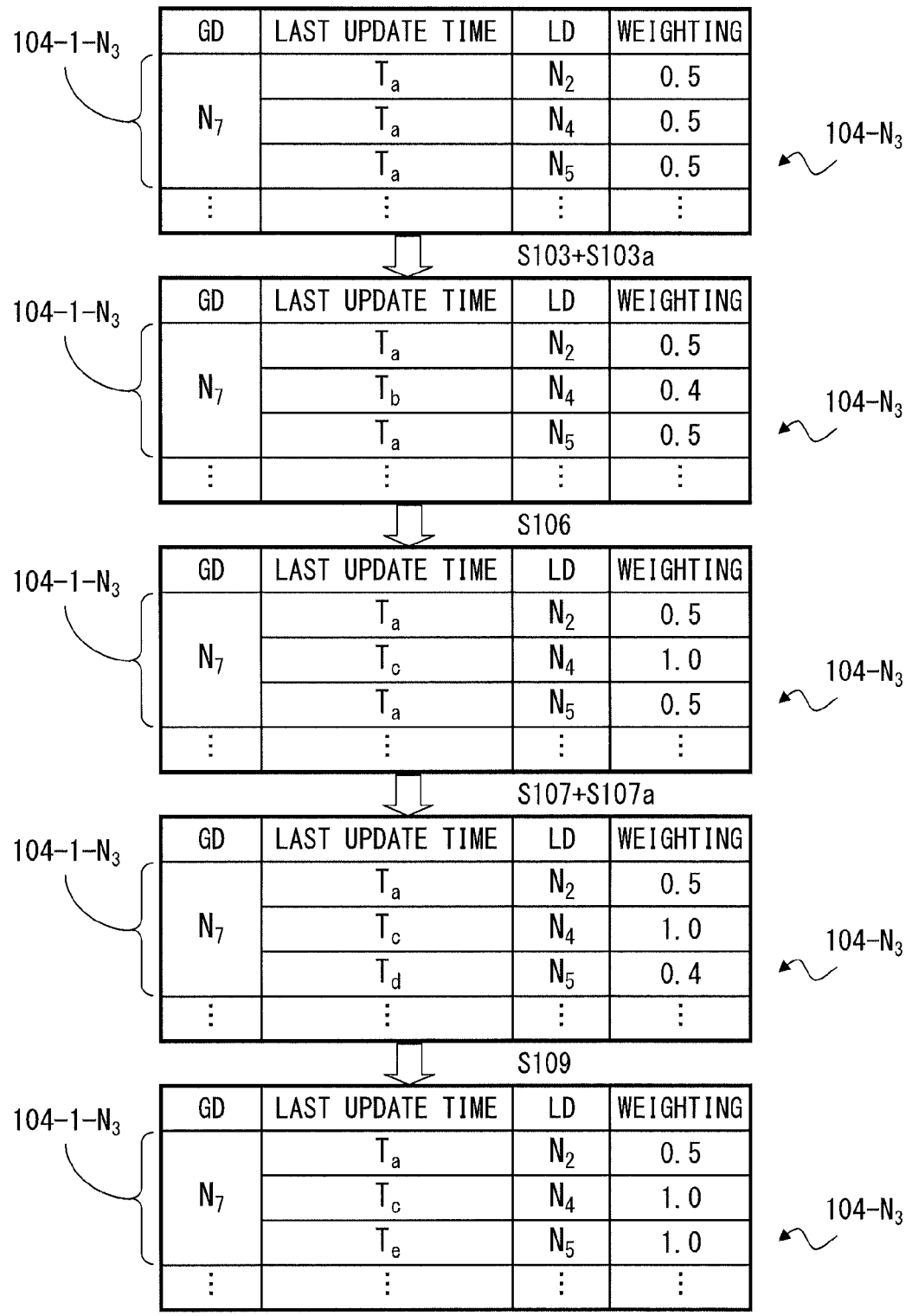
FIG. 11 is a diagram describing the change of the weighting table in FIG. 10.

FIG. 11 is a diagram describing change in the weighting table 104-1-$N_3$. In the example in FIG. 11, $T_a < T_b < T_c < T_d < T_e$.

For example, it is assumed that at the time when a data frame is received from the node apparatus $N_2$ in step S102 in FIG. 6, the weighting table 104-1-$N_3$ did not exist in the weighting table 104-$N_3$. Then, it is assumed that triggered by the reception in step S102, the new weighting table 104-1-$N_3$ with the following contents is created in the weighting table 104-$N_3$.

The last update times for the three entries are all the time $T_a$. In the three entries, the weightings $W_{3,7i}$ associated with the adjacent node apparatus $N_i$ (i=2, 4, 5) are all 0.5.

Meanwhile, regarding FIG. 6, to simplify the description, it was described that "of the two adjacent node apparatuses $N_4$ and $N_5$, the node apparatus $N_4$ is associated with a smaller weighting in the weighting table 104-1-$N_3$". That is, FIG. 10 and FIG. 11 are examples of $h_3=1$, and $W_{3,7,4} < W_{3,7,5}$ is assumed in the description of FIG. 6.

However, as illustrated in FIG. 11 for example, there may be a case where $W_{3,7,2} = W_{3,7,4} = W_{3,7,5} = 0.5$. In the example in FIG. 11, since the node apparatuses $N_4$ and $N_5$ are associated with the equal weighting 0.5, the node apparatus $N_3$ can select either of the node apparatuses $N_4$ and $N_5$ as the LD for the transmission in step S103, but tentatively, it is supposed that the node apparatus $N_4$ was selected as the LD in the same manner as in the example in FIG. 6.

In step S103, the node apparatus $N_3$ transmits the data frame to the node apparatus $N_4$. After that, when the node apparatus $N_4$ transmits the ACK frame to the node apparatus $N_3$ as illustrated as step S103a in FIG. 30, the node apparatus $N_3$ recognizes that the transmission of the data frame to the node apparatus $N_4$ was successful.

Then, in the same manner as in the example in FIG. 5, the node apparatus $N_3$ reduces the value $W_{3,7,4}$ associated with the node apparatus $N_4$. In the example in FIG. 11, the node apparatus $N_3$ updates the value of $W_{3,7,4}$ from 0.5 to 0.4. In addition, the node apparatus $N_3$ sets the current time $T_b$ in the last update time field of the entry corresponding to the node apparatus $N_4$.

After that, as illustrated in FIG. 6, the node apparatus $N_3$ receives the same data frame as the one that the node apparatus $N_3$ transmitted in step S106. As a result, as described regarding FIG. 6, the node apparatus $N_3$ updates the value of $W_{3,7,4}$ associated with the node apparatus $N_4$ in the weighting table 104-1-$N_3$ from 0.4 to the maximum value 1.0. In addition, the node apparatus $N_3$ sets the current time $T_c$ in the last update time field of the entry corresponding to the node apparatus $N_4$.

Next, as illustrated as step S107 in FIG. 6, the node apparatus $N_3$ selects the node apparatus $N_5$ as the LD and transmits the data frame to the node apparatus $N_5$. After that, when the node apparatus $N_5$ transmits an ACK frame to the node apparatus $N_3$ as illustrated as step S107a in FIG. 30, the node apparatus $N_3$ recognizes that the transmission of the data frame to the node apparatus $N_5$ was successful.

Then, in the same manner as in the example in FIG. 5, the node apparatus $N_3$ reduces the value of the weighting $W_{3,7,5}$ associated with the node apparatus $N_5$. In the example in FIG. 11, the node apparatus $N_3$ updates the value of $W_{3,7,5}$ from 0.5 to 0.4. In addition, the node apparatus $N_3$ sets the current time $T_d$ in the last update time field of the entry corresponding to the node apparatus $N_5$.

After that, as illustrated in FIG. 6, the node apparatus $N_3$ receives the same data frame as the one that the node apparatus $N_3$ transmitted in step S109. As a result, as described regarding FIG. 6, the node apparatus $N_3$ updates the value of $W_{3,7,5}$ associated with the node apparatus $N_5$ in the weighting table 104-1-$N_3$ from 0.4 to the maximum value 1.0. In addition, the node apparatus $N_3$ sets the current time $T_e$ in the last update time field of the entry corresponding to the node apparatus $N_5$.

As described above, the weighting table 104-1-$N_3$ is updated with reception of an ACK frame as a trigger, or with reception of the same data frame as an already-transmitted data frame as a trigger.

FIG. 12 and FIG. 13 are diagrams illustrating an example of the FID managing table 105 in FIG. 3. As illustrated in FIG. 12 and FIG. 13, there is each field for the FID, GS, LD, OLS and the last update time, The FID field and the GS field in the FID managing table 105 are fields for identifying the data frame uniquely, in which the values are copied respectively from the FID field and the GS field of the received data frame.

In the LD field of the FID managing table 105, in order to transmit the data frame identified by the values of the FID field and the GS field, the node ID of the adjacent node apparatus last selected as the LD is stored.

In the OLS field of the FID managing table 105, the node ID of the adjacent node apparatus that was specified in the LS field of the data frame when the data frame identified by the values of the FID field and the GS field was first received. The OLS field is also used for eliminating the OLS from candidates for the LD in selecting the LD for forwarding the data frame, and is also used for determining the LD at the time of the backtracking operation.

In the last update time field of the FID managing table 105, the time at which the entry was last updated is stored.

FIG. 12 and FIG. 13 illustrate the FID managing table 105 of each node apparatus in steps S101-S112 in FIG. 6. Hereinafter, the time at which steps S101-S112 are respectively performed is presented as $TF_{101}$-$TF_{112}$.

When the node apparatus $N_1$ transmits the data frame to the node apparatus $N_2$ in step S101, the node apparatus $N_1$ creates a new entry $E_1$ in the FID managing table 105-$N_1$. Then, the node apparatus $N_1$ sets the values of the FID and GS of the transmitted data frame in the FID field and the GS field of the entry $E_1$.

Here, the values of the GS and FID of the data frame are not written while the data frame is forwarded in the network 1, as described above. Therefore, the values of the FID and GS of the data frame transmitted in the network 1 in steps S101-S112 in FIG. 6 are $F_a$ and $N_1$ respectively, in the same manner as the data frames 303 and 304 in FIG. 7. Therefore, at step S101 the node apparatus $N_1$ sets the FID field and the GS field of the entry $E_1$ with the value of $F_a$ and $N_1$, respectively.

The values that other node apparatuses respectively set in the FID field and the GS field of the entry in the FID managing table 105 during steps S102-S112 are also $F_a$ and $N_1$. Therefore, hereinafter, description about the FID field and the GS field is omitted.

In step S101, the node apparatus $N_1$ sets the node ID of the node apparatus $N_2$ selected as the LD in the LD field of the entry $E_1$.

Incidentally, for a particular data frame identified uniquely by the combination of the values of the GS and FID, the OLS is the adjacent node apparatus identified by the node ID specified in the LS of the particular data frame at the time when the particular data frame was first received.

However, when the OLS is defined as described above, in a case for example in which the node apparatus $N_1$ transmits a data frame with itself being the GS, for the node apparatus $N_1$ itself, the OLS becomes undefined for the transmitted data frame. Therefore, hereinafter, the definition of the OLS is expanded. Specifically, it is defined that "when the node apparatus $N_i$ transmits a data frame with itself being the GS, the OLD for the node apparatus $N_i$ for the data frame is the node apparatus $N_i$ itself.

In other words, the OLS is the node apparatus recognized as the origin of the data frame for the node apparatus $N_i$ within the range of the network that the node $N_i$ directly recognizes. Meanwhile, the "range of the network that the node $N_i$ directly recognizes" here is the range of one hop from the node apparatus $N_i$, which includes only the node apparatus $N_i$ itself and the adjacent nodes of the node apparatus $N_i$. For example, in the example in FIG. 2, only the range of the network that the node apparatus $N_{105}$ directly recognizes is indicated with a solid line.

According to the expanded definition of the OLS above, the value that the node apparatus $N_1$ sets in the OLS field of the entry $E_1$ in step S101 is the node ID (that is, $N_1$) of the node apparatus $N_1$ itself. If the node apparatus $N_1$ receives a data frame with the value of GS being $N_1$ and the value of the FID being $F_a$ afterwards, it may recognize that "the data frame that the node apparatus $N_1$ previously transmitted has been received", based on the entry $E_1$ created as described above.

In addition, in step S101, the node apparatus $N_1$ sets the current time $TF_{101}$ in the last update time field of the entry $E_1$. Meanwhile, the value that other node apparatuses set in the last update time field of the entry of the FID managing table 105 of each is, in the same manner, the time $TF_{102}$-$TF_{112}$ at which each step S102-S112 are performed. Therefore, hereinafter, description about the last update time field is also omitted.

The node apparatus $N_2$ that received the data frame from the node apparatus $N_1$ creates a new entry $E_2$ in the FID managing table 105-$N_2$ in step S102, when it transmits the data frame to the node apparatus $N_3$. In the entry $E_2$, the node apparatus $N_2$ sets $N_1$ in the OLS field and $N_3$ in the LD field.

The node apparatus $N_3$ that received the data frame from the node apparatus $N_2$ creates a new entry $E_3$ in the FID managing table 105-$N_3$ in step S103, when it transmits the data frame to the node apparatus $N_4$. In the entry $E_2$, the node apparatus $N_3$ sets $N_2$ in the OLS field and $N_4$ in the LD field.

The node apparatus $N_4$ that received the data frame from the node apparatus $N_3$ creates a new entry $E_4$ in the FID managing table 105-$N_4$ in step S104, when it transmits the data frame to the node apparatus $N_7$. In the entry $E_4$, the node apparatus $N_4$ sets $N_3$ in the OLS field and $N_7$ in the LD field.

However, the transmission in step S104 fails due to the link failure in the link between the node apparatuses $N_4$ and $N_7$. That is, timeout occurs in the node apparatus $N_4$ because it does not receive an ACK frame from the node apparatus $N_7$. As a result, in step S105, the node apparatus $N_4$ selects another adjacent node apparatus $N_5$ as the next LD, and transmits the data frame to the node apparatus $N_5$.

Here, the data frames transmitted respectively in steps S104 and S105 are the same data frames as their value of FID is $F_a$ and their value of GS is $N_1$. Therefore, in step S105, the node apparatus $N_4$ does not create a new entry but updates the existing entry $E_4$.

Specifically, in step S105, the node apparatus $N_4$ overwrites the value of the LD field in the entry $E_4$ with $N_5$. Meanwhile, no matter how many times the node apparatus $N_4$ transmits the same data frame with the value of the GS being $N_1$ and the value of the FID being $F_a$, the fact that "it was from the node apparatus $N_3$ that the node apparatus $N_4$ first received the data frame" is unchanged. Therefore, the value of the OLS field of the entry $E_4$ is not to be rewritten, and remains $N_3$.

The node apparatus $N_5$ that received the data frame from the node apparatus $N_4$ in step S105 creates a new entry $E_5$ in the FID managing table 105-$N_5$ in step S106, when it transmits the data frame to the node apparatus $N_3$. In the entry $E_5$, the node apparatus $N_5$ sets $N_4$ in the OLS field and $N_3$ in the LD field.

The node apparatus $N_3$ that receives the data frame from the node apparatus $N_5$ in step S106 searches the FID managing table 105-$N_3$ with the values of the GS and FID of the received data frame, and finds the entry $E_3$. Since the entry $E_3$ is found, the node apparatus $N_3$ recognizes that "the same data frame that the node apparatus $N_3$ transmitted previously in step S103 was received in step S106".

Therefore, upon transmitting the data frame to the node apparatus $N_5$ in step S107, the node apparatus $N_3$ does not create a new entry in the FID managing table 105-$N_3$ but updates the existing entry $E_3$. Specifically, in step S107, the node apparatus $N_3$ overwrites the value of the LD field with $N_5$ in the entry $E_3$. Meanwhile, the value of the OLS field of the entry $E_3$ is not to be rewritten and remains $N_2$.

The node apparatus $N_5$ that receives the data frame from the node apparatus $N_3$ in step S107 searches the FID managing table 105-$N_3$ with the values of the GS and FID of the received data frame, and finds the entry $E_5$. Since the entry $E_5$ is found, the node apparatus $N_5$ recognizes that "the same data frame that the node apparatus $N_5$ transmitted previously in step S106 was received in step S107".

Therefore, upon transmitting the data frame to the node apparatus $N_4$ in step S108, the node apparatus $N_5$ does not create a new entry in the FID managing table 105-$N_5$ but updates the existing entry $E_5$. Specifically, in step S108, the node apparatus $N_5$ overwrites the value of the LD field with $N_4$ in the entry $E_5$. Meanwhile, the value of the OLS field of the entry $E_5$ is not to be rewritten and remains $N_4$.

The node apparatus $N_4$ that receives the data frame from the node apparatus $N_5$ in step S108 searches the FID managing table 105-$N_4$ with the values of the GS and FID of the received data frame, and finds the entry $E_4$. Since the entry $E_4$ is found, the node apparatus $N_4$ recognizes that "the same data frame that the node apparatus $N_4$ transmitted previously in step S105 was received in step S108".

Therefore, upon transmitting the data frame to the node apparatus $N_3$ in step S108, the node apparatus $N_4$ does not create a new entry in the FID managing table 105-$N_4$ but updates the existing entry $E_4$. Specifically, in step S109, the node apparatus $N_4$ overwrites the value of the LD field with $N_3$ in the entry $E_4$. Meanwhile, the value of the OLS field of the entry $E_4$ is not to be rewritten and remains $N_3$.

The node apparatus $N_3$ that receives the data frame from the node apparatus $N_4$ in step S109 searches the FID managing table 105-$N_3$ with the values of the GS and FID of the received data frame, and finds the entry $E_3$. Since the entry $E_3$ is found, the node apparatus $N_3$ may recognize that "the same data frame that the node apparatus $N_3$ transmitted previously in step S103 was received in step S109".

Therefore, upon transmitting the data frame to the node apparatus $N_2$ in next step S110, the node apparatus $N_3$ does not create a new entry in the FID managing table 105-$N_3$ but updates the existing entry $E_3$. Specifically, in step S110, the node apparatus $N_3$ overwrites the value of the LD field with $N_2$ in the entry $E_3$. Meanwhile, the value of the OLS field of the entry $E_3$ is not to be rewritten and remains $N_2$.

The node apparatus $N_2$ that receives the data frame from the node apparatus $N_3$ in step S110 searches the FID managing table 105-$N_2$ with the values of the GS and FID of the received data frame, and finds the entry $E_2$. Since the entry $E_2$ is found, the node apparatus $N_2$ recognizes that "the same data frame that the node apparatus $N_2$ transmitted previously in step S102 was received in step S110".

Therefore, upon transmitting the data frame to the node apparatus $N_6$ in step S111, the node apparatus $N_2$ does not create a new entry in the FID managing table 105-$N_2$ but updates the existing entry $E_2$. Specifically, in step S111, the node apparatus $N_2$ overwrites the value of the LD field with $N_6$ in the entry $E_2$. Meanwhile, the value of the OLS field of the entry $E_2$ is not to be rewritten and remains $N_1$.

The node apparatus $N_6$ that receives the data frame from the node apparatus $N_2$ in step S111 creates a new entry $E_6$ upon transmitting the data frame to the node apparatus $N_7$ in step S112. In the entry $E_6$ the node apparatus $N_6$ sets $N_2$ in the OLS field and $N_7$ in the LD field.

Next, details of the operation of the node apparatus 100 are described with reference to the flowcharts in FIG. 14-FIG. 29.

Figure 14:
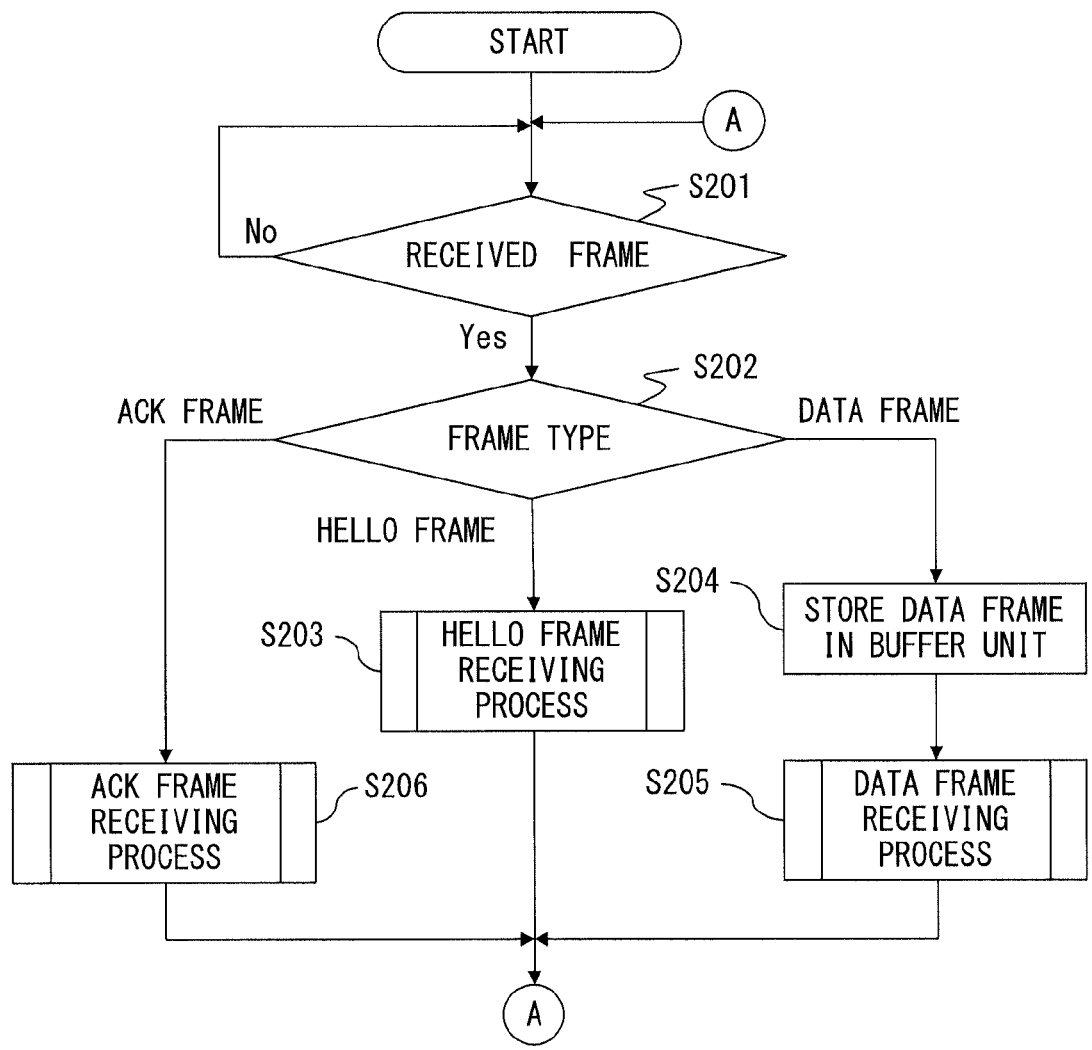
FIG. 14 is a flowchart of a frame reception process.

FIG. 14 is a flowchart of a frame reception process. The frame reception process starts when the power of the node apparatus 100 is turned on.

In step S201, the receiving unit 101 waits until it receives a frame. That is, if it has not received a frame, the receiving unit 101 repeats the step S201. When it receives a frame, the receiving unit 101 outputs the received frame to the frame branching processing unit 106, and the process moves to step S202.

In step S202, the frame branching processing unit 106 refers to the value of the type field of the frame received by the receiving unit 101 in step S201, and judges the type of the frame. When the type of the received frame is the HELLO frame, the process shifts to step S203, and when it is the data frame, the process moves to step S204, and when it is the ACK frame, the process moves to step S206.

Figure 15:
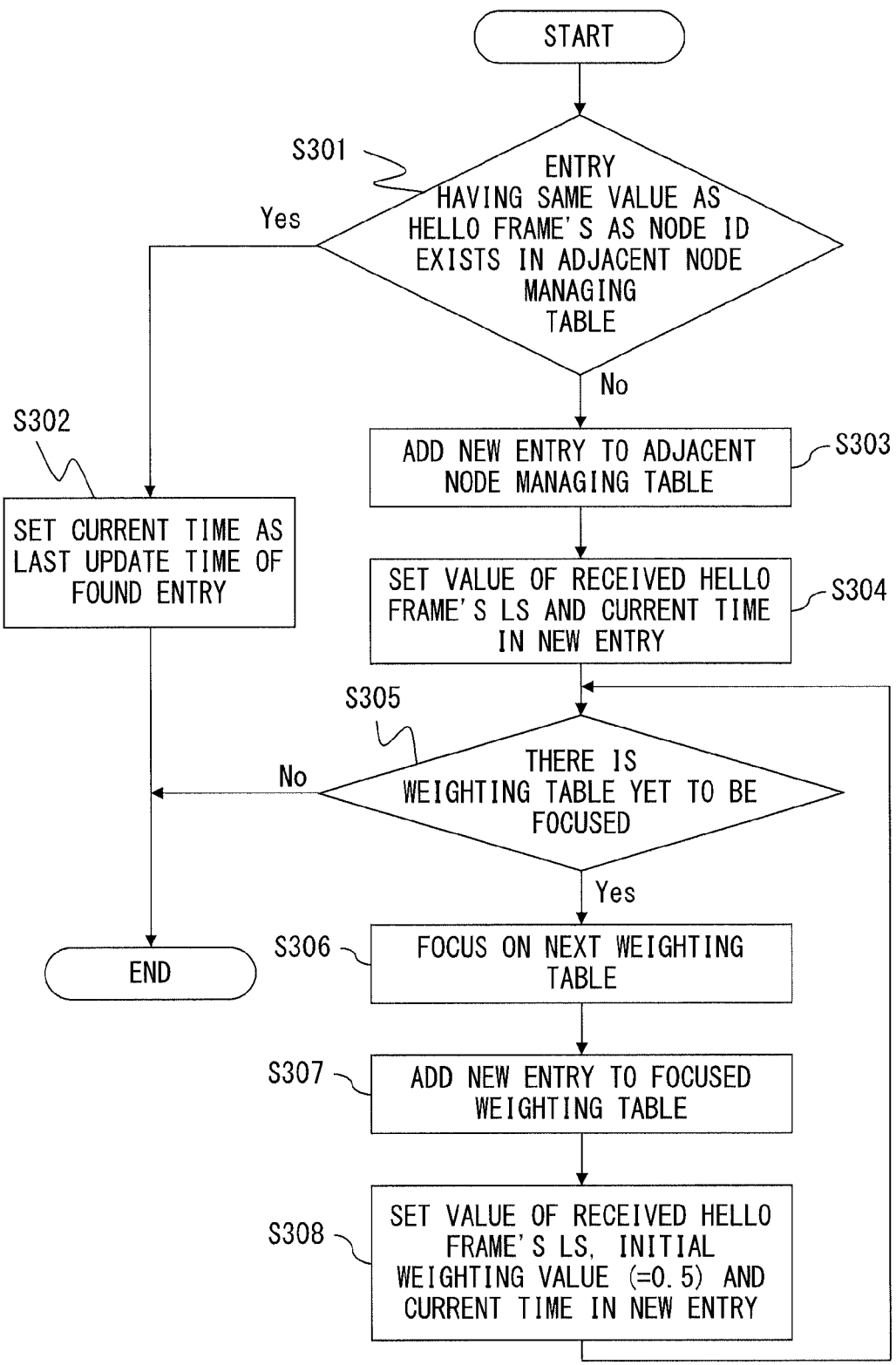
FIG. 15 is a flowchart of a HELLO frame reception process in step S203 in FIG. 14.

In step S203, the frame branching processing unit 106 outputs the received HELLO frame to the link managing unit 108, and the link managing unit 108 performs a HELLO frame reception process in FIG. 15. Then, the process returns to step S201. In a multi-task environment where the MPU 201 in FIG. 4 executes a plurality of tasks corresponding to each function element in FIG. 3 in parallel, once the frame branching processing unit 106 outputs a HELLO frame, the process may shift to step S201 without waiting for the completion of the HELLO frame reception process.

In step S204, the frame branching processing unit 106 stores the data frame received in step S201 in the buffer unit 109. That is, the frame branching unit 106 prepares an area for a new entry in the buffer unit 109, and stores the data frame received in step S201 in the prepared area. In addition, the frame branching processing unit 106 obtains and stores the values of the GS and FID from the data frame, for step S205. Note that, as in FIG. 8, the buffer unit 109 has a timeout time field, but the timeout time is not set yet at step S204.

In step S205, the frame branching processing unit 106 instructs the data frame processing unit 110 to perform a data frame reception process. Upon the instruction, the frame branching processing unit 106 feds the values of the GS and FID of the data frame stored in step S204 to the data frame processing unit 110.

Meanwhile, if the node apparatus 100 is an apparatus that does not become the GS (that is, an apparatus dedicated for relaying), the data frame reception processing is as in FIGS. 20-23. On the other hand, if the node apparatus 100 is an apparatus that can become the GS, the data frame reception process is as in FIGS. 20-22, 29.

After the data frame processing 110 performs the data frame reception process according to the instruction, the process returns to step S201. In a multi-task environment, once the frame branching processing unit 106 instructs the data frame processing unit 110 to perform the data frame reception process, the process may shift to step S201 without waiting for the completion of the data frame reception process.

Figure 25:
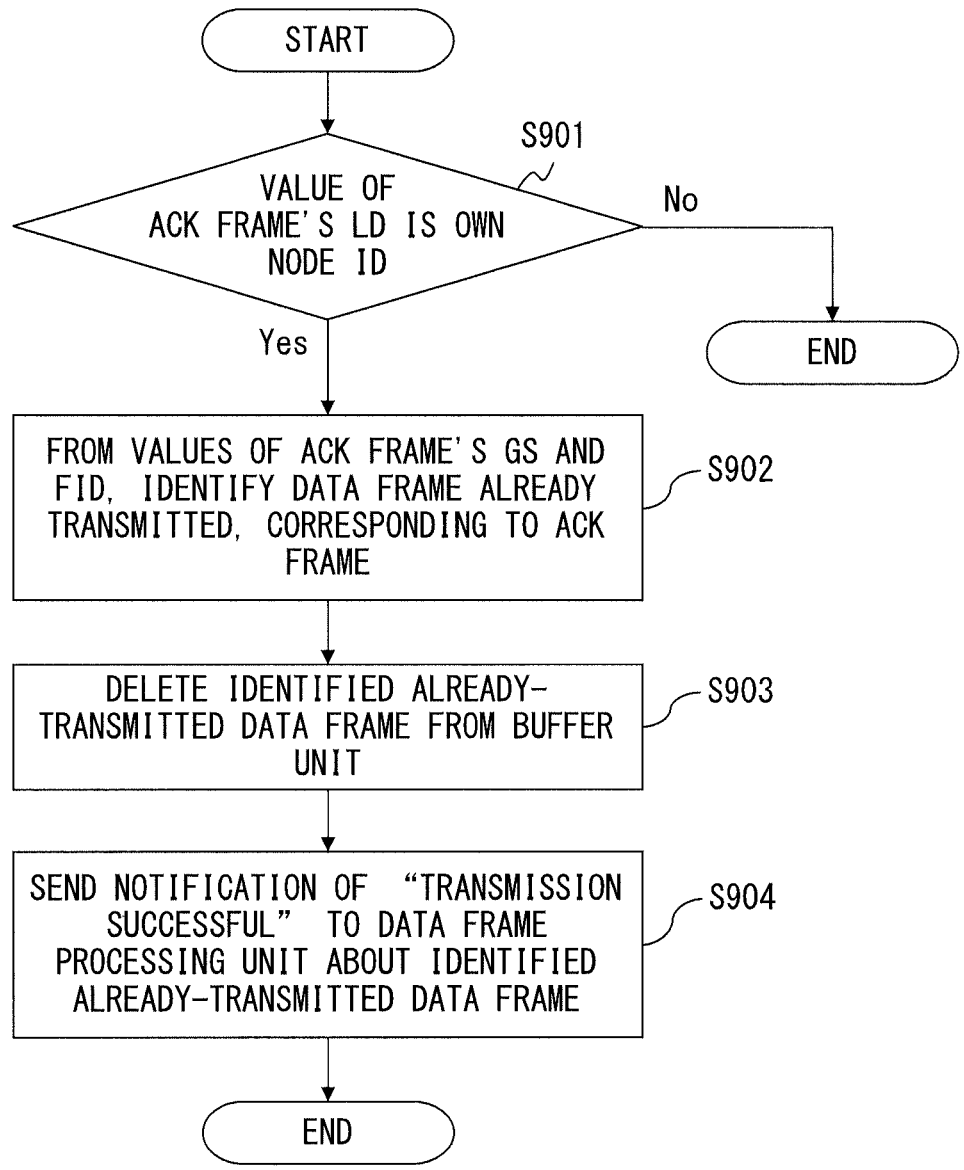
FIG. 25 is a flowchart of an ACK frame reception process in step S206 in FIG. 14.

In step S206, the frame branching processing unit 106 outputs the received ACK frame to the ACK processing unit 107, and the ACK processing unit 107 performs an ACK frame reception process in FIG. 25. Then, the process returns to step S201. In a multi-task environment, once the frame branching processing unit 106 outputs the ACK frame, the process may shift to step S201 without waiting for the completion of the ACK frame reception process.

FIG. 15 is a flowchart of a HELLO frame reception process in step S203 in FIG. 14. The process in FIG. 15 starts when the HELLO frame is output from the frame branching processing unit 106 to the link managing unit 108.

In step S301, the link managing unit 108 determines whether or not an entry having the same value as the LS of the received HELLO frame as the node ID exists in the adjacent node managing table 103 (see FIG. 9). The process moves to step S302 if the entry is found, and to step S303 if the entry is not found.

The "received HELLO frame" in the description of FIG. 15 is a HELLO frame that the receiving unit 101 received in step S201 in FIG. 14. That is, the "received HELLO frame" in the description of FIG. 15 is the HELLO frame that the frame branching processing unit 106 outputs to the link managing unit 108 in step S202 and triggered the start of the process in FIG. 15.

In step S302, the link managing unit 108 sets the current time as the last update time of the entry found in step S301. Then, the process in FIG. 15 is terminated. For example, as a result of step S302 performed in the node apparatus N2, as in FIG. 9, in the adjacent node managing table 103-$N_2$, the value of the last update time field corresponding to the node ID $N_1$ is updated to $TA_{2,1}$. As a result, the node apparatus $N_2$ memorizes that "at time $TA_{2,1}$, the node apparatus $N_2$ could recognize the node apparatus $N_1$ as the adjacent node apparatus".

On the other hand, if corresponding entry is not found in step S301, it means that the HELLO frame has been received from a new node apparatus that has not been recognized as an adjacent node apparatus. Therefore, a process to register the new node apparatus as the adjacent node apparatus is performed in steps S303-S308.

In step S303, the link managing unit 108 adds a new entry in the adjacent node managing table 103. In step S304, the link managing unit 108 sets the value of the LS of the received HELLO frame and the current time in the new entry added in step S303. For example, when the HELLO frame 312 in FIG. 7 is first received, the node apparatus $N_2$ sets $N_3$ being the value of the LS of the HELLO frame 312 in the node ID field of the new entry, and sets the current time in the last update time field of the new entry.

In step S305, the link managing unit 108 determines whether or not there is a weighting table 104-$i$ ($1 \leq i \leq M$) that is yet to be focused, among the weighting tables 104-1 through 104-M (see FIG. 10 and FIG. 11). If all the weighting tables 104-1 through 104-M have been focused already, the process in FIG. 15 is terminated. However, if there is any weighting table 104-$i$ yet to be focused, the process moves to step S306.

In step S306, the link managing unit 108 focuses on anew weighting table that has not been focused among the weighting tables 104-1 through 104-M. Hereinafter, for convenience of description, it is assumed that the weighting table 104-$i$ focused in step S306.

In step S307, the link managing unit 108 adds a new entry to the focused weighting table 104-$i$. Further, in step S308, the link managing unit 108 sets the LS of the received HELLO frame, the initial weighting value and the current time in the LD, weighting, last update time fields, respectively, of the added new entry. The initial weighting value is a constant number that is determined arbitrarily according to the embodiment.

In this embodiment, the value of the weighting is equal to or larger than 0 and equal to or smaller than 1. However, 1 is a special value indicating unavailability for selection as the LD. Thus, the initial weighting value may be any value equal to or larger than 0 and smaller than 1. As an example, the initial weighting value may be 0.5.

For example, the first entry of the weighting table 104-1-N₃ illustrated in the top of FIG. 11 may be created as follows (however, to be precise, in that case, a different value from the last update time Ta for the two other entries is set as the last update time of the first entry, and it does not become completely the same as FIG. 11).

(1) The weighting table 104-1-N₃ associated with the node apparatus N7 as the GD already exists.
(2) However, the node apparatus N₃ has not recognized the node apparatus N2 as an adjacent node apparatus.
(3) The node apparatus N₃ receives the HELLO frame for the first time from the node apparatus N₂.
(4) In the above situation, the 104-1-N₃ is focused in step S306.
(5) Therefore, in step S308, N₂ being the value of the LS of the received HELLO frame is set in the LD field of the new entry, and 0.5 being the initial weighting value is set in the weighting field of the new entry.

After step S308 is performed, the process returns to step S305.

FIG. 16 is a flowchart of a HELLO frame transmission process. The process in FIG. 16 is performed by the HELLO frame generating unit 112 independently from and in parallel to the process in FIG. 14. For example, the HELLO frame generating unit 112 starts the process in FIG. 16 when the power of the node apparatus 100 is turned on.

In step S401, the HELLO frame generating unit 112 determines whether or not the current time is the scheduled transmission time. If the current time is the scheduled transmission time, the process moves to step S402, and if the current time is not the scheduled transmission time, the process returns to step S401. That is, the HELLO frame generating unit 112 waits until the scheduled transmission time.

For example, a reference time $T_{ref}$ and a transmission interval $\Delta T_{hello}$ of HELLO frames may be specified in advance. In addition, the HELLO frame generating unit 112 may refer to the current time $T_{now}$ based on the clock of the MPU 201 in FIG. 4 for example. The HELLO frame generating unit 112 may determine that "the current time is the scheduled transmission time" only when Z in expression (4) is an integer.

$$Z=(T_{ref}-T_{now})/\Delta T_{hello} \quad (4)$$

For example, the reference time $T_{ref}$ may be a predetermined constant number, or may be the time when the power of the node apparatus 100 is turned on. In addition, the transmission interval $\Delta T_{hello}$ may be determined as needed depending on the embodiment, and may be a relatively long period of time such as 10 seconds.

In step S402, the HELLO frame generating unit 112 requests the FID generating unit 113 to generate a new FID, and the FID generating unit 113 generates a new FID. For example, the FID may be a sequence number, and the FID generating unit 113 may be realized using a counter circuit. The FID generating unit 113 may also be realized by the MPU 201 executing a program.

In step S402, further, the HELLO frame generating unit 112 generates a HELLO frame using the FID generated by the FID generating unit 113. For example, the HELLO frame 312 in FIG. 7 is generated as follows. That is, the FID generating unit 113-N₃ of the node apparatus N₃ generates a value $F_b$ as a new FID. Then, the HELLO frame generating unit 112-N₃ of the node apparatus N₃ generates a new HELLO frame 312.

At that time, the HELLO frame generating unit 112-N₃ sets a specified value 0xFFFFFF in the LD in the HELLO frame 312, sets N₃ being the own node ID in the LS and GS, and sets a specified value 0x000000 in the GD. In addition, the HELLO frame generating unit 112-N₃ sets the value $F_b$ generated by the FID generating unit 113-N₃ in the FID in the HELLO frame 312, and sets a specified value H in the type.

When the HELLO frame is generated in S402 as described above, next, in step S403, the HELLO frame generating unit 112 requests the transmitting unit 102 to transmit the generated HELLO frame, and the transmission unit 102 transmits the HELLO frame. Then, the process returns to step S401.

Next, the aging processes for various tables are described with reference to FIG. 17-FIG. 19. Each aging process may start being triggered for example by an interrupt signal from the timer IC 203 in FIG. 4.

Figure 17:
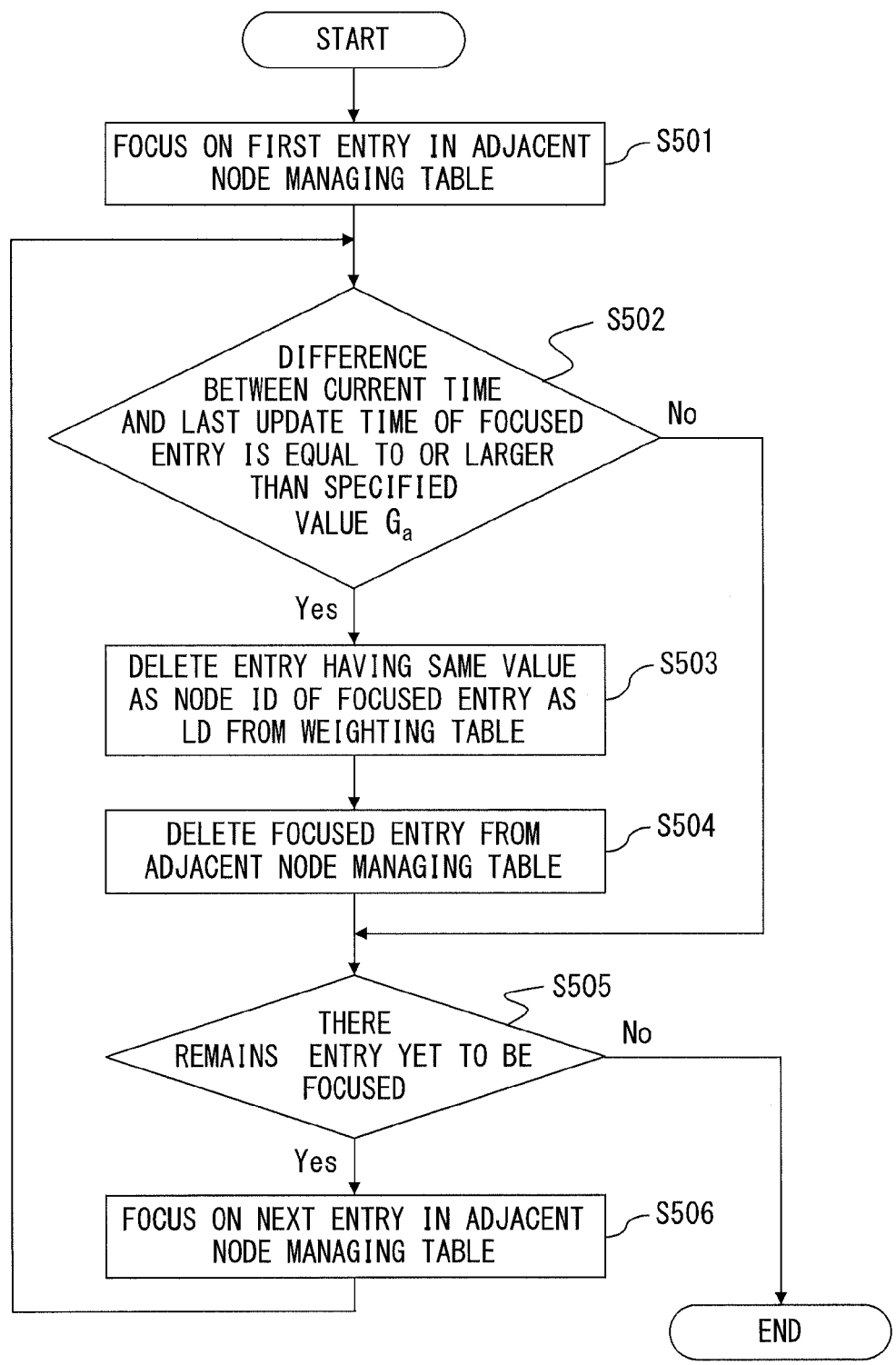
FIG. 17 is a flowchart of an aging process of the adjacent node managing table.

FIG. 17 is a flowchart of the aging process of the adjacent node managing table 103. For example, the timer IC 203 may output an interrupt signal to the link managing unit 108 at a specified interval $I_a$, and the link managing unit 108 may perform the process in FIG. 17 at the interval $I_a$ triggered by the interrupt signal.

In step S501, the link managing unit 108 focuses on the first entry of the adjacent node managing table 103 (see FIG. 9). Hereinafter, in the description regarding FIG. 17, the entry of the adjacent node managing table 103 that the link managing unit 108 focuses on is referred to as a "focused entry".

In step S502, the link managing unit 108 determines whether or not the difference between the current time and the last update time of the focused entry is equal to or larger than a specified value $G_a$. Meanwhile, depending on the embodiment, either $G_a=I_a$, $G_a<I_a$ or $G_a>I_a$ will do.

If the difference between the current time and the last update time of the focused entry is equal to or larger than $G_a$, the process moves to step S503. On the other hand, if the difference between the current time and the last update time of the focused entry is smaller than $G_a$, the process moves to step S505.

In step S503, the link managing unit 108 deletes an entry having the same value as the node ID of the focused entry from the weighting table 104. For example, if the focused entry is the third entry in the adjacent node managing table 103-N₃ in FIG. 9, the value of the node ID of the focused entry is N₅. In this case, instep S503, the link managing unit 108 deletes the entry whose value of LD is N₅ from each of the weighting tables 104-1-N₃ through 104-M-N₃. For example, in step S503, the third entry of the weighting table 104-1-N₃ and the third entry of the weighting table 104-2-N₃ are deleted.

In step S504, the link managing unit 108 deletes the focused entry from the adjacent node managing table 103. Then, the process moves to step S505.

In step S505, the link managing unit 108 determines whether or not there remains an entry yet to be focused in the adjacent node managing table 103. If the link managing unit 108 has focused on all the entries in the adjacent node managing table 103, the process in FIG. 17 is terminated. On the other hand, if there remains an entry that the link managing unit 108 has not focused on, the process moves to step S506.

In step S506, the link managing unit 108 focuses on the next entry among entries yet to be focused on in the adjacent node managing table 103. Then, the process returns to step S502.

By the aging process in FIG. 17 described above, it becomes possible for the node apparatus 100 to recognize that, when the reception of HELLO frames from a node apparatus that has been recognized as an adjacent node apparatus is discontinued, that "the node apparatus is no longer adjacent to the node apparatus 100". That is, by the process in FIG. 17, it becomes possible for the node apparatus 100 to manage adjacent node apparatuses as candidates for a potential LD appropriately in accordance with change in the environment.

Meanwhile, it is desirable that the interval $I_a$ and the value $G_a$ mentioned above are determined as needed, according to variability of the environment and the like, depending on the embodiment. Meanwhile, in this embodiment, the same transmission interval $\Delta T_{hello}$ of HELLO frames is set in all the node apparatuses in the network, and the value $G_a$ mentioned above being the aging time of the adjacent node managing table 103 satisfies $G_a > \Delta T_{hello}$.

Figure 18:
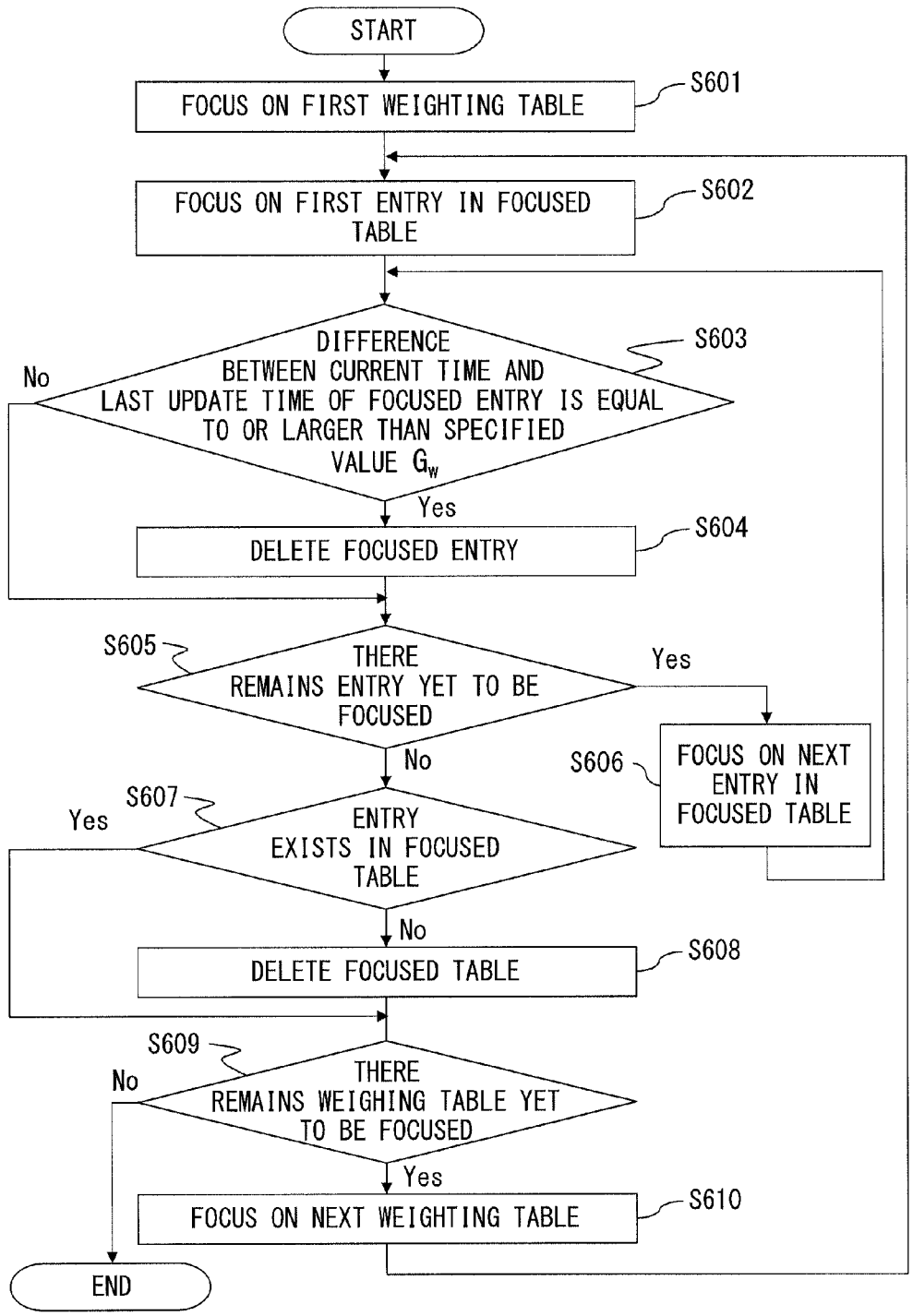
FIG. 18 is a flowchart of an aging process of the weighting table.

FIG. 18 is a flowchart of the aging process of the weighting table 104. For example, the timer IC 203 may output an interrupt signal to the data frame processing unit 110 at a specified interval $I_w$, and the data frame processing unit 110 may perform the process in FIG. 18 at the interval $I_w$ triggered by the interrupt signal.

In step S601, the data frame processing unit 110 focuses on the first weighting table 104-1 in the weighting tables 104 (see FIG. 10 and FIG. 11). Hereinafter, in description regarding FIG. 18, the weighting table that the data frame processing unit 110 focuses on is presented with a reference numeral "104-$i$" ($1 \le i \le M$), and is referred to as a "focused table". Immediately after execution of step S601, i=1.

In step S602, the data frame processing unit 110 focuses on the first entry in the focused table 104-$i$. Hereinafter, the entry that the data frame processing unit 110 focuses on in the focused table is referred to as the "focused entry".

In step S603, the data frame processing unit 110 determines whether or not the difference between the current time and the last update time of the focused entry is equal to or larger than a specified value $G_w$. Meanwhile, depending on the embodiment, either $G_w = I_w$, $G_w < I_w$ or $G_w > I_w$ will do.

If the difference between the current time and the last update time of the focused entry is equal to or larger than $G_w$, the process moves to step S604. On the other hand, if the difference between the current time and the last update time of the focused entry is smaller than $G_w$, the process moves to step S605.

In step S604, the data frame processing unit 110 deletes the focused entry from the focused table 104-$i$. Then, the process moves to step S605.

In step S605, the data frame processing unit 110 determines whether or not there remains an entry yet to be focused in the focused table 104-$i$. If the data frame processing unit 110 has focused on all the entries in the focused table 104-$i$, the process moves to step S607. On the other hand, if there remains an entry that the data frame processing unit 110 has not focused on, the process moves to step S606.

In step S606, the data frame processing unit 110 focuses on the next entry among entries yet to be focused on in the focused table 104-$i$. Then, the process returns to step S603.

In step S607, the data frame processing unit 110 determines whether or not any entry exists in the focused table 104-$i$. As a result of steps S603-S606, when there is no entry in the focused table 104-$i$, the process moves to step S608. On the other hand, if one or more entries exist in the focused table 104-$i$, the process moves to step S609.

In step S608, the data frame processing unit 110 deletes the focused table 104-$i$ in which no entry exists. Then, the process moves to step S609.

In step S609, the data frame processing unit 110 determines whether or not any weighting table that is yet to be focused on remains among the weighting tables 104. If the data frame processing unit 110 has focused on all the weighting tables 104-1 through 104-M, the process in FIG. 18 is terminated.

On the other hand, any weighting table 104-$j$ ($1 \le j \le M$) that the data frame processing unit 110 has not focused on remains among the weighting tables 104, the process moves to step S610.

In step S610, the data frame processing unit 110 focuses on the next weighting table 104-$j$ yet to be focused on among the weighting tables 104 (that is, selects the weighting table 104-$j$ as the focused table 104-$i$). Then, the process returns to step S602.

By the aging process in FIG. 18, the situation where "influences from past failures are accumulated, making it impossible to select any node apparatus as the LD" is avoided for the node apparatus 100.

For example, in FIG. 6, a situation is assumed where, after step S112, a failure occurs in the link between the node apparatuses $N_6$ and $N_7$, and the link between the node apparatuses $N_4$ and $N_7$ recovers from a failure. If the aging process in FIG. 18 is not performed, even if it has actually become possible to transmit data frames in a path <$N_1$, $N_2$, $N_3$, $N_4$, $N_7$> due to recovery from the failure, the path is not to be selected as a result of the autonomously-distributed coordination. However, when the aging process in FIG. 18 is performed, in the situation assumed above, it becomes possible for the path <$N_1$, $N_2$, $N_3$, $N_4$, $N_7$> to be selected.

Meanwhile, it is desirable that the interval $I_w$ and the value $G_w$ mentioned above are determined as needed, according to variability of the environment and the like, depending on the embodiment.

Figure 19:
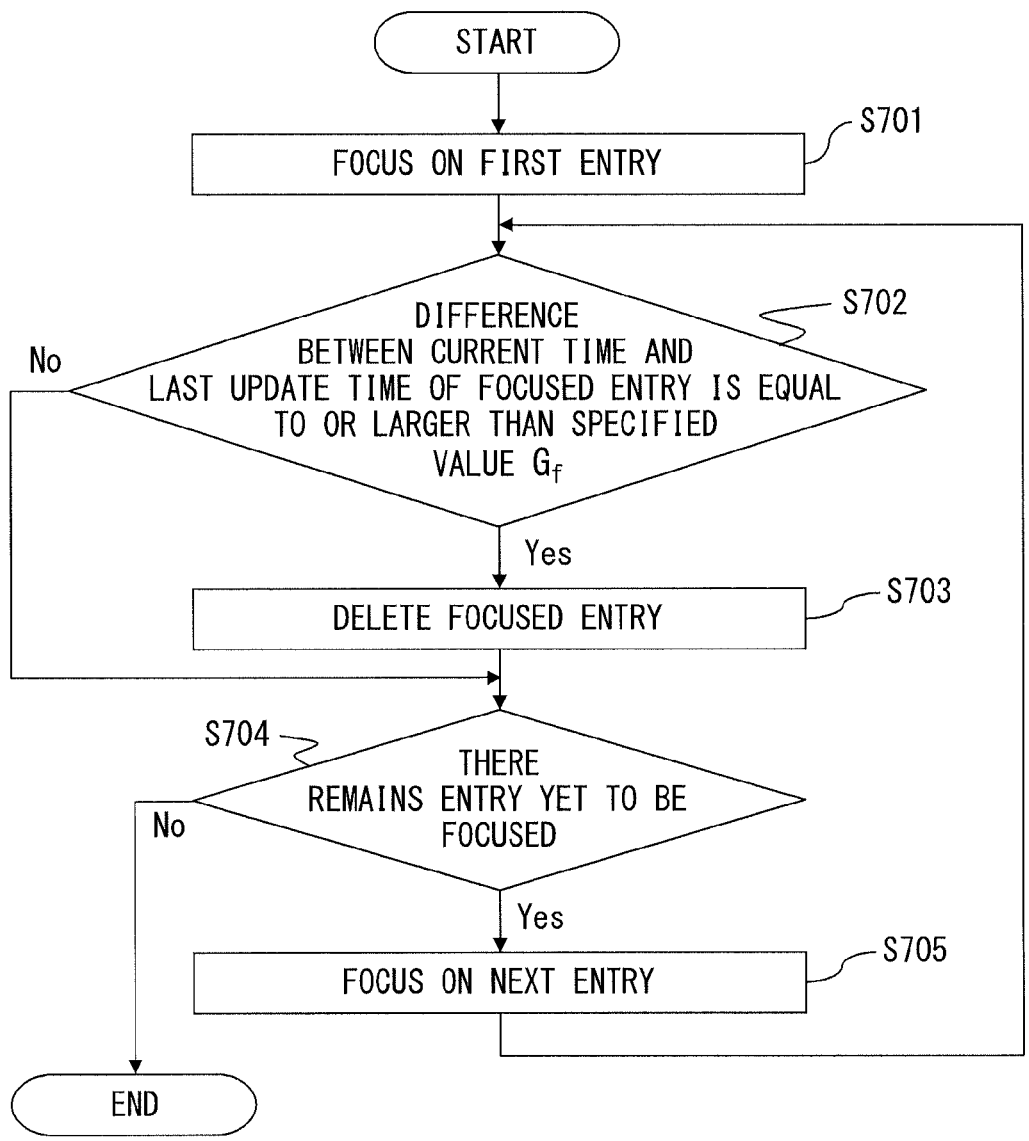
FIG. 19 is a flowchart of an aging process of the FID managing table.

FIG. 19 is a flowchart of the aging process of the FID managing table 105. For example, the timer IC 203 may output an interrupt signal to the data frame processing unit 110 at a specified interval $I_f$, and the data frame processing unit 110 may perform the process in FIG. 19 at the interval $I_f$ triggered by the interrupt signal.

In step S701, the data frame processing unit 110 focuses on the first entry in the FID managing table 105 (see FIG. 12 and FIG. 13). Hereinafter, in description regarding FIG. 19, the entry that the data frame processing unit 110 focuses on is referred to as the "focused entry".

In step S702, the data frame processing unit 110 determines whether or not the difference between the current time and the last update time of the focused entry is equal to or larger than a specified value $G_f$. Meanwhile, depending on the embodiment, either $G_f = I_f$, $G_f > I_f$ or $G_f > I_f$ will do.

Meanwhile, for the reason described later regarding step S807 in FIG. 21, in this embodiment, the value $G_w$ being the aging time for the weighting table 104 and the value $G_f$ being the aging time for the FID managing table 105 satisfy $G_f < G_w$.

If the difference between the current time and the last update time of the focused entry is equal to or larger than $G_f$, the process moves to step S703. On the other hand, if the difference between the current time and the last update time of the focused entry is smaller than $G_f$, the process moves to step S704.

In step S703, the data frame processing unit 110 deletes the focused entry from the FID managing table 105. Then, the process moves to step S704.

In step S704, the data frame processing unit 110 determines whether or not there remains an entry yet to be focused in the FID managing table 105. If the data frame processing unit 110 has focused on all the entries in the FID managing table 105, the process in FIG. 19 is terminated. On the other hand, if there remains an entry that the data frame processing unit 110 has not focused on, the process moves to step S705.

In step S705, the data frame processing unit 110 focuses on the next entry among entries yet to be focused on in the FID managing table 105. Then, the process returns to step S702.

By the aging process in FIG. 19 described above, a situation where "entries in the FID managing table 105 keep increasing and the storage area runs out" may be avoided.

The value $G_f$ may be determined, for example, so that in the worst case where backtracking occurs many times, it becomes longer than the period of time predicted to be required for the data frame to reach the GD from the GS. It is desirable, with a larger scale of the network, to set the value $G_f$ large as well.

Figure 23:
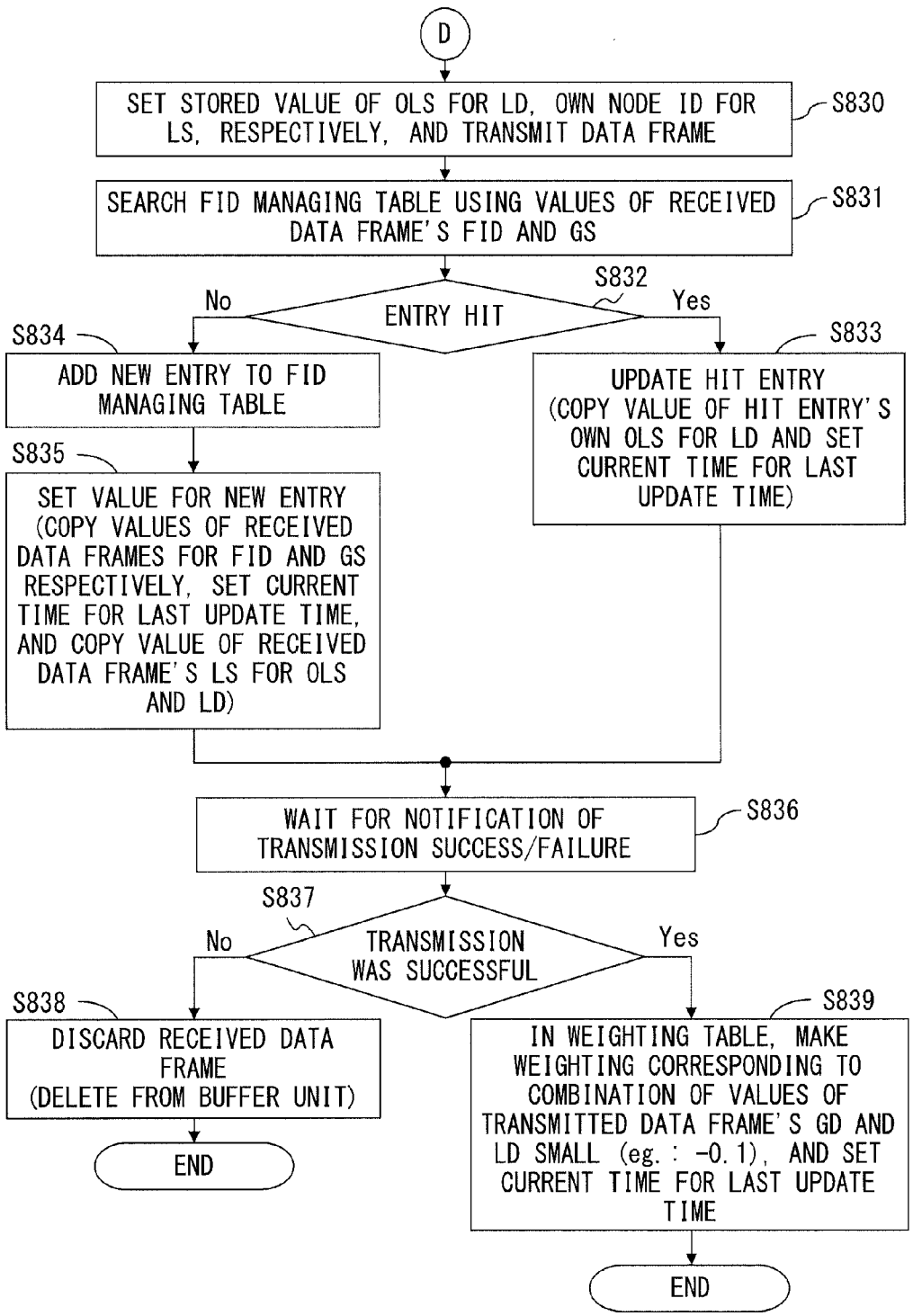

FIG. 20-FIG. 23 are flowcharts of the data frame reception process in step S205 of FIG. 14. Meanwhile, for convenience of description, the data frame reception process in a case in which the node apparatus 100 does not become the GS and is dedicated for relaying is described first with reference to FIG. 20-FIG. 23. In a case in which the node apparatus 100 can become the GS, the process in FIG. 23 is replaced with the process in FIG. 29.

Figure 20:
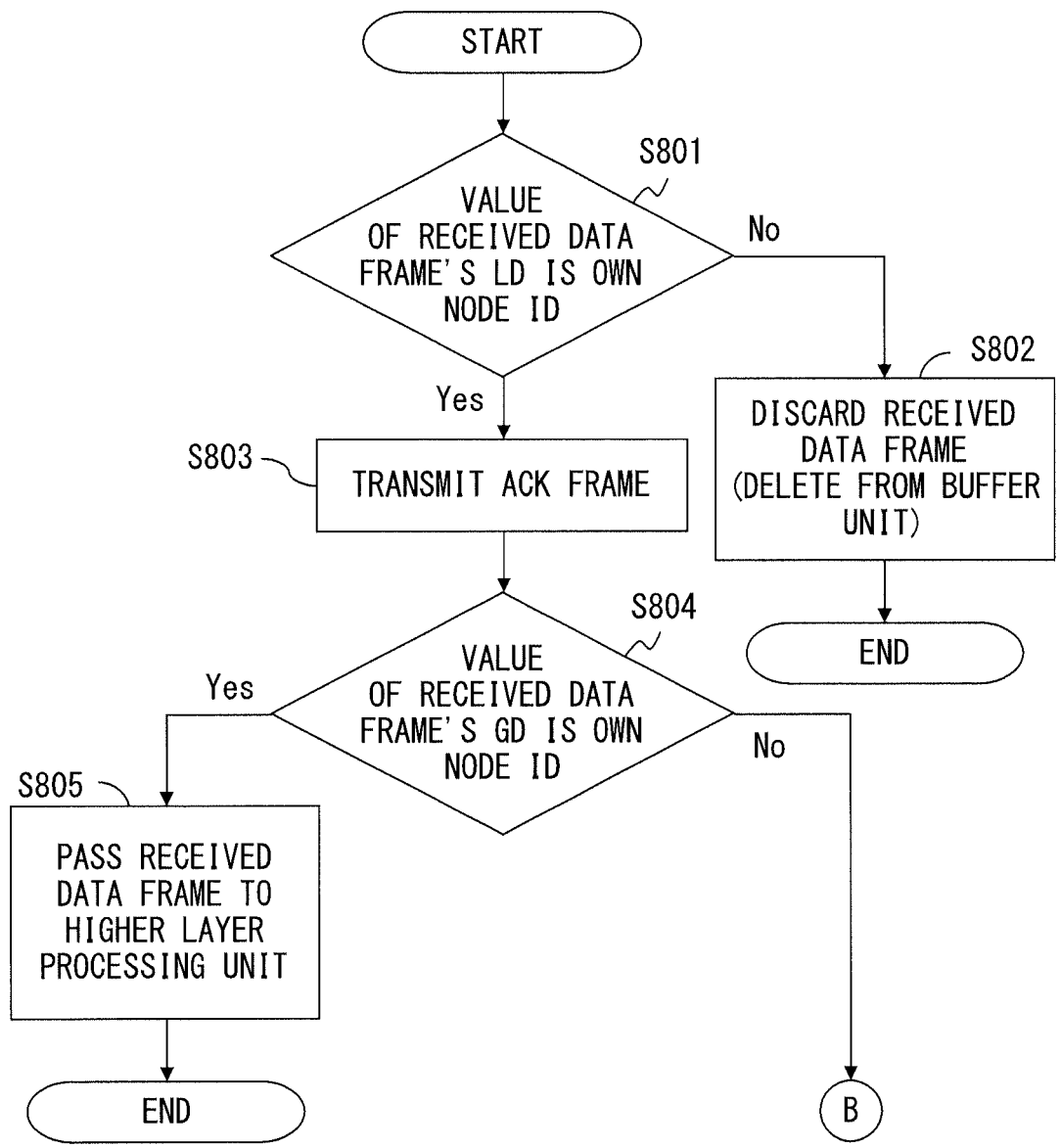
FIGS. 20-23 are flowcharts of a data frame reception process in step S205 in FIG. 14.

Upon receiving an instruction from the frame branching processing unit 106 in step S205 in FIG. 14 to perform the data frame receiving process, the data frame processing unit 110 starts the process in FIG. 20. As described above, the instruction from the frame branching processing unit 106 may be accompanied with the notification of the values of the GS and FID of the received data frame.

In step S801, the data frame processing unit 110 determines whether or not the value of the LD of the received data frame is the own node ID. If the value of the LD of the received data frame is not the own node ID, the process moves to step S802, and if the value of the LD of the received data frame is the own node ID, the process moves to step S803.

In the description of the data frame reception process, the "received data frame" is the data frame that the receiving unit 101 receives in step S201 in FIG. 14, is stored in the buffer unit 109 in step S204, and triggered the start of the process in FIG. 20.

Meanwhile, the frame branching processing unit 106 feds the values of the GS and FID of the received data frame when it instructs the data frame processing unit 110 to start the data frame reception process. Therefore, the data frame processing unit 110 can find the entry including the received data frame by searching the buffer unit 109 with the given GS and FID. Therefore, the data frame processing unit 110 can read out the value of each field included in the header of the received data frame, from the found entry.

To be precise, in step S801, the data frame processing unit 110 first reads out the value of each field included in the header of the received data frame from the buffer unit 109 as described above. Then, the data frame processing unit 110 compares the obtained value of the LD (that is, the value of the LD of the received data frame) with the own node ID. The own node ID being the node ID of the node apparatus 100 itself is recorded in the flash memory 205 in advance, so the data frame processing unit 110 can refer to the own node ID.

When the value of the LD of the received data frame is different from the own node ID, it means that the node apparatus 100 accidentally receives a data frame that is irrelevant to the node apparatus 100 itself. Therefore, in step S802, the data frame processing unit 110 discards the received data frame. That is, the data frame processing unit 110 deletes the entry in the buffer unit 109 that was found in step S801. Then, the data frame reception process is terminated.

On the other hand, if the value of the LD of the received data frame is equal to the own node ID, in step S803, the data frame processing unit 110 generates an ACK frame, and requests the transmitting unit 102 to transmit the ACK frame. Then, the transmitting unit 102 transmits the ACK frame.

For example, when the node apparatus $N_3$ receives the data frame 303 in FIG. 7, the data frame processing unit 110-$N_3$ of the node apparatus $N_3$ generates the ACK frame 322 in FIG. 7 in step S803. Then, the transmitting unit 102-$N_3$ transmits the ACK frame 322.

In this case, the data frame processing unit 110-$N_3$ sets $N_2$ being the value of the LS of the received data frame 303 as the LD of the ACK frame 322, and sets the own node ID (that is, $N_3$ being the own node ID of the node apparatus $N_3$ itself) as the LS of the ACK frame 322. In addition, the ACK frame 322 is irrelevant to node apparatuses other than the node apparatus $N_2$ being the LS of the corresponding data frame 303, so the data frame processing unit 110-$N_3$ sets a special value 0x000000 representing null as the GD of the ACK frame 322.

In addition, the data frame processing unit 110-$N_3$ sets the GS and FID of the ACK frame 322 so that the node apparatus $N_2$ may recognize that "the ACK frame 322 is an ACK frame for the data frame 303". That is, the data frame processing unit 110-$N_3$ sets $N_1$ and $F_a$ being the values of the GS and FID of the received data frame 303 as the GS and FID of the ACK frame 322, respectively.

Furthermore, the data frame processing unit 110-$N_3$ sets a specified value A indicating the "ACK frame" as the type of the ACK frame 322. In step S803, the data frame processing unit 110-$N_3$ generates the ACK frame 322 as described above, and the transmitting unit 102-$N_3$ transmits the ACK frame 322.

In step S804, the data frame processing unit 110 determines whether or not the value of GD of the received data frame is the own node ID. If the value of the GD of the received data frame is the own node ID, the process moves to step S805. On the other hand, if the value of GD of the received data frame is different from the own node ID, the process moves to step S806 in FIG. 21.

In step S805, the data frame processing unit 110 gives the received data frame to the higher layer processing unit 111, and terminates the data frame reception process. Specifically, the data frame processing unit 110 provides the entry in the buffer unit 109 found in step S801 to the higher layer processing unit 111, and deletes the entry from the buffer unit 109. Then, the data frame reception process is terminated.

For example, in the node apparatus $N_7$ that receives the data frame from the node apparatus $N_6$ on step S112 in FIG. 6, the received data frame is output to the higher layer processing unit 111-$N_7$, and is processed in the higher layer processing unit 111-$N_7$.

Note that the data frame processing unit 110 may obtain only data portion in payload necessary for the higher layer processing unit 111 from the entry in the buffer unit 109 found in step S801, and output the data portion to the higher layer processing unit 111, in place of providing all received data frame.

Figure 21:
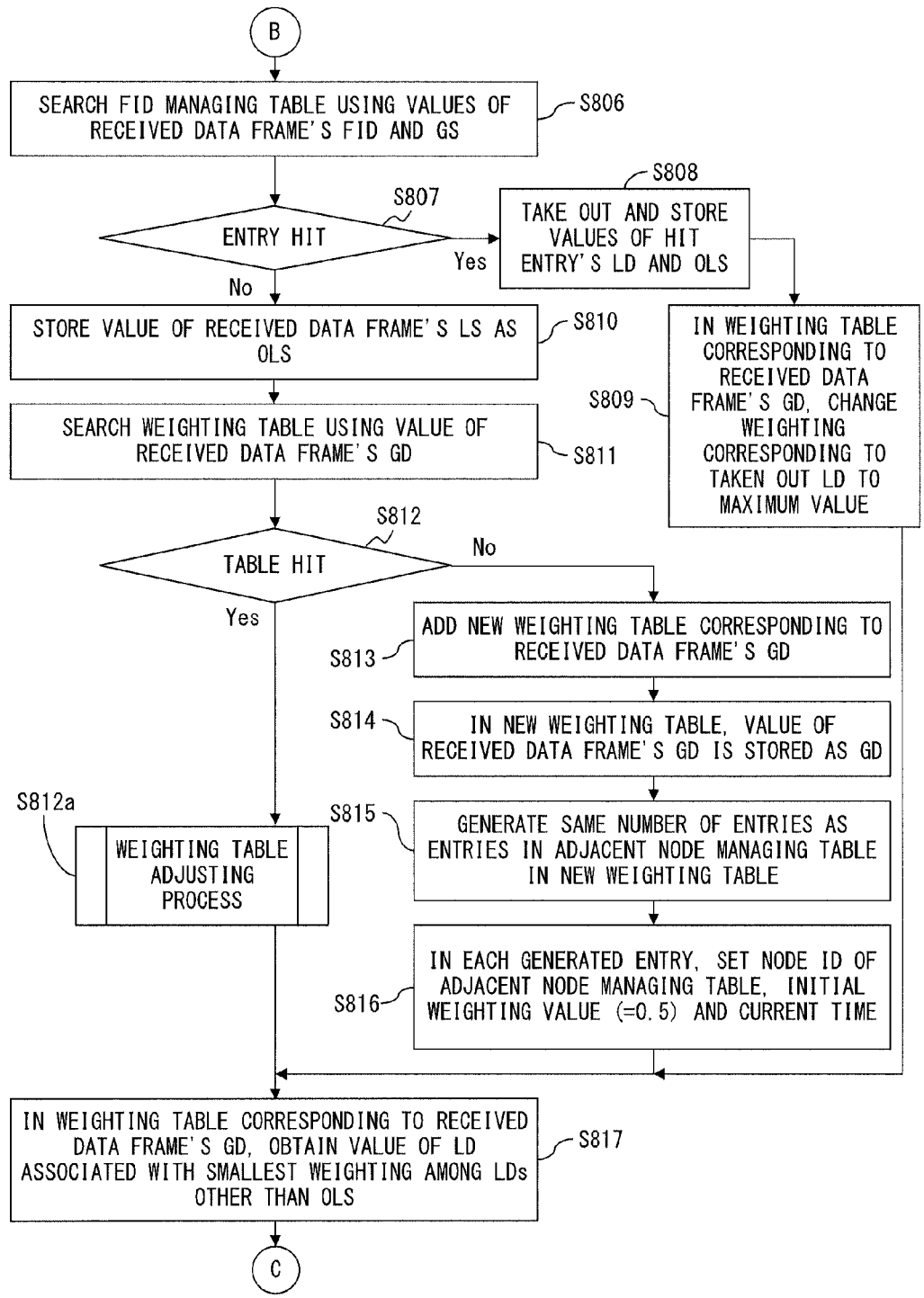

The processes after step S806 in FIGS. 21-23 are performed when the value of the LD of the received data frame is equal to the own node ID and the value of the GD of the received data frame is different from the own node ID.

In step S806, the data frame processing unit 110 searches the FID managing table 105 using the values of the FID and GS of the received data frame. As described above, the values of the FID and GS of the received data frame is given from the frame branching processing unit 106 at the time of start of the process in FIG. 20.

In step S807, the data frame processing unit 110 determines whether or not an entry is hit as a result of the search in step S806. When an entry is hit, it means that the same data frame as the data frame that the node apparatus 100 previously transmitted has been received, so the process moves to step S808. On the other hand, if no entry is hit, it means that a data frame that the node apparatus 100 never transmitted has been received, so the process moves to step S810.

Meanwhile, to be precise, no entry is hit also in a case in which "while the same data frame as the data frame that the node apparatus 110 previously sent was received, the entry being the target of search has already disappeared due to aging". In order to avoid such a case, it is desirable that the aging time $G_f$ of the FID managing table 105 is determined, based on an estimation of the worst time in which backtracking is repeated in the network, and so on.

In step S808, the data frame processing unit 110 obtains the values of the LD and OLS of the entry in the FID managing table 105 that was hit in the search in step S806, and stores the obtained values in a storage area of the DRAM 204 in FIG. 4 for example.

In step S809, the data frame processing unit 110 updates the weighting table (hereinafter, in the description of FIGS. 21-23, referred to by a reference numeral "104-$i$") corresponding to the value of the GD of the received data frame. That is, the data frame processing unit 110 changes the weighting in the weighting table 104-$i$ corresponding to the LD obtained in step S808 to the maximum value. In this embodiment, the maximum value of the weighting is 1. After changing the weighting, the process moves to step S817.

Meanwhile, when the process proceeds from step S807 to S808 and to S809, the existence of the entry corresponding to the LD obtained in step S808 is assured in step S809. The reason for it is as follows.

As described regarding FIG. 12 and FIG. 13, the last update time is set at the time of transmission of the data frame, in the entry in the FID managing table 105. In addition, as described regarding FIG. 19, the aging time $G_f$ of the FID managing table 15 is set as equal to or longer than the time predicted in the worst case, for example. Therefore, when the data frame that the node apparatus 100 previously transmitted is received in the node apparatus 100 after travelling through the network, the entry corresponding to the data frame is assured to be still in the FID managing table 105.

Then, as described regarding FIG. 11, when the data frame is transmitted and an ACK frame is returned, the weighting is updated, and in each entry in the weighting tables 104-1 through 101-M, the last update time is set when the weighting is updated. Therefore, according to the time series, the order is (E1)-(E5) as follows.

(E1) A data frame with the value of GD being $N_{GD}$, the value of GS being $N_{GS}$, the value of LD being $N_{LD}$ and the value of FID being $F_C$ is transmitted from the node apparatus 100. At this time, the last update time is set in the FID managing table 105. For example, in the node apparatus $N_3$ in FIG. 6, the last update time $T_{103}$ is set in the entry $E_3$ in FIG. 12 in step S103.

(E2) When the ACK frame for the data frame is received, in the weighting table 104-$i$ corresponding to the node apparatus $N_{GD}$, the weighting of the entry having $N_{LD}$ as the value of the LD field is updated. At this time, the last update time of the entry is set. For example, in the node apparatus $N_3$, the last update time of the entry having $N_4$ as the value of the LD field in the weighting table 104-1-$N_3$ is set to $T_b$ in step S103$a$ as illustrated in FIG. 11.

(E3) The same data frame having $N_{GS}$ as the value of the GS and $F_C$ as the value of the FID is received in the node apparatus 100. For example, in step S106 in FIG. 6, the node apparatus $N_3$ receives the data frame. Meanwhile, the value of the GD of the data frame is not to be rewritten upon relaying, so the value of the GD of the data frame received in (E3) is $N_{GD}$ according to (E1) above.

(E4) The aging time $G_f$ of the FID managing table 105 passes after the time of (E1).

(E5) The aging time $G_w$ of the weighting table 104 passes after the time of (E2).

As described above, the time of (E3) is precedent to the time of (E5) therefore, at the point of time (E3), in the weighting table 104-$i$ corresponding to the node apparatus $N_{GD}$, the existence of the entry having $N_{LD}$ as the value of the LD field is assured.

For example, in the example above, the entry in the weighting table 104-1-$N_3$ having $N_4$ as the value of the LD field is assured at the time of S106 in FIG. 6. The "time of step S106" is the point of time at which the node apparatus $N_3$ performs the process in S809 included in the data frame reception process triggered by the reception in FIG. 106.

Therefore, if an entry is found in the FID managing table 105 by the search in step S806 in FIG. 21, the entry corresponding to the LD obtained instep S808 always exists in the weighting table 104-$i$, when performing S809. Therefore, in step S809, the data frame processing unit 110 sets the value of weighting to the maximum value in the entry whose existence is assured.

On the contrary, when the corresponding entry is not found by the search in steps S806-S807, in step S810, the data frame processing unit 110 stores the value of the LS of the received data frame as the OLS in the storage area such as the DRAM 204 in FIG. 4 for example.

In step S811, the data frame processing unit 110 searches the weighting table 104 using the value of the GD of the received data frame. In step S812, the data frame processing unit 110 determines whether corresponding weighting table is hit as a result of step S811.

When the weighting table corresponding to the value of the GD of the received data frame exists in the weighting tables 104, the process moves to step S812$a$. The reference numeral "104-$i$" introduced in step S809, refers to the weighting table corresponding to the value of the GD of the received frame, and the table hit as a result of the search in step S811 is also the "weighting table 104-$i$". On the other hand, when the weighting table corresponding to the value of the GD of the received frame does not exist in the weighting tables 104, the process moves to step S813.

In step S812$a$, the data frame processing unit 110 adjusts the weighting table 104-$i$ hit in the search in step S811. The weighting table adjustment process in step S812$a$ is, while details are to be described later with FIG. 24, a process to reduce the side effect of the aging process.

As a result of the step S812$a$, the existence of entries corresponding to all the adjacent apparatuses managed in the adjacent node managing table 103 in the weighting table 104-$i$ is assured. Then, the process moves to step S817.

In step S813, the data frame processing unit 110 adds a new weighting table corresponding to the value of the GD of the received data frame. The table added in step S813 is also the "weighting table 104-$i$".

In step S814, the data frame processing unit 110 sets the value of the GD of the received data frame as the GD of the weighting table 104-$i$ in the new weighting table 104-$i$.

In step S815, the data frame processing unit 110 creates the same number of entries as the number of entries in the adjacent node managing table 103.

In step S816, the data frame processing unit 110 sets the node ID of each entry in the adjacent node managing table 103, the initial weighting value (for example, 0.5) and the current time in each entry created in step S815.

Meanwhile, specific examples of steps S811-S816 are as follows.

For example, it is assumed that the weighting table 104-1-$N_3$ in FIG. 11 does not exist in the weighting table 104-$N_3$ when the data frame 303 in FIG. 7 is received from the node apparatus $N_2$ in step S102 in FIG. 6. In this case, even if the data frame processing unit 110-$N_3$ searches the weighting table 104-$N_3$ in step S811 with $N_7$ being the value of the GD of the data frame 303 that the node apparatus $N_3$ received, no table is hit.

Thus, in step S813, the data frame processing unit 110-$N_3$ newly creates the weighting table 104-1-$N_3$, and sets $N_7$ as the GD of the weighting table 104-1-$N_3$ in step S814. Then, in step S815, the data frame processing unit 110-$N_3$ creates the same number (that is, three) of new entries as the number of adjacent nodes recorded in the adjacent node managing table 103-$N_3$ in the weighting table 104-1-$N_3$.

Here, the node ID of each entry of the adjacent node managing table 103-$N_3$ is, as in FIG. 10, $N_2$, $N_4$, and $N_5$. Therefore, in the three entries created in step S815, $N_2$, $N_4$, and $N_5$ are set respectively as the LD. In addition, the data frame processing unit 110-$N_3$ sets the initial value 0.5 in the weighting field of all the three entries, and sets the current time for the last update time of all the three entries.

As a result of steps S813-S816 above, the weighting table 104-1-$N_3$ as in the first row in FIG. 11 is added in the weighting table 104-$N_3$.

Here, the description returns from specific examples to the processes in general in FIG. 21. It is after the execution of step S809, after the execution of step S816, or after that it is determined in step S812 that a table was hit in the search in step S811, that step S817 is performed. Therefore, when step S817 is performed, the existence of the weighting table 104-$i$ corresponding to the value of the GD of the received data frame is assured.

In step S817, the data frame processing unit 110 obtains the value of the LD associated with the smallest weighting among the LDs other than the OLS, in the weighting table 104-$i$ corresponding to the value of the GD of the received data frame.

That is, in the weighting table 104-$i$, the data frame processing unit 110 selects, among the entries having values other than the value of the OLS stored in step S808 or S810, the one whose value of weighting is the smallest. Then, the data frame processing unit 110 stores the values of the LD and the weighting of the selected entry in a storage area such as DRAM 204 in FIG. 4 for example.

Next, in step S818, the data frame processing unit 110 determines whether or not either of two conditions (F1) and (F2) below is satisfied.

(F1) The weighting corresponding to the value of the LD obtained in step S817 (or S829 described later) is the maximum value for weighting (1.0 in this embodiment).

(F2) Forwarding of the data frame to the LDs other than the value of the OLS stored in step S808 or step S810 all failed (including the case in which only the OLS originally exists as the LD in the weighting table 104-$i$).

If the condition (F1) or (F1) is satisfied, there is no adjacent node apparatus that can be selected as the LD, so the process moves to step S830.

On the other hand, when neither (F1) nor (F2) is satisfied, there is at least one adjacent node apparatus that can be selected as the LD. In other words, at least one adjacent node apparatus exists that does not corresponds to any of (G1)-(G4). In this case, the node ID of the adjacent node apparatus that can be selected as the LD is obtained in step S817 (or S829 described later).

(G1) It is determined that the path beyond the adjacent node apparatus is a dead end or loop, so the adjacent node apparatus is associated with the weighting of the maximum value.

(G2) Past results where transmission of the data frame addressed to the same GD to the same adjacent node apparatus failed have been accumulated, so the adjacent node apparatus is associated with the weighting of the maximum value.

(G3) As a result of an attempt of transmission of the data frame to the adjacent node apparatus in the current data frame reception process, it has been determined as "transmission failure". That is, no ACK frame is received from the adjacent node apparatus to which the data frame was transmitted after a specified period of time passed.

(G4) The adjacent node apparatus is the OLS.

When it is determined in step S818 that neither (F1) nor (F2) is satisfied, the process moves to step S819. The processes including and after step S819 are prepared to try to forward a data frame to the adjacent node apparatus that is identified by the obtained value of the LD.

In step S819, the data frame processing unit 110 creates a new data frame and outputs to the transmitting unit 102, and the transmitting unit 102 transmits the created data frame.

The data frame processing unit 110 sets the value of the LD obtained in step S817 (or S829 described later) as the LD of the new data frame, and specifies the own node ID as the LS of the new data frame. In addition, the data frame processing unit 110 copies the values of the respective fields of the GD, GS, FID, type, length and the payload from the received frame to the new data frame. The "received data frame" is the data frame stored in the entry in the buffer unit 109 found in step S801, as described above.

In step S820, the data frame processing unit 110 updates the timeout time of the buffer unit 109. That is, the data frame processing unit 110 sets the time $T_{timeout}$ in expression (5) as the timeout time of the entry storing the received data frame in the buffer unit 109.

$$T_{timeout} = T_{now} + T_{wait} \quad (5)$$

In the expression (5), $T_{now}$ is the current time and $T_{wait}$ is the ACK frame waiting time.

In step S821, the data frame processing unit 110 checks whether an entry was hit in the search in the FID managing table 105 in step 806, or a new entry was added and values were set in the FID managing table 105 in step S823 and S824 described later. That is, the data frame processing unit 110 checks whether an entry exists in the FID managing table 105 having values equal to the values of the GS and FID of the received data frame as the GD and FID.

If an entry was hit in the search in step S806 or a new entry was added and values were set in the FID managing table 105 in step S823 and S824, the current data frame reception process is a process triggered by reception of the same data frame that the node apparatus 100 transmitted previously. Therefore, in this case, the data frame processing unit 110 executes step S822 next. On the other hand, if no entry was hit in the search in step S806 or not new entry was added and values were not set in the FID managing table 105 in step S823 and S824, the node apparatus 100 is trying for the first time to forward a data frame received for the first time. Therefore, the process moves to step S823.

In step S822, the data frame processing unit 110 updates the entry that was hit in the search in step S806. Specifically, in the entry hit in the search in step S806, the data frame processing unit 110 sets the value of the LD of the data frame transmitted instep S819 in the LD field, and sets the current time in the last update time field. Then, the process moves to step S825.

Meanwhile, in step S823, the data frame processing unit 110 adds a new entry to the FID managing table 105. Then, in step S824, the data frame processing unit 110 sets values in the new entry. Specifically, in the each field of the FID, GS and LD, the values in the data frame transmitted instep S819 are set respectively. In addition, in the new entry, the data frame processing unit 110 sets the current time in the last update time fields and copies the value of the OLS stored instep S810 in the OLS field. Then, the process moves to step S825.

Instep S825, the data frame processing unit 110 waits for notification as to success/failure of the transmission in step S819. For example, when the data frame processing unit 110 is realized by the MPU 201 in FIG. 4 that executes the thread of a specified program, the thread may be sleeping in step S825. In that case, notification of "transmission success" or "transmission failure" is a process to activate the thread.

When the transmission in step S819 was successful, an ACK frame is returned from the adjacent node apparatus specified as the LD in the data frame transmitted in step S819. Then, the ACK processing unit 107 performs the process in FIG. 25 described later, and sends notification of "transmission success" to the data frame processing unit 110.

Meanwhile, failure of the transmission in step S819 means that no ACK frame from the adjacent node apparatus specified as the LD in the data frame transmitted in step S819 is received in the node apparatus 100 when the time $T_{timeout}$ in expression (5) arrives. The reception of the ACK frame is monitored by the process by the ACK processing unit 107 in FIG. 26 described later, and if no ACK frame is received when the time $T_{timeout}$ in expression (5) arrives, the ACK processing unit 107 sends notification of "transmission failure" to the data frame processing unit 110.

When the data frame processing unit 110 receives notification of "transmission success" or "transmission failure" from the ACK processing unit 107, the process moves to step S826.

In step S826, the data frame processing unit 110 determines whether or not the transmission in step S819 was successful, based on the notification received from the ACK processing unit 107. When the transmission was successful, the process moves to step S827, and when the transmission failed, the process moves to step S828.

When the transmission was successful, in step S827, in the weighting table 104, the data frame processing unit 110 reduces the weighting corresponding to the combination of the GD and LD in the data frame transmitted in step S819. Here, putting it in other words while noting that the GD of the data frame is not to be rewritten due to forwarding, instep S827, the data frame processing unit 110 performs update of weighting in the weighting table 104-$i$ corresponding to the GD of the received data frame.

That is, the data frame processing unit 110 searches for the entry having the value of the LD obtained in step S817 (or S829 described later) as the LD in the weighting table 104-$i$, and reduces the value of weighting of the found entry. To reduce the value of weighting is to increase the priority of the corresponding LD.

Here, assuming the value of the current weighting of the found entry as $W_{current}$, the data frame processing unit 110 may in step S827 update the value of the weighting of the found entry to $W_{revised}$ in expression (6) for example.

$$W_{revised} = \max(W_{min}, W_{current} - \Delta W_{success}) \quad (6)$$

In the expression (6), $W_{min}$ is the minimum value of weighting, which is $W_{min}=0.1$ in this embodiment. In addition, $W_{success}$ is a specified amount by which weighting is reduced when the transmission is successful, whose value may be determined as needed according to the embodiment. For example, $W_{success}=0.1$ is possible.

Further, instep S827, the data frame processing unit 110 sets the current time as the last update time in the entry in the weighting table 104-$i$ having the value of the LD obtained in step S817 (or step S829 described later) as the LD. Then, the data frame reception process is terminated.

On the other hand, if the transmission failed, instep S828, the data frame processing unit 110 increases the weighting corresponding to the combination of the GD and LD of the data frame transmitted in step S819, in the weighting table 104. That is, in step S828, the data frame processing unit 110 searches for the entry having the value of the LD obtained in step S817 (or S829 described later) as the LD in the weighting table 104-$i$, and increases the value of weighting of the found entry. To increase the value of weighting is to lower the priority of the corresponding LD.

For example, the data frame processing unit 110 may in step S828 update the value of the weighting of the found entry to $W_{revised}$ in expression (7) for example.

$$W_{revised} = \min(W_{max}, W_{current} + \Delta W_{failure}) \quad (7)$$

In the expression (7), $W_{max}$ is the maximum value of weighting, which is $W_{max}=1$ in this embodiment. In addition, $W_{failure}$ is a specified amount by which weighting is increased when the transmission fails, whose value may be determined as needed according to the embodiment. For example, $\Delta W_{failure}=0.1$ is possible. Note that, $\Delta W_{failure} \neq \Delta W_{success}$ is possible.

Meanwhile, in step S828, the data frame processing unit 110 stores the value of the LD obtained in step S817 (or S829 described later) in the work area such as the DRAM 204 in FIG. 4 as the "LD with which forwarding failed". For example, the data frame processing unit 110 may initialize and empty the linear list on the DRAM 204 in step S817, and may add an element to hold the value of the LD obtained in step S817 (or S829 described later). Another data structure such as an array may be used to store the "LD with which forwarding failed".

Further, instep S828, the data frame processing unit 110 sets the current time as the last update time in the entry in the weighting table 104-$i$ having the value of the LD obtained in step S817 (or S829 described later) as the LD. Then, the process moves to step S829.

In step S829, the data frame processing unit 110 searches for another adjacent node apparatus that can be selected and have not been tried as the LD. Specifically, the data frame processing unit 110 obtains the value of the LD associated with the smallest weighing among LDs other than the LD with which forwarding failed, and other than the OLS, in the weighting table 104-$i$ corresponding to the value of the GD of the received data frame. Meanwhile, the LD with which forwarding failed is stored in step S828 in the work area such as the DRAM 204 in FIG. 4 for example, in the form of a linear list, for example.

That is, the data frame processing unit 110 selects, from entries having the values satisfying (H1) and (H2) as the LD in the weighting table 104-$i$, the one whose value of weighting is the smallest. Then, the data frame processing unit 110 stores the values of the LD and weighting of the selected entry in a storage area such as the DRAM 204 in FIG. 4 for example.

(H1) A value different from the value of the LD obtained previously in S817 or S829
(H2) A value different from the value of the OLS stored in step S808 or S810

Therefore, for example, it is possible that the adjacent node apparatus that is associated with the weighting updated to 0.2 in step S828 is not selected as the LD in step S829, and an adjacent node apparatus having a larger weighting than 0.2, such as 0.8 may be selected.

Specific examples of steps S817-S829 are as follows.

For example, node apparatuses $N_3$, $N_5$ and $N_7$ are adjacent to the node apparatus N4 in FIG. 6. In addition, as in FIG. 12, the value of the OLS of the entry $E_4$ of the FID managing table 105-$N_4$ of the node apparatus $N_4$ is $N_3$.

In the example in FIG. 6, since the data frame processing unit 110-$N_4$ of the node apparatus $N_4$ first obtains the value $N_7$ of the LD in step S817, the transmission of the data frame to the node apparatus $N_7$ is performed as in step S104. However, as illustrated in FIG. 6, the transmission in step S104 fails, and the data frame processing unit 110-$N_4$ determines as "transmission failure" in step S826.

At the time when the data frame processing unit 110-$N_4$ executes S829, the value of the LD other than the LD (that is, $N_7$) with which forwarding failed and being different from the OLS (that is, $N_3$) is $N_5$ only. Therefore, in step S829, the value $N_5$ of the LD is obtained.

When the value of the LD is obtained in step S829, the process returns from S829 to S818. Therefore, in the example of the node apparatus $N_4$, after step S829, steps S818-S826 are executed again. Then, as presented as step S105 as in FIG. 6, "transmission success" is determined in FIG. 6 in step S826 this time, and step S827 is executed, then the data frame reception process is terminated.

Meanwhile, the influence of updating weighting in as in the expression (7) for example in step S828 is explained with a specific example as follows.

For example, it is assumed that in the network 2 in FIG. 2, the node apparatus $N_{105}$ receives, from the adjacent node apparatus $N_{108}$, the first data frame that specifies the node apparatus $N_{118}$ as the GD at the time $T_{rcv1}$. Then, it is assumed that at the time $T_{rcv1}$, the weighting table 104-$g_{106}$-$N_{106}$ corresponding to the node apparatus $N_{118}$ exists in the node apparatus $N_{106}$. In addition, it is assumed that in the weighting table the weighting table 104-$g_{106}$-$N_{106}$ at the time $T_{rcv1}$, the node apparatus $N_{102}$ is associated with weighting 0.4, the node apparatus $N_{103}$ with weighting 0.7, the node apparatus $N_{107}$ with weighting 0.1, and the node apparatus $N_{108}$ with 0.5, respectively.

Then, in step S817, the node apparatus $N_{107}$ associated with the smallest weighting 0.1 is selected as the LD. It is assumed that, however, when the data frame is transmitted in step S819, the wireless link between the node apparatus $N_{106}$ and the node apparatus $N_{107}$ temporarily becomes unavailable for communication due to a reason such as that a shielding matter is placed accidentally between the node apparatus $N_{106}$ and the node apparatus $N_{107}$.

Then, since no ACK frame is returned, in step S828, the weighting of the node apparatus $N_{107}$ is updated from 0.1 to 0.2. Then, in step S829, the node apparatus $N_{102}$ associated with weighting 0.4 is selected as the LD. Here, it is assumed that the transmission of the data frame in step S819 is successful, and an ACK frame is returned from the node apparatus $N_{102}$. By so doing, the weighting of the node apparatus $N_{102}$ is updated from 0.4 to 0.3, and the data frame reception process is terminated.

Here, it is assumed that the first data frame transmitted from the node apparatus $N_{106}$ to the node apparatus $N_{102}$ reaches the node apparatus $N_{118}$ without backtracking to the node apparatus $N_{106}$. That is, it is assumed that in the weighting table 104-$g_{106}$-$N_{106}$, there is no entry whose weighting is updated to 1 with the forwarding of the first data frame.

After that, at the time $T_{rcv2}$, when the node apparatus $N_{106}$ receives the second data frame that also specifies the node apparatus $N_{118}$ as the GD from the node apparatus $N_{103}$, the contents of the weighting table 104-$g_{106}$-$N_{106}$ is as follows. That is, the node apparatus $N_{102}$ is associated with weighting 0.3, the node apparatus $N_{103}$ with weighting 0.7, the node apparatus $N_{107}$ with weighting 0.2, and the node apparatus $N_{108}$ with weighting 0.5, respectively.

Therefore, in step S817, forwarding of the first data frame failed, but the node apparatus $N_{107}$ associated with the smallest weighting is still selected as the LD. Then, if the communication quality of the wireless link between the node apparatuses $N_{105}$ and $N_{107}$ has improved as at the time $T_{rcv2}$ and transmission of the second data frame in step S819 succeeds, the weighting of the node apparatus $N_{107}$ returns to 0.1 again in step S827.

Here, assuming that as a result of the forwarding of the second data frame to the node apparatus $N_{107}$, backtracking is not to occur, the weighting of the node apparatus $N_{107}$ remains 0.1. Therefore, at the time $T_{rcv3}$ after that, if the node apparatus $N_{105}$ receives the third data frame that also specifies the node apparatus $N_{118}$ as the GD from an adjacent node apparatus other than the node apparatus $N_{107}$, the one that is selected with the highest priority as the LD is still the node apparatus $N_{107}$.

As described above, when the weighting is not updated drastically to the maximum value but is increased only slightly in step S829, the weighting table 104 does not react excessively to the change in the communication environment. Therefore, if a link temporarily experiencing a failure recovers from the failure while the node apparatus $N_{106}$ receives a plurality of data frames that specify the same node apparatus as the GD one after another, following the improvement in the environment, the result of past learning starts to be utilized again for the selection of the LD. That is, in the example above, the node apparatus $N_{107}$ for which learning was done previously as appropriate for the LD starts to be selected with priority as the LD again.

Instead, the case in which the wireless link between the node apparatuses $N_{106}$ and $N_{107}$ has not recovered from the failure at the time $T_{rcv2}$ may occur. In that case, it is also possible that as the LD at the time of transmitting the second data frame, the node apparatus $N_{107}$ with weighting 0.2 is selected once, but since no ACK frame is received, the weighting of the node apparatus $N_{107}$ is updated to 0.3. Then, the node apparatus $N_{102}$ associated with weighting 0.3 is selected eventually, and the weighting is updated to 0.2 as the transmission is successful.

In this case, at the time $T_{rcv3}$, when the node apparatuses $N_{106}$ receives the third data frame from the node apparatuses $N_{103}$, the node apparatuses $N_{102}$ associated with weighting 0.2 is selected and the transmission may be successful. The weighting may be updated to 0.1. After that, the node apparatuses $N_{103}$ may continuously select the node apparatuses $N_{102}$ as the LD of a data frame specifying the node apparatuses $N_{118}$ as the GD.

However, further after that, if a failure occurs in the wireless link between the node apparatuses $N_{106}$ and $N_{102}$, no ACK frame is to be returned from the node apparatus $N_{102}$. Then, reselection of the LD is performed in step S829.

In that case, the node apparatus $N_{107}$ for which learning was done before the time $T_{rcv1}$ as preferable as the LD is selected as the LD with priority over the node apparatuses $N_{108}$ and $N_{103}$ that are respectively associated with weightings 0.5 and 0.7 and are not very appropriate relatively as the LD. That is because the learning of weighing at the time of transmission of the first and second data frames is to change the weighting gradually as illustrated in step S828, and the weighting of the node apparatus $N_{107}$ is still smaller than weightings of the node apparatuses $N_{108}$ and $N_{103}$.

Then, if the wireless link between the node apparatuses $N_{106}$ and $N_{107}$ has recovered from the failure at this point of time, the weighting of the node apparatus $N_{107}$ is reduced to 0.2 again. Thus, even if the recovery takes some time, since the temporary change in the environment is not reflected to the weighting table 104 excessively, the result of the learning in the past is reflected moderately. Therefore, the probability for an appropriate LD to be selected is also high.

As described above, in order not to be affected excessively from a temporary failure, in step S828, the weighting is adjusted only slightly.

Here, description returns to branching in step S818. When it is determined in step S818 that either of the two conditions (F1) and (F2) is satisfied, there is no adjacent node apparatus that can be selected as the LD, so the process moves to step S830 in FIG. 23.

In step S830, the data frame processing unit 110 generates a new data frame as described below and outputs to the transmitting unit 102, and the transmitting unit 102 transmits the generated frame.

Specifically, the data frame processing unit 110 specifies the value of the OLS stored in step S808 or S810 as the LD of the new data frame, and specifies the own node ID as the LS of the new data frame. In addition, the data frame processing unit 110 copies the value of each field of the GD, GS, FID, type and length and the payload from the received data frame to the new data frame. Meanwhile, the "received data frame" is, as described above, the data frame stored in the entry in the buffer unit 109 found in step S801. The transmission process performed in step S830 is namely the backtracking operation. Meanwhile, a specific example of the transmission in step S830 is step S110 in FIG. 6.

In step S831, the data frame processing unit 110 searches the FID managing table 105 using the values of the FID and GS of the received data frame.

In step S832, the data frame processing unit 110 determines whether or not any entry is hit as a result of the search in step S831. If any entry is hit, the process moves to step S833, and if no entry is hit, the process moves to S834.

In a case in which it is determined as "an entry is hit" in step S807, the entry found as a result of the search in step S831 is an entry that was found as a result of the search in step S806. Meanwhile, in a case in which it is determined as "no entry is hit" in step S807 and a new entry is created in step S823, the new entry created in step S823 is found as a result of the search in step S831.

It is with both a combination of (I1) and (I2), or both a combination of (J1) and (J2) in other words, that it is determined as "no entry was hit" in step S823.
(I1) It is determined in step S807 that "no entry is hit".
(I2) Immediately after step S818 was executed for the first time, the process moved to step S830.
(J1) A data frame that the node apparatus 100 had never received is received.
(J2) In the weighting table 104-$i$ corresponding to the value of the GS of the received data frame, all the LDs are associated with the weighting of the maximum value.

In step S833, the data frame processing unit 110 updates the entry that is hit as a result of the search in step S831. Specifically, in the hit entry, the data processing unit 110 copies the value of the OLS of the entry to the LD, and sets the current time as the last update time. Then, the process moves to step S836.

In step S834, the data frame processing unit 110 adds a new entry to the FID managing table 105. Then, in step S835, the data frame processing unit 110 sets values in the entry added in step S834. Specifically, in the new entry, the data frame processing unit 110 copies the values of the received data frame to the FID and GS respectively, sets the current time as the last update time, and copies the value of the LS of the received data frame to the OLS and LD. Then, the process moves to step S836.

In step S836, the data processing unit 110 waits for notification as to transmission success/failure of the data frame transmitted in step S830. When the data frame processing unit 110 receives notification of "transmission success" or "transmission failure" from the ACK processing unit 107, the process moves to step S837. Since the step S836 is similar to step S825, detailed description is omitted.

In step S837, the data frame processing unit 110 determines whether or not the transmission of the data frame in step S830 was successful. When the transmission failed, the process moves to step S838, and when the transmission was successful, the process moves to step S839.

It is in an exceptional with both a combination of (K1) and (K2) that step S838 is executed.
(K1) All the adjacent node apparatuses other than the OLS are (K1-1) or (K1-2).
(K1-1) Associated with the weighting of the largest value.
(K1-2) When the data frame specified as the LD is transmitted, the transmission fails.
(K2) Transmission of the data frame to the OLS (that is, the backtracking operation) failed.

In that case, the data frame processing unit 110 discards the received data frame in step S838. That is, the data frame processing unit 110 deletes the entry found in step S801 from the buffer unit 109. Then, the data frame reception process is terminated.

Meanwhile, the influence of step S838 is described below with a specific example. For example, the step S110 in FIG. 6 is the transmission that the node apparatus $N_3$ performs in step S830. In the example in FIG. 6, in response to the transmission of the frame from the node apparatus $N_3$ to the node apparatus $N_2$ in step S110, the node apparatus $N_2$ returns an ACK frame to the node apparatus $N_3$.

Here, on the contrary, it is assumed that a failure occurs in the link between the node apparatuses $N_2$ and $N_3$ at the time of step S110, and the data frame that the node apparatus $N_3$ transmitted in step S110 (that is, step S830) did not reach the node apparatus $N_2$. Then, the node apparatus $N_3$ does not receive any ACK frame from the node apparatus $N_2$, so the node apparatus $N_3$ determines as "transmission failure" and executes step S838. That is, the data frame that the node apparatus $N_1$ transmitted in step S101 disappears in the network 1 before reaching the node apparatus $N_7$ being the GD.

Moreover, for the node apparatus $N_2$, the situation is "after the transmission was done successfully in step S102, the same data frame has not been received from any adjacent node". Therefore, the node apparatus $N_2$ does not recognize that "it is inappropriate for the node apparatus $N_2$ to select the node apparatus $N_3$ as the LD when the node apparatus $N_7$ is selected as the GD". That is, as in the example in FIG. 6, the node apparatus $N_2$ does not learn that "when the node apparatus $N_7$ is specified as the GD, it is appropriate for the node apparatus $N_2$ to select the node apparatus $N_6$ as the LD".

As a result, when the node apparatus $N_2$ receives another data frame in which the node apparatus $N_7$ is specified as the GD (or the node apparatus $N_2$ transmits such a data frame while being the GS), the node apparatus $N_2$ selects the node apparatus $N_3$ as the LD.

Tentatively, it is assumed that the link between the node apparatuses $N_2$ and $N_3$ has not recovered from the failure yet at that point of time (for example, if a bad signal condition persists), the data frame transmitted from the node apparatus $N_2$ does not reach the node apparatus $N_3$. Therefore, the node apparatus $N_2$ is unable to receive the ACK frame, and it is determined as "transmission failure" in step S826 in FIG. 22.

As a result, in step S828, the weighting corresponding to the node apparatus $N_2$ in the weighting table 104-$h_2$-$N_2$ (the reference numeral is in the same manner as in the description of FIG. 6) corresponding to the node apparatus $N_7$ being the GD is increased. Then, the node apparatus $N_2$ reselects the node apparatus $N_6$ as the LD in next step S829.

Thus, when the data frame is discarded in step S838 in the node apparatus $N_3$ in the network 1, the learning for the weighting table 104-$h_2$-$N_2$ corresponding to the node apparatus $N_2$ being the OLS related to the discarded data frame may be delayed.

However, as is apparent from the description above, learning in the node apparatus $N_2$ is delayed only slightly. After receiving the next data frame with the node apparatus $N_7$ as the GD in the same manner as the previous data frame, the node apparatus $N_2$ may learn the appropriate weighting by a series of processes triggered by the reception. That is, as the operation of the network 1 as a whole where a plurality of data frames are distributed one after another, even if there is a node apparatus in which learning of weighting is delayed locally due to transmission failure of the data frame for backtracking of the OLS, the delay in learning may soon be made up.

Here, the description returns to the flowchart in FIG. 23. Step S839 is performed when the transmission of the data frame to the OLS is successful.

In step S839, the data frame processing unit 110 reduces the weighting corresponding to the combination of the GD and LD of the data frame transmitted in step S830 in the weighting table 104. In other words, the data frame processing unit 110 updates the weighting corresponding to the LD of the transmitted data frame (that is, the OLS stored in step S808 or S810) in the weighing table 104-$i$ corresponding to the GD of the received data frame.

While details of step S839 are similar to step S827 and description is omitted, the data frame processing unit 110 may update the weighting, for example using the expression (6). The data frame processing unit 110 further sets the last update time to the current time for the entry of the weighting table 104-$i$ which updated the weighting. Then, the data frame reception process is terminated.

Figure 24:
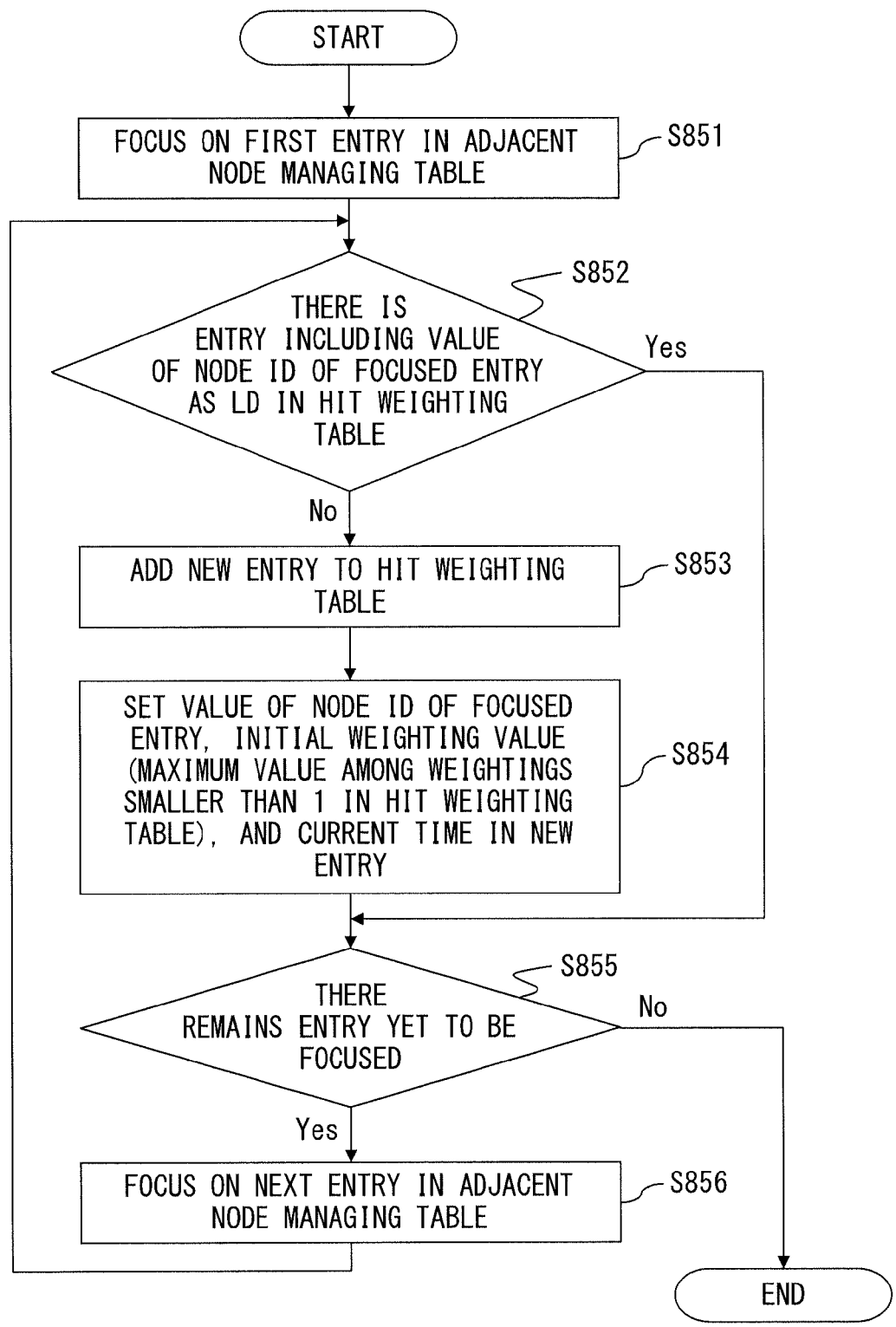
FIG. 24 is a flowchart of a weighting table adjustment process in step S812a in FIG. 21.

Next, with reference to FIG. 24, the details of the weighting table adjustment process in step S812$a$ in FIG. 21 are described. The weighting table adjustment process in FIG. 24 is also called in step S1108$a$ in FIG. 27 described later. In the description of FIG. 24, the "hit weighting table 104-$i$" refers to a table hit in the search in step S811 in FIG. 21 or in the search in step S1107 in FIG. 27.

In step S851, the data frame processing unit 110 focuses on the first entry in the adjacent node managing table 103 (see FIG. 9). In the description of FIG. 24, the entry that the data frame processing unit 110 focuses on in the adjacent node apparatus managing table 103 is referred to as the "focused entry".

In step S852, the data frame processing unit 110 determines whether or not there is any entry including the value of the node ID of the focused entry as the LD in the hit weighting table 104-$i$. If there is any entry including the value of the node ID of the focused entry as the LD in the hit weighting table 104-$i$, the process moves to step S855. On the contrary, if there is no entry including the value of the node ID of the focused entry as the LD in the hit weighting table 104-$i$, the process moves to step S853.

In step S853, the data frame processing unit 110 adds an new entry in the hit weighting table 104-$i$. In step S854, the data frame processing unit 110 sets values in the new entry added to the weighting table 104-$i$. That is, in the new entry, the data frame processing unit 110 sets the value of the node ID of the focused entry in the adjacent node managing table 103 in the LD field, the initial weighting value in the weighting field, and the current time in the last update time field, respectively.

The initial weighting value in step S854 is different from the initial weighting value in step S308 in FIG. 15. Specifically, the initial weighting value in step S854 is the maximum value of the weightings smaller than 1 in the weighting field of the hit weighting table 104-$i$.

For example, if four entries exist in the weighting field of the hit weighting table 104-$i$ and the values of the weighting field of each is 0.4, 0.7, 1 and 0.5, the initial weighting value in step S854 is 0.7. Meanwhile, if the value of the weighting field in hit weighting table 104-$i$ is 1 in the all entries, the initial weighting value in step S854 is any value smaller than 1, which may be 0.5 for example in the same manner as the initial weighting value in S308 in FIG. 15.

By using the initial weighting value as described above in step S854, the learning result reflected to the existing entries in the weighting table 104-$i$ is taken in with priority. As a result, the path does not change more than needed, in other words, the path becomes stable.

For example, in the above example where the values of the weighting field of the four entries is 0.4, 0.7, 1 and 0.5 respectively, it is assumed that 0.5 is used as the initial weighting value in step S854 in the same manner in step S308 in FIG. 15. Then, an adjacent node apparatus for which no learning of weighting has been done (that is, the adjacent node apparatus whose node apparatus is recorded as the LD in the new entry added in step S853) is selected as the LD with a higher priority than the adjacent node apparatus with weighting 0.7. That is, the weighting 0.7 as the accumulation of learning so far is disregarded.

Therefore, in this embodiment, to prevent an adjacent node apparatus for which no learning of weighting has been done from being selected as the LD with a higher priority than an adjacent node apparatus for which learning of weighting has been done and to take in the learning result so far, the initial weighting value defined as described above is used.

In step S855, the data frame processing unit 110 determines whether or not there remains any entry yet to be focused on in the adjacent node managing table 103. If the data frame processing unit 110 has focused on all the entries in the adjacent node managing table 103, the process in FIG. 24 is terminated. On the other hand, if there remains any entry that the data frame processing unit 110 has not focused on in the adjacent node managing table 103, the process moves to step S856.

In step S856, the data frame processing unit 110 focuses on the next entry among the entries yet to be focused on in the adjacent node managing table 103. Then the process returns to step S852.

Meanwhile, the purpose of the process in FIG. 24 is as follows.

The following situation is possible immediately before the process in FIG. 24 as a side effect of the aging process for each entry in the weighting table 104-$i$. That is, the entry having the node ID of a given adjacent node apparatus registered in the adjacent node managing table 103 as the LD may not exist in the weighting table 104-$i$.

Here, the adjacent apparatuses of the node apparatus 100 are potential candidates that the data frame processing unit 110 may selects when transmitting the data frame. Therefore, it is desirable for the appropriate operation of the node apparatus 100 that all the adjacent node apparatuses are covered in the LD field of the hit weighting table 104-$i$.

According to the weighting table adjustment process in FIG. 24, the situation as described above that may occur as a side effect of the aging process is solved. That is, all of the node IDs registered in the adjacent node managing table 103 being registered the hit weighting table 104-$i$ as the LD is assured.

The data frame reception process in step S205 in FIG. 14 is described in detail above with reference to FIGS. 20-24. Next, processes related to notification of transmission success/failure in step S826 and S837 in the data frame reception process are described with reference to FIG. 25 and FIG. 26.

FIG. 25 is a flowchart of the ACK frame reception process in step S206 in FIG. 14. The process in FIG. 25 starts when an ACK frame is guided from the frame branching unit 106 to the ACK processing unit 107.

In step S901, the ACK processing unit 107 determines whether or not the value of the LD of the ACK frame received from the frame branching unit 106 is equal to the own node ID. If the value of the LD is equal to the own node ID, the process moves to step S902, and if the value of the LD of the ACK frame is different from own node ID, the process in FIG. 25 is terminated. The ACK processing unit 107 can also refer to the own node ID stored in advance in the flash memory 205 for example.

For example, when the node apparatus $N_5$ receives the ACK frame in response to the data frame that the node apparatus $N_4$ transmitted in step S105 in FIG. 6 as presented as step S105$a$ in FIG. 30, the irrelevant node apparatus $N_3$ also receives the ACK frame. This is because the node apparatus $N_3$ is also adjacent to the node apparatus $N_5$.

However, the ACK processing unit 107-$N_3$ terminates the process in FIG. 25 immediately as a result of the determination in step S901, the node apparatus $N_3$ is not to be affected by the side effect from the ACK frame that is irrelevant to the node apparatus $N_3$.

In step S902, the ACK processing unit 107 identifies the data frame that has already been transmitted and corresponds to the ACK frame, from the values of the GS and FID of the ACK frame. For example, in response to the data frame 303 in FIG. 7 that the node apparatus $N_2$ transmits to the node apparatus $N_3$ in step S102 in FIG. 6, the node apparatus $N_3$ returns the ACK frame 322 in FIG. 7 to the node apparatus $N_2$. Here, detail description of the case in which the ACK processing unit 107-$N_2$ of the node apparatus $N_2$ performs the process in FIG. 25 triggered by the reception of the ACK frame 322 is as follows.

In step S902, the ACK processing unit 107-$N_2$ obtains the values of the GS and FID (that is, $N_1$ and $F_a$) of the ACK frame 322. Meanwhile, since the buffer unit 109-$N_2$ is in the same format as in FIG. 8, the data frame 303 that has already been transmitted from the node apparatus $N_2$ is stored in the buffer unit 109-$N_2$. Therefore, the ACK processing unit 107-$N_2$ searches the entries of the buffer unit 109-$N_2$ with the obtained values of the GS and FID, and identifies the entry that includes the data frame 303.

In step S903, the ACK processing unit 107 makes the data frame that has already been transmitted and indentified in step S902 "deletable" from the buffer unit 109. That is, the ACK processing unit 107 makes the entry found in the search in step S902 "deletable" from the buffer unit 109. Then, after a specified period of time has passed, data frame corresponding to the ACK frame is deleted from the buffer 109.

In step S904, the ACK processing unit 107 sends notification of "transmission success" regarding the data frame that has been already transmitted and identified in step S902. Then, the process in FIG. 25 is terminated.

For example, the ACK processing unit 107 may be realized by the MPU 201 in FIG. 4 executing a program. In that case, the thread that makes the ACK processing unit 107 function may be sleeping after the transmission of the data frame until an ACK frame is received. The notification of "transmission success" is a process to activate the sleeping thread.

The notification in step S904 is accompanied by notification of values of the GS and FID of the data frame identified in step S902. For example, in the example above, the ACK processing unit 107-$N_2$ also sends the values of the GS and FID (that is, $N_1$ and $F_a$) for identifying the data frame 303 to the data frame processing unit 110.

FIG. 26 is a flowchart illustrating a case in which no ACK frame is received by the timeout time. The process in FIG. 26 is periodically performed by interrupt signals that the timer IC 203 in FIG. 4 generates at a predetermined interval, for example.

In step S1001, the ACK processing unit 107 focus on the first entry in the buffer unit 109 (see FIG. 8). Hereinafter, in description regarding FIG. 26, the entry in the buffer unit 109 that the ACK processing unit 107 focuses on is referred to as the "focused entry".

In step S1002, the ACK processing unit 107 compares the current time and the value of the timeout time field in the focused entry. Then, if the current time is later than the timeout time, the process moves to step S1003. On the other hand, if the current time has not reached the timeout time, the process moves to step S1005.

In step S1003, the ACK processing unit 107 sends notification of "transmission failure" regarding the data frame stored in the focused entry in the buffer unit 109 to the data frame processing unit 110. The notification in step S1003 may be a process to activate a sleeping thread in the same manner as the notification in step S904, for example, In addition, in the same manner as the notification in step S904, the notification in step S1003 is accompanied by notification of the values of the GS and FID of the data frame. Specifically, the ACK processing unit 107 reads out the values of the GD and FID of the data frame stored in the focused entry, identifies the data frame from the read-out GS and FID, and sends notification of "transmission failure" of the identified data frame.

Meanwhile, in the case of transmission failure, the data frame processing unit 110 may attempt retransmission of the data frame while selecting an adjacent node apparatus that has not been tried as the LD yet as the new LD. Therefore, at the time of step S1003, the focused entry is not deleted from the buffer unit 109.

In step S1004, the ACK processing unit 107 sets the time $T_{timeout}$ in the expression (5) as the timeout time of the focused entry. Then, the process moves to step S1005.

In step S1005, the ACK processing unit 107 determines whether or not there remains any entry in the buffer unit 109 yet to be focused. If the ACK processing unit 107 has focused on all the entries, the process in FIG. 26 is terminated. On the other hand, if there remains any entry that the ACK processing unit 107 has not focused on, the process moves to step S1006.

In step S1006, the ACK processing unit 107 focuses on the next entry yet to be focused in the buffer unit 109. Then the process returns to step S1002.

Note that, the data frame reception process described with reference to FIG. 20-FIG. 23 is, as described above, an example for the case in which the node apparatus 100 does not become the GS. Hereinafter, with reference to FIG. 27 and FIG. 29, the process of the node apparatus that can become the GS.

FIG. 27 and FIG. 28 are flowchart of the transmission process in a case in which the node apparatus 100 transmits a data frame while being the GS. The process in FIG. 27 starts triggered by a request from the higher layer processing unit 111 to the data frame processing unit 110.

In step S1101, the data frame processing unit 110 obtains the value of the GD of the data frame and the payload, as a result of processing of a protocol of a higher layer in the higher layer processing unit 111. For example, the "protocol in a higher layer" may be the Ethernet protocol. In that case, the higher layer processing unit 111 outputs an Ethernet frame to the data frame processing unit 110 as the payload of the data frame defined in this embodiment. In addition, the higher layer processing unit 111 sends notification of the value set in as the GD of the data frame in this embodiment to the data frame processing unit 110.

Then, the data frame processing unit 110 generates a new data frame including the payload obtained from the higher layer processing unit 111, and sets the value obtained from the higher layer processing unit 111 as the GD of the generated data frame. For example, in FIG. 6, the data frame processing unit 110-$N_1$ of the node apparatus $N_1$ obtains $N_7$ as the value of the GD from the higher layer processing unit 111-$N_1$, and sets $N_7$ as the GD of the data frame.

In step S1102, the data frame processing unit 110 calculates the length of the payload obtained in step S1101, and sets in the length field of the data frame. For example, in FIG. 6, since the length of the payload is $P_a$ as illustrated in data frames 302 and 303 in FIG. 7, the data frame processing unit 110-$N_1$ of the node apparatus $N_1$ sets $P_a$ in the length field of the data frame.

In step S1103, the data frame processing unit 110 sets the own node ID as the GS and LS of the data frame. For example, in FIG. 6, the data frame processing unit 110-$N_1$ of the node apparatus $N_1$ sets $N_1$ as the GS and LS of the created data frame respectively.

In step S1104, the data frame processing unit 110 requests the FID generating unit 113 to generate a new FID. Then, the FID generating unit 113 generates a new FID and outputs it to the data frame processing unit 110, and the data frame processing unit 110 sets the new FID in the FID field of the data frame.

In step S1105, the data frame processing unit 110 sets a specified value D (see FIG. 7) indicating the "data frame" in the type field of the data frame. Note that, the order to execute steps S1102-S1105 above is random.

As described above, when the data frame to be transmitted is generated, the data frame processing unit 110 stores the data frame in the buffer unit 109 in step S1106. That is, the data frame processing unit 110 prepares an area of a new entry in the buffer unit 109, and stores the data frame in the prepared area. Meanwhile, as illustrated in FIG. 8, the buffer unit 109 has a timeout time field, but the timeout time is not set at this point of time.

In step S1107, the data frame processing unit 110 searches the weighting table 104 using the value of the GD specified by the higher layer processing unit 111 in step S1101.

In step S1108, the data frame processing unit 110 determines whether or not the weighting table corresponding to the value of the specified GD is hit as a result of the search in step S1107. When the weighting table corresponding to the value of the specified GD is hit, the process moves to step S1108a, and when the weighting table corresponding to the value of the specified GD does not exist, the process moves to step S1009.

In step S1108a, the data frame processing unit 110 performs the weighting table adjustment process in FIG. 24, to reduce the side effect of the aging process. Then, the process moves to step S1110.

In step S1109, the data frame processing unit 110 adds a new weighting table corresponding to the value of the GD specified in step S1101 to the weighting tables 104. Specifically, the data frame processing unit 110 performs similar processes to steps S813-S816 in step S1109.

That is, in step S1109, the data frame processing unit 110 adds a new weighting table corresponding to the value of the GD specified by the higher layer processing unit 111, and sets the value of the GD specified by the higher layer processing unit 111 as the GD in the new weighting table. Further, the data frame processing unit 110 creates the same number of new entries as adjacent nodes recorded in the adjacent node managing table 103 in the new weighting table. Then, the data frame processing unit 110 sets the node ID of each entry in the adjacent node managing table 103, the initial value and the current time in created each entry, respectively.

Hereinafter, for convenience of description, the weighting table corresponding to the value of the GD specified in step S1101 is referred to by a reference numeral "104-$i$". By so doing, the weighting table 104-$i$ is the table hit in the search in step S1107 or the table added in step S1109.

After it is determined that the weighting table 104-$i$ is hit in step S1108, or after the weighting table 104-$i$ is added in step S1109, the process moves to step S1110.

In step S1110, the data frame processing unit 110 obtains the value of the LD associated with the smallest weighting in the weighting table 104-$i$ corresponding to the value of the GD specified by the higher layer processing unit 111. Meanwhile, as illustrated in FIG. 11, there may be a case in which a plurality of entries have the same smallest weighting in the weighting table 104-$i$. In that case, the data frame processing unit 110 selects and obtains any one of the values of the plurality of LDs associated with the smallest value in step S1110. The data frame processing unit 110 stores the obtained value of the LD and the value of the corresponding weighting in a storage area such as the DRAM 204 for example.

The process moves to step S1111 in FIG. 28, and the data frame processing unit 110 determines whether or not either of conditions (L1) through (L3) below is satisfied.

(L1) The weighting corresponding to the value of the LD obtained in step S1110 is the maximum value of weighting (in this embodiment, specifically, 1.0).
(L2) Transmission to all the LD registered in the weighting table 104-$i$ failed.
(L3) There is an OLS specified by the higher layer processing unit 111, and transmission to all of the LDs recorded in the weighting table 104-$i$ other than the OLS failed.

If either the condition (L1) through (L3) is satisfied, there is no adjacent node apparatus that can be selected as the LD, and the process moves to step S1112.

On the other hand, if neither (L1) (L2) nor (L3) is satisfied, there still remains an adjacent node apparatus that can be selected as the LD. In other words, there exists at least one adjacent node apparatus that does not correspond to any of (G1)-(G3) described regarding step S818 in the data frame reception process. Here, the node ID of the adjacent node apparatus that can be selected as the LD is obtained in step S1110 (or step S1125 described later), Thus, when it is determined in step S1111 that neither (L1) (L2) nor (L3) is satisfied, the process moves to step S1114.

If either the condition (L1) through (L3) is satisfied, the data frame processing unit 110 discards the data frame in step S1112. That is, the data frame processing unit 110 deletes the entry created newly in step S1106 and stores the data frame from the buffer unit 109.

In step S1113, the data frame processing unit 110 sends notification of "transmission failure" to the higher layer processing unit 111. That is, the data frame processing unit 110 notifies the higher layer processing unit 111 of the fact that the data frame did not be transmitted to any adjacent node apparatus successfully. Then, the processes in FIG. 27-FIG. 28 are terminated.

On the other hand, in step S1111, when it is determined that neither (L1) (L2) nor (L3) is satisfied, a process to try forwarding of the data frame to an adjacent node apparatus identified by the value of the LD that has already been obtained is performed in step S1114-S1125.

In step S1114, the data frame processing unit 110 sets the value of the LD obtained in step S1110 or in step S1125 described later as the LD of the data frame stored in the buffer unit 109 in step S1106. Then, the data frame processing unit 110 requests the transmitting unit 102 to transmit the data frame for which the value of the LD is set. By so doing, the transmitting unit 102 transmits the data frame.

In step S1115, the data frame processing unit 110 sets the time $T_{timeout}$ in the expression (5) as the time out time of the entry in the buffer unit 109 in which the data frame is stored in the step S1106.

In step S1116, the data frame processing unit 110 searches the FID managing table 105 using the own node ID and the FID that the FID generating unit 113 generated in step S1104.

In step S1117, the data frame processing unit 110 determines whether or not any entry is hit in the search in the FID managing table 105 in step S1116. Meanwhile, when step S1117 is executed for the first time, it is determined that "no entry is hit", and when step S1117 is executed for the second time and beyond, it is determined that "corresponding entry is hit". When a corresponding entry is hit in the search in step S1116, the process moves to step S1118. On the other hand, when no entry is hit in the search in step S1116, the process moves to step S1119.

In step S1118, the data frame processing unit 110 updates the entry hit in the search in step S1116. Specifically, in the entry hit in the search in step S1116, the data frame processing unit 110 sets the value of the LD of the data frame transmitted in step S1114 in the LD field, and sets the current time in the last update time field. Then, the process moves to step S1121.

Meanwhile, in step S1119, the data frame processing unit 110 adds a new entry in the FID managing table 105. Then, in step S1120, the data frame processing unit 110 sets values in the new entry. Specifically, in the new entry, the data frame processing unit 110 copies the values of the data frame transmitted in step S1114 in each field of the FID, GS, and LD. In addition, in the new entry, the data frame processing unit 110 sets the current time in the last update time field. Furthermore, the data frame processing unit 110 sets a specified node ID in the OLS field when a node ID indicating the OLS is specified by the higher layer processing unit 111, otherwise copies the own node ID in the OLS field.

For example, the entry $E_1$ of the FID managing table 105-$N_1$ of the node apparatus $N_1$ illustrated in FIG. 12 is the one that the data frame processing unit 110-$N_1$ of the node apparatus $N_1$ generates according to the process above.

In step S1121, the data frame processing unit 110 waits for notification of success/failure of the transmission in step S1114. Details of step S1121 are similar to step S825 in FIG. 22. When the data frame processing unit 110 receives notification of "transmission success" or "transmission failure" from the ACK processing unit 107 in step S1121, the process moves to step S1122.

In step S1122, the data frame processing unit 110 determines whether or not the transmission in step S1114 is successful. If the transmission is successful, the process moves to step S1123, and if the transmission fails, the process moves to step S1124.

When the transmission is successful, the data frame processing unit 110 reduces the weighting corresponding to the combination of the GD and LD of the data frame transmitted in step S1114 in the weighting table 104 in step S1123. That is, the data frame processing unit 110 updates the weighing corresponding to the LD of the transmitted data frame using the expression (6) for example, in the weighting table 104-$i$ corresponding to the value of the GD specified by the higher layer processing unit 111. The data frame processing unit 110 further sets the current time as the last update time in the entry whose weighting has been updated. Then, the processes in FIG. 27-FIG. 28 are terminated.

On the other hand, when the transmission fails, in step S1124, the data frame processing unit 110 increases the weighting corresponding to the combination of the GD and LD of the data frame transmitted in step S1114 in the weighting table 104. That is, the data frame processing unit 110 updates the weighting corresponding to the LD of the transmitted data frame using the expression (7) for example, in the weighting table 104-$i$ corresponding to the value of the GD specified by the higher layer processing unit 111.

Meanwhile, the data frame processing unit 110 may store, in step S1124, the value of the LD of the transmitted data frame as the "LD with which transmission failed" in a work area such as the DRAM 204 in FIG. 4 for example. In the same manner as in step S828 in FIG. 22, a data structure such as a linear list and array may be used for the storage of "LD with which transmission failed".

In addition, the data frame processing unit 110 further sets the current time as the last update time in the entry for which weighting was updated in the weighting table 104-$i$ in step S1124. Then, the process moves to step S1125.

In step S1125, the data frame processing unit 110 searches for another node apparatus that can be selected as the LD and have not been tried as the LD. Specifically, the data frame processing unit 110 obtains the value of the LD associated with the smallest weighting among the LDs other than LDs with which transmission failed, in the weighting table 104-*i* corresponding to the value of the GD specified by the higher layer apparatus 111. Here, LDs with which transmission failed are stored in a work area such as the DRAM 204 in FIG. 4 for example in the form of the linear list and array in step S1124.

That is, the data frame processing 110 obtains, in the weighting table 104-*i*, among the values of the LDs that were not obtained previously in step S1110 or S1125, the one associated with the smallest weighting. The data frame processing unit 110 stores the value of the obtained LD and the value of the corresponding weighting in a storage area such as the DRAM 204 in FIG. 4. Then, the process returns to step S1111.

Figure 29:
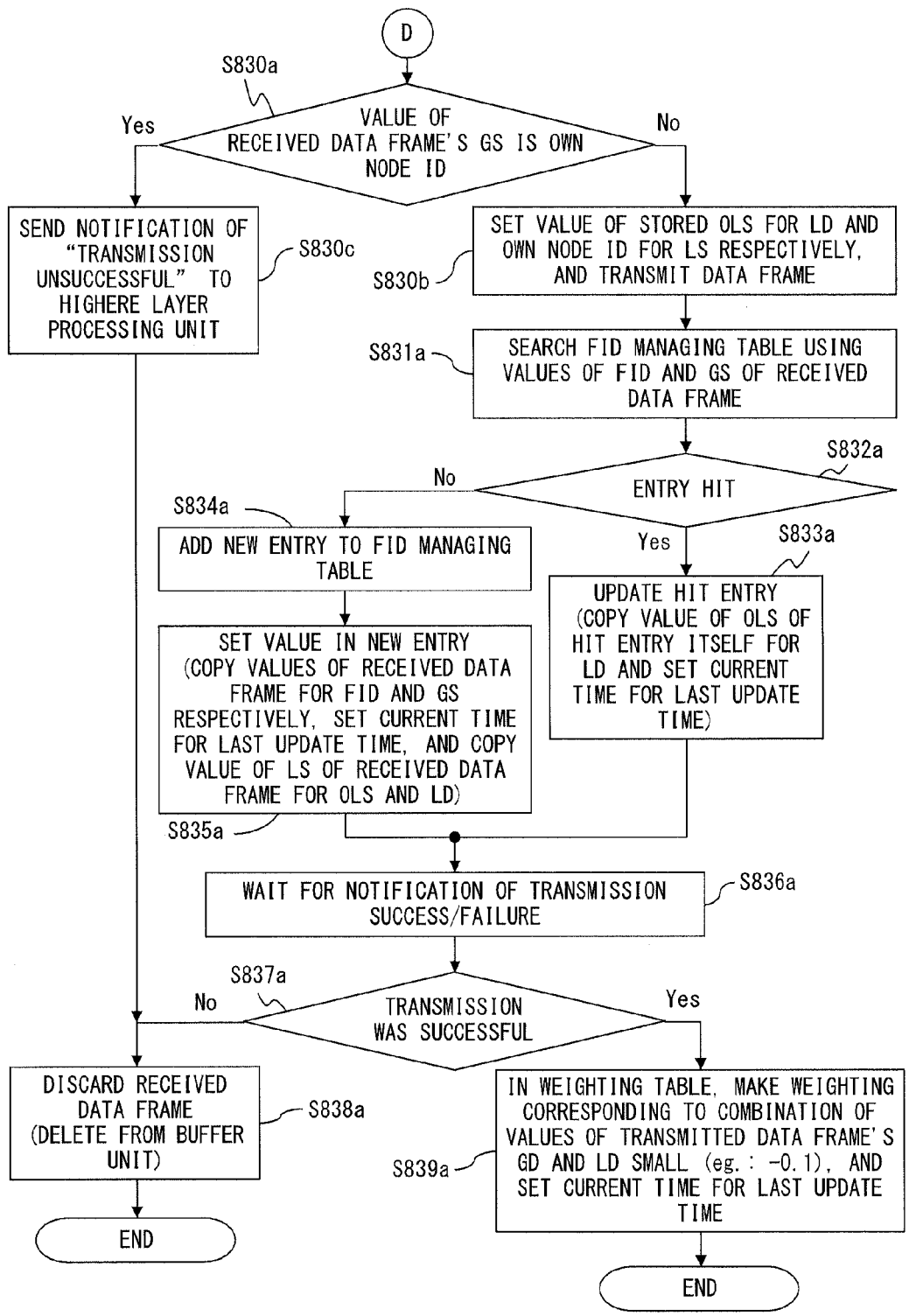
FIG. 29 is a flowchart of a process that the node apparatus that may become GS performs instead of the process in FIG. 23.

FIG. 29 is a flowchart of a process that the node apparatus 100 that can become the GS performs instead of the process in FIG. 23 as a part of the data frame reception process. When the node apparatus 100 can become the GS, steps S801-S829 in the data frame reception process are in the same manner as the case in which the node apparatus 100 is dedicated for relaying, which are as illustrated in FIG. 20-FIG. 22. However, in the case in which the node apparatus 100 can become the GS, when the data frame processing unit 110 determines in S818 in FIG. 22 that "either of the condition (F1) and (F2) is satisfied", the process moves to S830*a* in FIG. 29.

In step S830*a*, the data frame processing unit 110 determines whether or not the value of the GS of the received data frame is the own node ID. When the value of the GS of the received frame is different from the own node ID, the process moves to step S830*b*. When the value of the GS of the received frame is the own node ID, the process moves to step S830*c*.

In step S830*b*, the data frame processing unit 110 generates a new data frame as follows and outputs to the transmitting unit 102, and the transmitting unit 102 transmits the data frame. Specifically, the data frame processing unit 110 specifies the value of the OLS stored in step S808 or step S810 as the LD of the new data frame, and specifies the own node ID as the LS of the new data frame. In addition, the data frame processing unit 110 copies the value of each field of the GD, GS, FID, type and length and the payload from the received data frame to the new data frame. After the transmission of the data frame, the process moves to step S831*a*.

On the other hand, in step S830*c*, the data frame processing unit 110 sends notification of "transmission failure" to the higher layer processing unit 111. Upon sending notification, the data frame processing unit 110 may obtain the payload or a part of the payload from the received data frame for example, and may fed to the payload or a part of the payload to the higher layer processing unit 111. By so doing, the higher layer processing unit 111 can recognize transmission of which data failed, based on the contents of the payload received from the data frame processing unit 110. After the notification of the transmission failure, the process moves to step S838*a*.

In step S831*a*, the data frame processing unit 110 searches the FID managing table 105 using the values of the FID and GS of the received data frame. Note that, steps S831*a*-S839*a* are similar to steps S831-S839 in FIG. 23, respectively.

In step S832*a*, the data frame processing unit 110 determines whether or not a corresponding entry is hit as a result of the search in S831*a*. When a corresponding entry is hit, the process moves to step S833*a*, and when no entry is hit, the process moves to S834*a*.

Meanwhile, in a case in which it is determined as "an entry is hit" in step S807, the entry found as a result of the search in step S831*a* is an entry that is found as a result of the search in step S806. Meanwhile, in a case in which it is determined as "no entry is hit" in step S807 and a new entry is created in step S823, the new entry created in step S823 is found as a result of the search in step S831*a*.

When both of (M1) and (M2) are satisfied, it is determined as "no entry is hit" in step S832*a*.
(M1) It is determined in step S807 that "no entry is hit".
(M2) Immediately after step S818 was executed for the first time, the process moved to step S830*a*.

In step S833*a*, the data frame processing unit 110 updates the entry that is hit as a result of the search in step S831*a*. Specifically, in the hit entry, the data processing unit 110 copies the value of the OLS of the entry to the LD, and sets the current time as the last update time. Then, the process moves to step S836*a*.

Meanwhile, in step S834*a*, the data frame processing unit 110 adds a new entry to the FID managing table 105. Then, in step S835*a*, the data frame processing unit 110 sets values in the entry added in step S834*a*. Specifically, in the new entry, the data frame processing unit 110 copies the values of the received data frame to the FID and GS respectively, sets the current time as the last update time, and copies the value of the LS of the received data frame to the OLS and LD. Then, the process moves to step S836*a*.

In step S836*a*, the data frame processing unit 110 waits for notification as to transmission success/failure of the data frame transmitted in step S830*b*. When the data frame processing unit 110 receives notification of "transmission success" or "transmission failure" from the ACK processing unit 107, the process moves to step S837*a*.

In step S837*a*, the data frame processing unit 110 determines whether or not the transmission of the data frame in step S830*b* is successful. When the transmission fails, the process moves to step S838*a*, and when the transmission is successful, the process moves to step S839*a*.

When either (N1) or (N2) is satisfied, step S838*a* is executed.

(N1) The data frame that the node apparatus 100 transmitted while being the GS is returned to the node apparatus 100 by backtracking, and all the adjacent node apparatuses of the node apparatus 100 are (N1-1) or (N1-2).
(N1-1) Associated with the weighting of the largest value.
(N1-2) When the data frame specified as the LD is transmitted, the transmission fails.
(N2) The GS of the received data frame is another node apparatus other than the node apparatus 100, and all the adjacent node apparatuses other than the OLS are (N2-1) or (N2-2), and transmission of the data frame to the OLS failed.
(N2-1) Associated with the weighting of the largest value.
(N2-2) When the data frame specified as the LD is transmitted, the transmission fails.

In this case, the data frame processing unit 110 discards the received data frame in step S838*a*. That is, the data frame processing unit 110 deletes the entry found in step S801 from the buffer unit 109. Then, the data frame reception process is terminated.

Meanwhile, the step S839*a* is performed when, regarding a data frame whose GS is another node apparatus other than the node apparatus 100, the transmission of the data frame from the node apparatus 100 to the OLS of the node apparatus 100 is successful. In step S839*a*, the data frame processing unit 110 reduces the weighting corresponding to the combination of the GD and LD of the data frame transmitted in step S830*b* in the weighting table 104. In other words, the data frame processing unit 110 updates the weighting corresponding to the LD (that is, the OLD stored in step S808 or S810) of the transmitted data frame in the weighing table 104-*i* corresponding to the GD of the received data frame.

For example, in the same manner as steps S829 and S839, the data frame processing unit 110 may update the weighting using the expression (6). The data frame processing unit 110 further sets the current time as the last update time in the entry for which weighting has been updated. Then, the data frame reception process is terminated.

FIG. 30 is a timing chart illustrating recognition of adjacent apparatuses by transmission/reception of the HELLO frame and path selection in FIG. 6.

In the network 1 in FIG. 1, each node apparatus $N_1$-$N_7$ independently performs the HELLO frame transmission process in FIG. 16. While which node apparatus first transmits the HELLO frame is random, in the example in FIG. 30, the node apparatus $N_2$ performs step S403 in FIG. 16 in step S1201 and transmits a HELLO frame first. Then, the HELLO frame is received respectively by the node apparatuses $N_1$, $N_3$ and $N_6$ adjacent to the node apparatus $N_2$. Then, each of the node apparatuses $N_1$, $N_3$ and $N_6$ calls and executes the HELLO frame reception process in FIG. 15 in step S203 in FIG. 14, and recognizes the node apparatus $N_2$ as an adjacent node apparatus.

In step S1202, the node apparatus $N_4$ executes step S403 in FIG. 16, and transmits a HELLO frame. Then, the HELLO frame is received respectively by the node apparatuses $N_3$, $N_5$ and $N_7$ adjacent to the node apparatus $N_4$. Each of the node apparatuses $N_3$, $N_5$ and $N_7$ calls and executes the HELLO frame reception process in FIG. 15 in step S203 in FIG. 14, and recognizes the node apparatus $N_4$ as an adjacent node apparatus.

In step S1203, the node apparatus $N_3$ executes step S403 in FIG. 16, and transmits a HELLO frame 312 in FIG. 7. Then, the HELLO frame 312 is received respectively by the node apparatuses $N_2$, $N_4$ and $N_5$ adjacent to the node apparatus $N_3$. Each of the node apparatuses $N_2$, $N_4$ and $N_5$ calls and executes the HELLO frame reception process in FIG. 15 in step S203 in FIG. 14, and recognizes the node apparatus $N_3$ as an adjacent node apparatus.

In step S1204, the node apparatus $N_7$ executes step S403 in FIG. 16, and transmits a HELLO frame. It is assumed that at the time of step S1204, any failure has not occurred yet in the link between the node apparatuses $N_4$ and $N_7$. Therefore, the HELLO frame is received respectively by the node apparatuses $N_4$ and $N_5$ adjacent to the node apparatus $N_7$. Each of the node apparatuses $N_4$ and $N_6$ calls and executes the HELLO frame reception process in FIG. 15 in step S203 in FIG. 14, and recognizes the node apparatus $N_7$ as an adjacent node apparatus.

In step S1205, the node apparatus $N_1$ executes step S403 in FIG. 16, and transmits a HELLO frame. Then, the HELLO frame is received respectively by the node apparatus $N_2$ adjacent to the node apparatus $N_1$. The node apparatus $N_2$ calls and executes the HELLO frame reception process in FIG. 15 in step S203 in FIG. 14, and recognizes the node apparatus $N_1$ as an adjacent node apparatus.

In step S1206, the node apparatus $N_6$ executes step S403 in FIG. 16, and transmits a HELLO frame. Then, the HELLO frame is received respectively by the node apparatuses $N_2$ and $N_7$ adjacent to the node apparatus $N_6$. Each of the node apparatuses $N_2$ and $N_7$ calls and executes the HELLO frame reception process in FIG. 15 in step S203 in FIG. 14, and recognizes the node apparatus $N_6$ as an adjacent node apparatus.

In step S1207, the node apparatus $N_5$ executes step S403 in FIG. 16, and transmits a HELLO frame. Then, the HELLO frame is received respectively by the node apparatuses $N_3$ and $N_4$ adjacent to the node apparatus $N_5$. Each of the node apparatuses $N_3$ and $N_4$ calls and executes the HELLO frame reception process in FIG. 15 in step S203 in FIG. 14, and recognizes the node apparatus $N_5$ as an adjacent node apparatus.

By steps S1201-S1207, the node apparatuses $N_1$-$N_7$ illustrated in FIG. 1 and FIG. 6 respectively recognize adjacent node apparatuses, and update the adjacent node managing tables 103-$N_1$ trough 103-$N_7$. In addition, as illustrated in FIG. 15, the node apparatuses $N_1$-$N_7$ may update, in some cases, the weighting tables 104-$N_1$ through 104-$N_7$ triggered by the reception of the HELLO frame.

After that, a failure occurs in the link between the node apparatuses $N_4$ and $N_7$ in step S1208. In addition, regardless of the occurrence of the failure, the node apparatus $N_1$ transmits a data frame that specifies the node apparatus $N_7$ as the GD while specifying the node apparatus $N_2$ as the LD, in step S101. That is, in step S101, the node apparatus $N_1$ performs processes in FIGS. 27-28.

Then, the node apparatus $N_2$ calls and executes processes in FIGS. 20-23 from step S205 in FIG. 14. The node apparatus $N_2$ transmitting the ACK frame in step S803 in FIG. 20 is expressed as step S101*a* in FIG. 30.

Meanwhile, the node apparatus $N_1$ is waiting for reception of the ACK frame in step S1121 in FIG. 28. Then, upon receiving the ACK frame transmitted in step S101*a*, the node apparatus $N_1$ calls and executes the process in FIG. 25 from step S206 in FIG. 14, and as a result, the waiting in step S1121 is terminated, and the process in FIG. 28 is terminated with execution of step S1122 and S1123.

The node apparatus $N_2$ that transmitted the ACK frame in step S803 in FIG. 20 as illustrated in step S1101*a* continues the processes after step S804, and in step S819 in FIG. 22, transmits the data frame specifying the node apparatus $N_3$ as the LD. The transmission in step S819 corresponds to step S102 in FIG. 30. FIG. 7 illustrates the data frame 303 transmitted in step S102.

The node apparatus $N_3$ that receives the data frame calls and executes the processes in FIGS. 20-23 from step S205 in FIG. 14. The node apparatus $N_3$ transmitting the ACK frame in step S803 in FIG. 20 is presented as step S102*a* in FIG. 30. FIG. 7 illustrates the ACK frame 322 transmitted in step S102.

The node apparatus $N_2$ waits for reception of the ACK frame in step S825 in FIG. 22. Upon receiving the ACK frame transmitted in step S102*a*, the node apparatus $N_2$ calls and executes the process in FIG. 25 from step S206 in FIG. 14, and as a result, the waiting in step S825 is terminated, and the process in FIG. 22 is terminated with execution of step S826 and S827.

The node apparatus $N_3$ that transmitted the ACK frame in step S803 in FIG. 20 as illustrated in step S102*a* continues the processes after step S804, and in step S819 in FIG. 22, transmits the data frame specifying the node apparatus $N_4$ as the LD. The transmission in step S819 corresponds to step S103 in FIG. 30. FIG. 7 illustrates the data frame 304 transmitted in step S103.

The node apparatus $N_4$ that receives the data frame calls and executes the processes in FIGS. 20-23 from step S205 in FIG. 14. The node apparatus $N_4$ transmitting the ACK frame in step S803 in FIG. 20 is presented as step S103*a* in FIG. 30.

The node apparatus $N_3$ waits for reception of the ACK frame in step S825 in FIG. 22. Upon receiving the ACK frame transmitted in step S103*a*, the node apparatus $N_3$ calls and executes the process in FIG. 25 from step S206 in FIG. 14, and as a result, the waiting in step S825 is terminated, and the process in FIG. 22 is terminated with execution of step S826 and S827.

The node apparatus $N_4$ that transmitted the ACK frame in step S803 in FIG. 20 as illustrated in step S103a continues the processes after step S804, and in step S819 in FIG. 22, transmits the data frame specifying the node apparatus $N_7$ as the LD. The transmission in step S819 corresponds to step S104 in FIG. 30.

However, a failure has occurred in the link between the node apparatuses $N_4$ and $N_7$ in step S1208, and the data frame does not reach the node apparatus $N_7$. For this reason, the arrow in step S104 in FIG. 30 becomes a broken line from the middle.

The node apparatus $N_4$ waits for reception of the ACK frame in step S825 in FIG. 22. However, since no ACK frame is received from the node apparatus $N_7$, the node apparatus $N_4$ recognizes that the transmission of the data frame to the node apparatus $N_7$ failed, in step S1003 of the process in FIG. 26 performed regularly.

As a result, the node apparatus $N_4$ terminates the waiting in step S825, and sequentially performs the processes in step S826, S828, S829, S818. Then, the node apparatus $N_4$ transmits the data frame specifying the node apparatus $N_5$ as the LD in following step S819. The transmission in step S819 corresponds to step S105 in FIG. 30.

The node apparatus $N_5$ that received the data frame calls and executes the processes in FIGS. 20-23 from step S205 in FIG. 14. The node apparatus $N_5$ transmitting the ACK frame in step S803 in FIG. 20 is presented as step S105a in FIG. 30.

The node apparatus $N_4$ waits for reception of the ACK frame in step S825 in FIG. 22. Upon receiving the ACK frame transmitted in step S105a, the node apparatus $N_4$ calls and executes the process in FIG. 25 from step S206 in FIG. 14, and as a result, the waiting in step S825 is terminated, and the process in FIG. 22 is terminated with execution of step S826 and S827.

The node apparatus $N_5$ that transmitted the ACK frame in step S803 in FIG. 20 as illustrated in step S105a continues the processes after step S804, and in step S819 in FIG. 22, transmits the data frame specifying the node apparatus $N_3$ as the LD. The transmission in step S819 corresponds to step S106 in FIG. 30.

The node apparatus $N_3$ that received the data frame calls and executes the processes in FIGS. 20-23 from step S205 in FIG. 14. The node apparatus $N_3$ transmitting the ACK frame in step S803 in FIG. 20 is presented as step S106a in FIG. 30.

The node apparatus $N_5$ waits for reception of the ACK frame in step S825 in FIG. 22. Upon receiving the ACK frame transmitted in step S106a, the node apparatus $N_5$ calls and executes the process in FIG. 25 from step S206 in FIG. 14, and as a result, the waiting in step S825 is terminated, and the process in FIG. 22 is terminated with execution of step S826 and S827.

The node apparatus $N_3$ that transmitted the ACK frame in step S803 in FIG. 20 as illustrated in step S106a continues the processes after step S804, and in step S819 in FIG. 22, transmits the data frame specifying the node apparatus $N_5$ as the LD. The transmission in step S819 corresponds to step S107 in FIG. 30.

The node apparatus $N_5$ that received the data frame calls and executes the processes in FIGS. 20-23 from step S205 in FIG. 14. The node apparatus $N_5$ transmitting the ACK frame in step S803 in FIG. 20 is presented as step S107a in FIG. 30.

The node apparatus $N_3$ waits for reception of the ACK frame in step S825 in FIG. 22. Upon receiving the ACK frame transmitted in step S107a, the node apparatus $N_3$ calls and executes the process in FIG. 25 from step S206 in FIG. 14, and as a result, the waiting in step S825 is terminated, and the process in FIG. 22 is terminated with execution of step S826 and S827.

The node apparatus $N_5$ that transmitted the ACK frame in step S803 in FIG. 20 as illustrated in step S107a continues the processes after step S804. Specifically, the process proceeds from step S818 in FIG. 22 to step S830 in FIG. 23, and in step S830, the node apparatus $N_5$ specifies the OLS of the data frame.

In this example, the OLS of the data frame for the node apparatus $N_5$ is the node apparatus $N_4$. Thus the node apparatus $N_5$ transmits the data frame specifying the node apparatus $N_4$ as the LD. The transmission in step S830 corresponds to step S108 in FIG. 30.

The node apparatus $N_4$ that received the data frame calls and executes the processes in FIGS. 20-23 from step S205 in FIG. 14. The node apparatus $N_4$ transmitting the ACK frame in step S803 in FIG. 20 is presented as step S108a in FIG. 30.

The node apparatus $N_5$ waits for reception of the ACK frame in step S836 in FIG. 23. Upon receiving the ACK frame transmitted in step S108a, the node apparatus $N_5$ calls and executes the process in FIG. 25 from step S206 in FIG. 14, and as a result, the waiting in step S836 is terminated, and the process in FIG. 23 is terminated with execution of step S837 and S839.

The node apparatus $N_4$ that transmitted the ACK frame in step S803 in FIG. 20 as illustrated in step S108a continues the processes after step S804. Specifically, the process proceeds from step S818 in FIG. 22 to step S830 in FIG. 23, and the node apparatus $N_4$ transmits the data frame in step S830 specifying the node apparatus $N_3$ which is the OLS as the LD. The transmission in step S830 corresponds to step S109 in FIG. 30.

The node apparatus $N_3$ that received the data frame calls and executes the processes in FIGS. 20-23 from step S205 in FIG. 14. The node apparatus $N_3$ transmitting the ACK frame in step S803 in FIG. 20 is presented as step S109a in FIG. 30.

The node apparatus $N_4$ waits for reception of the ACK frame in step S836 in FIG. 23. Upon receiving the ACK frame transmitted in step S109a, the node apparatus $N_4$ calls and executes the process in FIG. 25 from step S206 in FIG. 14, and as a result, the waiting in step S836 is terminated, and the process in FIG. 23 is terminated with execution of step S837 and S839.

The node apparatus $N_3$ that transmitted the ACK frame in step S803 in FIG. 20 as illustrated in step S109a continues the processes after step S804. Specifically, the process proceeds from step S818 in FIG. 22 to step S830 in FIG. 23, and the node apparatus $N_3$ transmits the data frame in step S830 specifying the node apparatus $N_2$ which is the OLS as the LD. The transmission in step S830 corresponds to step S110 in FIG. 30.

The node apparatus $N_2$ that received the data frame calls and executes the processes in FIGS. 20-23 from step S205 in FIG. 14. The node apparatus $N_2$ transmitting the ACK frame in step S803 in FIG. 20 is presented as step S110a in FIG. 30.

The node apparatus $N_3$ waits for reception of the ACK frame in step S836 in FIG. 23. Upon receiving the ACK frame transmitted in step S110a, the node apparatus $N_3$ calls and executes the process in FIG. 25 from step S206 in FIG. 14, and as a result, the waiting in step S836 is terminated, and the process in FIG. 23 is terminated with execution of step S837 and S839.

The node apparatus $N_2$ that transmitted the ACK frame in step S803 in FIG. 20 as illustrated in step S110a continues the processes after step S804 and transmits the data frame in step S819 in FIG. 22 specifying the node apparatus $N_6$ as the LD. The transmission in step S819 corresponds to step S111 in FIG. 30.

The node apparatus $N_6$ that received the data frame calls and executes the processes in FIGS. 20-23 from step S205 in FIG. 14. The node apparatus $N_6$ transmitting the ACK frame in step S803 in FIG. 20 is presented as step S111a in FIG. 30.

The node apparatus $N_2$ waits for reception of the ACK frame in step S825 in FIG. 22. Upon receiving the ACK frame transmitted in step S111a, the node apparatus $N_2$ calls and executes the process in FIG. 25 from step S206 in FIG. 14, and as a result, the waiting in step S825 is terminated, and the process in FIG. 22 is terminated with execution of step S826 and S827.

The node apparatus $N_6$ that transmitted the ACK frame in step S803 in FIG. 20 as illustrated in step S111a continues the processes after step S804 and transmits the data frame in step S819 in FIG. 22 specifying the node apparatus $N_7$ as the LD. The transmission in step S819 corresponds to step S112 in FIG. 31.

The node apparatus $N_7$ that received the data frame calls and executes the processes in FIGS. 20-23 from step S205 in FIG. 14. The node apparatus $N_7$ transmitting the ACK frame in step S803 in FIG. 20 is presented as step S112a in FIG. 30.

By the series of processes described above, in the network 1 as a whole, even if a failure occurs in step S1208, as a result of autonomously-distributed coordination of the node apparatuses $N_1$-$N_7$, the path <$N_1$, $N_2$, $N_6$, $N_7$> is selected dynamically and learned. That is, by the series of process described above, the weighting tables 104-$N_1$ through 104-$N_6$ are updated in the node apparatuses $N_1$-$N_6$.

Therefore, after step S112a, as a result of the learning, a data frame that specifies the node apparatus $N_7$ as the GD is forwarded with a good efficiency from the beginning, instead of being forwarded with backtracking in the network 1 like trial and error as in FIG. 6. Several specific examples are provided below.

(P1) When the node apparatus $N_1$, which is the GS of a data frame, transmits the data frame that specifies the node apparatus $N_7$ as the GD to the node apparatus $N_2$, the node apparatus $N_2$ selects the node apparatus $N_6$ as the LD from the beginning, based on the learned weighting table 104-$N_2$. Then, the data frame is transmitted from the node apparatus $N_6$ to the node apparatus $N_7$.

(P2) In the similar manner, when the node apparatus $N_2$, which is the GS of a data frame, transmits the data frame that specifies the node apparatus $N_7$ as the GD, the node apparatus $N_2$ selects the node apparatus $N_6$ as the LD from the beginning, based on the learned weighting table 104-$N_2$. Then, the data frame is transmitted from the node apparatus $N_6$ to the node apparatus $N_7$.

(P3) When the node apparatus $N_5$, which is the GS of a data frame, transmits the data frame that specifies the node apparatus $N_7$ as the GD, the node apparatus $N_5$ selects, not the node apparatus $N_3$ with which backtracking occurred, but the node apparatus $N_4$ first as the LD, based on the learned weighting table 104-$N_5$. After that, in the similar manner, the node apparatus $N_4$ selects the node apparatus $N_3$ as the LD, the node apparatus $N_3$ selects the node apparatus $N_2$ as the LD, the node apparatus $N_2$ selects the node apparatus $N_6$, and the node apparatus $N_6$ selects the node apparatus $N_7$ as the LD.

(P4) When the node apparatus $N_3$, which is the GS of a data frame, transmits the data frame that specifies the node apparatus $N_7$ as the GD, the node apparatus $N_3$ selects the node apparatus $N_2$ first as the LD, based on the learned weighting table 104-$N_3$. Therefore, the data frame is forwarded along the path <$N_3$, $N_2$, $N_6$, $N_7$> from the beginning with a good efficiency.

As described above, according to the embodiments, when the path is selected like trial and error and dynamically in the network 1 by backtracking as in FIG. 6, in each node that was passed through in the course of the backtracking, the appropriate path is learned in the form of weighting in the weighting table 104. Therefore, when a data frame with the same node apparatus $N_7$ being specified as the GD is transmitted after the learning, path selection is made more efficient according to the learning result as in the example of (P1)-(P4).

<Alternative Path Search>

In the network (ad-hoc network) described above, each node searches a path for transmitting a frame autonomously. Here, the node apparatus in the embodiment manages one or a plurality of path candidates for each GD (final destination) using the weighting table 104 illustrated in FIG. 10. Upon receiving a frame to be forwarded to the GD, the node apparatus forwards the frame using the first candidate path. At this time, when the first candidate path is disconnected, the node apparatus performs the forwarding process using the second candidate, the third candidate, . . . . Therefore, a high data arrival rate is realized.

However, in the wireless communication, the quality may deteriorate temporarily due to noise, fading and the like and the link may be disconnected. In addition, the link may be cut permanently when a new building is constructed on the communication path. For this reason, in order to manage the entire network, the network manager system collects the path information from all nodes regularly, and creates a topology map based on the position of each node and the path information. By so doing, the network manager system searches a path to a desired node by executing a ping command or a trace route command using the topology map.

However, the ping command and the trace route performs a path search assuming that each node apparatus respectively selects the first candidate path. That is, it is difficult to perform the path search in view of an alternative path in the procedure using these commands.

Figure 31C:
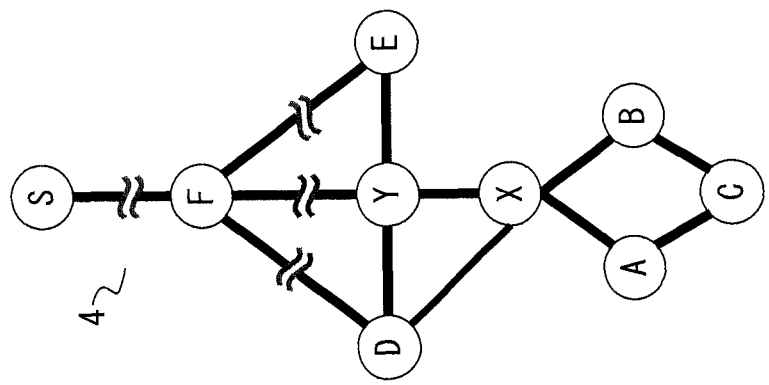
FIGS. 31A-31C are diagrams illustrating an alternative path.
Figure 31B:
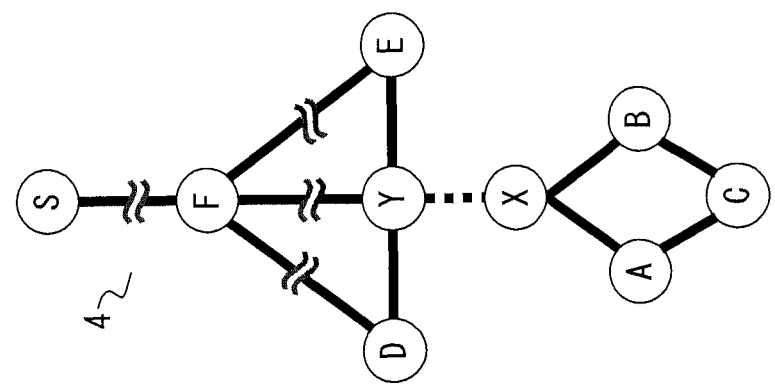
Figure 31A:
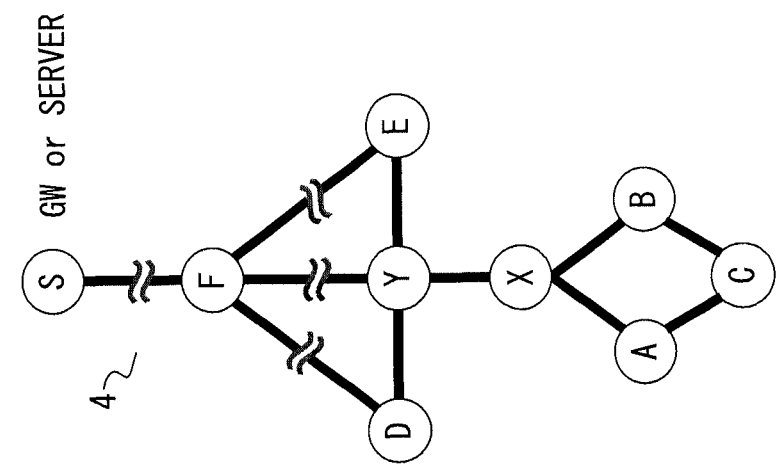

FIGS. 31A-31C are diagrams illustrating an alternative path using the fourth example of the network configuration. The network 4 illustrated in FIG. 31 is an example of an ad-hoc network to which the fourth embodiment may be applied, and includes a plurality of node apparatuses. Hereinafter, in the explanation from the viewpoint of the network topology, the "node apparatus" may be simply referred to as a "node". A node ID is assigned to each node apparatus in the network 4 in advance. In FIG. 31, nodes A-F, X, Y, S respectively has the function of the node apparatus explained with reference to FIG. 1-FIG. 30. However, node S is a server apparatus or a gateway apparatus that has a function to manage the network.

FIG. 31A illustrates a topology map generated by collecting path information from each node. In this example, node F is connected to node S. Nodes D, Y, E are respectively connected to the node F. One or more plurality of nodes may be provided between the nodes S and F, between the nodes F and Y, between the nodes F and E. Nodes D, E, X are respectively connected to the node Y. Nodes A and B are respectively connected to the node X. Node C is connected to the nodes A and B.

In the above topology map, for example, there are at least three paths between the nodes F and Y. For this reason, even if a trouble occurs in one of the three paths between the nodes F and Y, the communication may be continued using another path. On the other hand, between the nodes Y and X, there is only one path at least on the topology map. For this reason, when the link between the nodes Y and X is disconnected, the nodes A-C and X may not be able to communicate with other nodes and may be isolated.

However, the topology map is generated by collecting path information representing the path of the first candidate for each node. For this reason, the topology map does not necessarily represent all paths. That is, there is a possibility that an alternative path exists between the nodes D and X, as illustrated in FIG. 31C, while it does not exist on the topology map. In this case, the nodes A-C and X are still able to communicate with other nodes even if the link between the nodes Y and X is disconnected.

The network administrator is required to prevent occurrence of the isolated node illustrated in FIG. 31B. For this reason, the network administrator studies whether or not an alternative path exists for the path between the nodes Y and X in advance, and when there does not exist such an alternative path, implements a measure such as to add a new node.

Therefore, in the alternative path search according to the embodiment, whether or not an alternative path exists for a specified path is inspected. In this case, the network administrator extracts a path that has a risk of causing node isolation for example, and inputs an instruction to search the presence/absence of an alternative path for the path. By so doing, by the alternative path search method according to the embodiment, the presence/absence of an alternative path is determined.

Meanwhile, in a network with a very large number of nodes, it requires a long time to collect path information and to generate a topology map. For example, it is assumed that the number of nodes is 10 million and the time for obtaining path information from one node is 0.1 second. In this case, it requires about 12 days to collect path information from all nodes and to generate a topology map. Thus, the path status represented by the topology map may be different from the current path status. Especially in a wireless network, the possibility that the path status represented by the topology map is different from the current path status is high due to a change in the radio wave environment and the like. Accordingly, to search whether or not an alternative path exists for a specified path is important.

FIG. 32 is a diagram explaining the outline of a method for searching an alternative path in the network 4. Here, it is assumed that the network administrator inputs an instruction for searching an alternative path to the node apparatus S. In addition, it is assumed that a search is performed as to whether or not an alternative path exists for the path between the nodes Y and X (hereinafter, referred to as the path YX). In this case, the alternative path search method according to the embodiment is performed in the following procedure for example. In FIG. 32, the solid line connecting between nodes represents a path detected by collecting path information, and the broken line connecting between nodes (drawn between the nodes D and A in FIG. 32) represents a path that is not detected by collecting path information.

(1) The network administrator refers to the topology map and extracts a path that may cause node isolation. Hereinafter, the path that may cause node isolation may be referred to as the "search target path". In the example illustrated in FIG. 32, it is assumed that the path YX is extracted as the search target path. Then, the network administrator inputs an alternative path search instruction to specify a node that is located farther from the node apparatus S among the nodes at the both ends of the search target path, to the node apparatus S. In this example, the alternative path search instruction that specifies the node X is input. In the alternative path search instruction, the network administrator may specify a search target path (in this case, the path YX) instead of specifying a node. In this case, it is assumed that the node apparatus S is able to detect a node that is located farther from the node apparatus S, based on the position of the node Y and the node X.

(2) When the alternative path search instruction is input, the node apparatus S operates as a search request node apparatus. Hereinafter, the node apparatus S is referred to as the "search request node apparatus S". The search request node apparatus S transmits a frame for requesting an alternative path search to the node specified by the alternative path search instruction. In this case, a frame for requesting an alternative path search is transmitted to the node X. The frame for requesting an alternative path search is referred to as the "search request frame" in the following explanation. The search request frame is transmitted as one of data frames explained with reference to FIG. 7 for example.

(3) Upon receiving the search request frame, the node apparatus X operates as a search execution node. Hereinafter, the node apparatus X is referred to as the "search execution node apparatus X". The search execution node apparatus X detects the OLS (original transmission source adjacent node) of the search request frame. The OLS is, as described above, an Original Local Source. That is, when a node apparatus receives a frame from an adjacent node, the adjacent node that firstly transmitted the frame is the OLS for the node apparatus. Here, in the network according to the embodiment, the search request frame is transmitted from the search request node apparatus S to the search execution node apparatus X via one or more node. At this time, each node apparatus between the search request node apparatus S and the search execution node apparatus X selects the first candidate path. Therefore, in the example illustrated in FIG. 32, the OLS of the search request frame for the search execution node apparatus X is the node Y. Then, the search execution node apparatus X memorizes the OLS of the search request frame (that is, node Y).

(4) The search execution node apparatus X transmits a search frame specifying the search request node apparatus S that originally transmitted the search request frame in the network 4 as the final destination (that is, GD). The search frame is used to search an alternative path. At this time, the search execution node apparatus X transmits the search frame to an adjacent node other than the OLS of the search request frame, among adjacent nodes of the search execution node apparatus X. In the example illustrated in FIG. 32, adjacent nodes of the search execution node apparatus X are the nodes Y, A, B. Here, the node Y is the OLS of the search request frame for the search execution node apparatus X. Therefore, in this case, the search execution node apparatus X transmits the search frame specifying the search request node apparatus S as the final destination, to the node A and the node B. The search frame is transmitted as one of the data frames explained with reference to FIG. 7 for example.

(5a) The search request node apparatus S determines that an alternative path exists for the path YX, when the search request node apparatus S receives the search frame. That is, as described above, the search frame is transmitted from the search execution node apparatus X to the adjacent node other than the OLS of the search request frame. In the example illustrated in FIG. 32, the search frame is transmitted from the search execution node apparatus X to the nodes A, B without being transmitted to the node Y. Therefore, the search frame received by the search request node apparatus S should have transmitted through a path other than the path YX from the search execution node apparatus X. Accordingly, the search request node apparatus S is able to decide that an alternative path exists for the path YX, when the search request node apparatus S receives the search frame. In the example illustrated in FIG. 32, the search frame transmitted from the search execution node apparatus X reaches the search request node apparatus S via the node A and the node D. After that, the search request node apparatus S transmits a reception response frame corresponding to the search frame to the search execution node apparatus X.

(5b) The search request node apparatus S decides that no alternative path exist for the path YX, when the search request node apparatus S does not receive the search frame within a specified period of time. When it is decided that no alternative path exists, the network administrator may consider placing a relay node for realizing an alternative path.

(6a) The search execution node apparatus X decides that the transmission of the search frame to the search request node apparatus S was successful, when the search execution node apparatus X receives a reception response frame corresponding to the search frame from the search request node apparatus S. That is, the search execution node apparatus X decides that an alternative path to the search request node apparatus S exists.

(6b) The search execution node apparatus X decides that the transmission of the search frame to the search request node apparatus S was unsuccessful, when the search execution node apparatus X does not receive the reception response frame corresponding to the search frame within a specified period of time. In this case, the search execution node apparatus X decides that no alternative path to the search request node apparatus S exists.

Thus, in the alternative path search method according to the embodiment, the search request node apparatus S can search the presence/absence of an alternative path to the search execution node apparatus X, and the search execution node apparatus X can search the presence/absence of an alternative path to the search request node apparatus S. That is, in the former case, the node apparatus S performs the alternative path search with the node apparatus X being the search target node. In the latter case, the node apparatus X performs the alternative path search with the node apparatus S being the search target node. However, in the explanation of the embodiment, the node apparatus that generates and transmits the search request frame is referred to as the "search request node apparatus", and the node apparatus that generates and transmits the search frame according to the search request frame is referred to as the "search execution node apparatus" for convenience.

The operations of the search request node apparatus and the search execution node apparatus are realized by the higher layer processing unit 111 illustrated in FIG. 3, for example. The higher layer processing unit 111 includes a request frame transmitting unit 111a, a decision unit 111b, a response frame transmitting unit 111c, a detection unit 111d, a search frame transmitting unit 111e, and a decision unit 111f. The request frame transmitting unit 111a, the decision unit nib, the response frame transmitting unit 111c, the detection unit 111d, the search frame transmitting unit 111e, the decision unit 111f are realized by executing a software program, for example. However, a part or all of the request frame transmitting unit 111a, the decision unit 111b, the response frame transmitting unit 111c, the detection unit 111d, the search frame transmitting unit 111e, the decision unit 111f may also be realized by a hardware circuit.

When a node apparatus operates as the search request node apparatus (the node apparatus S in FIG. 32), the higher layer processing unit 111 includes the request frame transmitting unit 111a and the decision unit 111b. The request frame transmitting unit 111a transmits a search request frame specifying the search execution node apparatus (the node apparatus X in FIG. 32) as the final destination according to the input from the network administrator. The search request frame requests the search execution node apparatus to transmit a search frame to adjacent nodes other than an adjacent node that relayed the search request frame among adjacent nodes of the search execution node. The search frame specifies the search request node apparatus as the final destination. Therefore, upon receiving the search request frame, the search execution node apparatus transmits a search frame according to the request. Then, upon receiving the search frame transmitted from the search execution node apparatus, the decision unit 111b decides that there is an alternative path between the search request node apparatus and the search execution node apparatus.

When the node apparatus operates as the search request node apparatus, the higher layer processing unit 111 may also include the response frame transmitting unit 111c. In this case, the response frame transmitting unit 111c transmits a reception response frame to the search execution node apparatus, upon receiving the search frame.

Meanwhile, when a node apparatus operates as the search execution node apparatus (the node apparatus X in FIG. 32), the higher layer processing unit 111 includes the detection unit 111d, the search frame transmitting unit 111e, and the decision unit 111f. Upon receiving a first frame transmitted from a frame transmission source node apparatus (the node apparatus S in FIG. 32), the detection unit 111d detects a transmission source adjacent node that relayed the first frame. The search frame transmitting unit 111e transmits a second frame specifying the frame transmission source node apparatus as the final destination, to adjacent nodes other than the transmission source adjacent node detected by the detection unit 111d. Then, the decision unit 111f decides that there is no alternative path to the frame transmission source node apparatus, when the transmission of the second frame failed. Here, the first frame and the second frame correspond to the search request frame and the search frame, respectively. In addition, "transmission of the second frame failed" indicates that, in this example, the second frame does not reach the frame transmission source node apparatus. In this case, the success/failure of the transmission of the second frame is recognized based on the absence/presence of the response from the frame transmission source node apparatus, for example. Note that, when the decision unit 111f decides that "no alternative path exists to the frame transmission source node apparatus", the higher layer processing unit 111 may send a notification of the decision result to the frame transmission source node apparatus.

When a node apparatus operates as the search request node apparatus, the higher layer processing unit 111 does not have to include the detection unit 111d, the search frame transmitting unit 111e, and the decision unit 111f. In addition, when a node apparatus operates as the search execution node apparatus, the higher layer processing unit 111 does not have to include the request frame transmitting unit 111a, the decision unit 111b, and the response frame transmitting unit 111c. However, each node apparatus has a possibility to be specified as the search execution node apparatus. Therefore, it is preferable, while this is not a particular limitation, that the higher layer processing unit 111 of each node apparatus includes the detection unit 111d, the search frame transmitting unit 111e, and the decision unit 111f. Meanwhile, the search request node apparatus is realized by a node apparatus that operates as a server involved in the network management, for example. Therefore, the request frame transmitting unit 111a, the decision unit 111b, and the response frame transmitting unit 111c may be configured to be provided only in the server apparatus.

Figure 33:
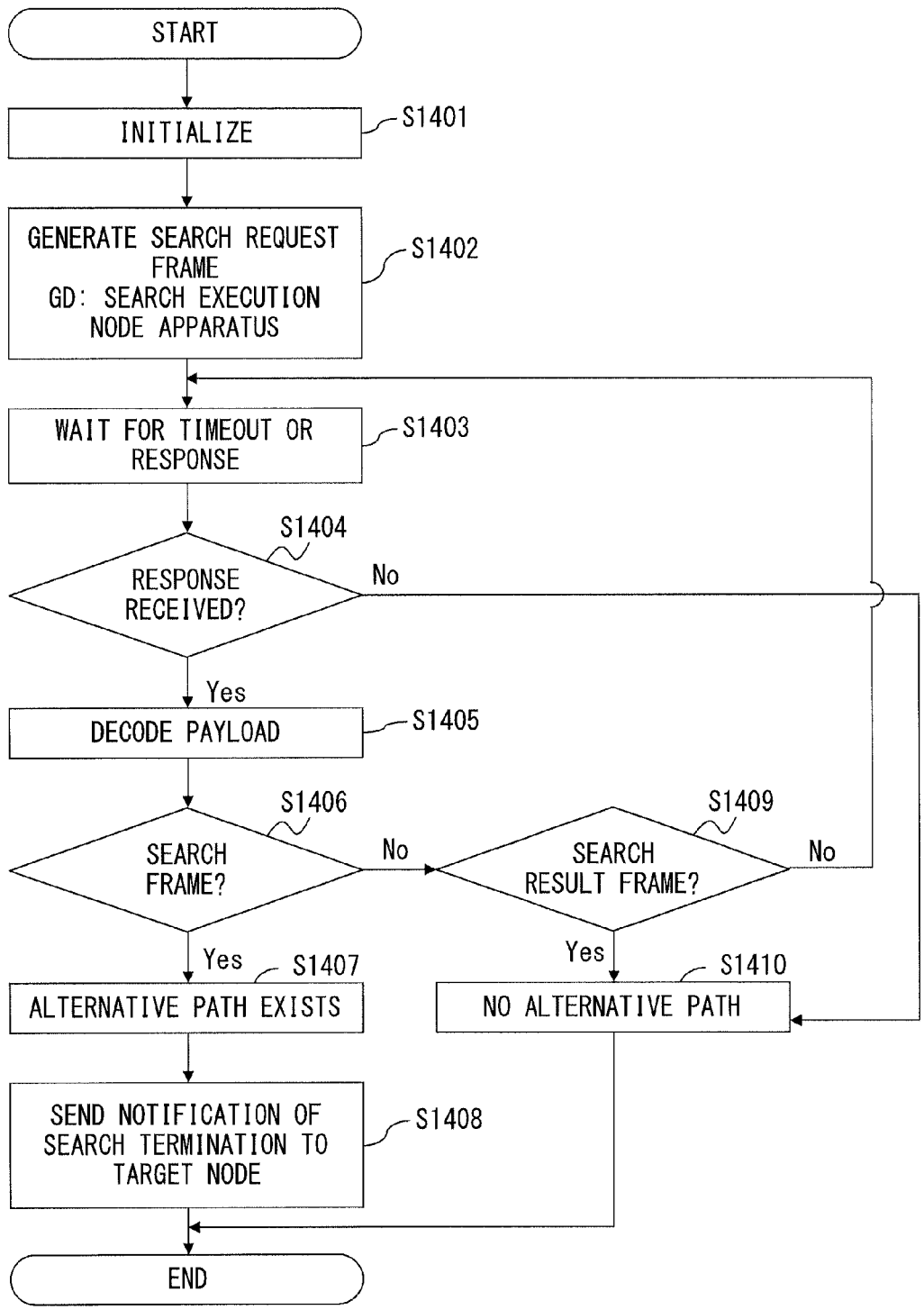
FIG. 33 is a flowchart illustrating the operation of a search request node apparatus.

FIG. 33 is a flowchart illustrating the operation of the search request node apparatus. The process is executed when an alternative path search instruction is input by the network administrator. I t is supposed that, in this example, the alternative path search instruction specifies the search execution node apparatus.

In step S1401, the higher layer processing unit 111 initializes various variables involved in the alternative path search. When the search request frame is transmitted repeatedly for a specified number of times until a response from the search execution node apparatus is obtained, the variable to count the number of transmission of the search request frame is initialized.

In step S1402, the request frame transmitting unit 111a generates data that represents the alternative path search request (search request (or inspection request)) for payload of the search request frame. In addition, the request frame transmitting unit 111a specifies the search execution node apparatus as the GD (that is, final destination). Then the request frame transmitting unit 111a instructs the data frame processing unit 110 to generate the search request frame.

Upon receiving the instruction from the request frame transmitting unit 111a, the data frame processing unit 110 performs procedures of the flowchart illustrated in FIG. 27, for example. In this example, the node F is selected as the LD in step S1110 in the flowchart of FIG. 27. By so doing, the following search request frame having the format illustrated in FIG. 7 is generated and transmitted.

LD: F
LS: S
GD: X
GS: S
FID: a unique value managed by the node apparatus S (for example, a sequence number)
Type: D (data)
Lengh: payload length
Payload: data representing the alternative path search (search request)

In the example, a frame is recognized as the search request frame when the character string "search request (or inspection request)" is included in the payload of the frame, however, an identification code including a specified value or a character corresponding to the request of the alternative path search may be used.

When the request frame transmitting unit 111a instructs the data frame processing unit 110 to generate the search request frame, the request frame transmitting unit 111a starts the counting of a timer that monitors the timeout of reception of the response (that is, a search frame) corresponding to the search request frame. Then, the request frame transmitting unit 111a stores the node ID of the search execution node apparatus and the timeout monitoring start time in the search history table 114.

Upon receiving a frame from an adjacent node, each node apparatus performs a forwarding process by selecting a path autonomously based on the header of the received frame, as explained with reference to FIG. 1-FIG. 30. Accordingly, the search request frame transmitted from the search request node apparatus is forwarded to the search execution node apparatus specified as GD. Then, upon receiving the search request frame, the search execution node apparatus transmits a search frame specifying the search request node apparatus as GD, while this is explained later with reference to FIG. 34. The search frame is one of data frames, and supposed to have the format illustrated in FIG. 7.

In step S1403, the decision unit 111b waits for occurrence of either of events:timeout of the timer, or reception of a data frame from the search execution node apparatus. The data frame from the search execution node apparatus represents, in this example, a search frame or a search result frame transmitted from the search execution node apparatus, in which the search execution node apparatus is specified as "GS" in the header of the received frame, and the search request node apparatus is specified as "GD" in the header of the received frame.

When the type of a received frame is "data", the data frame reception process in step S205 in the flowchart illustrated in FIG. 14 is performed. In the data frame reception process, as illustrated in FIG. 20, when GD indicates the local node ID (that is, the search request node apparatus), the received frame is fed to the higher layer processing unit 111 in step S805. By comparing GS specified in the header of the received frame with the node ID of the search execution node apparatus, the decision unit 111b detects the reception of the data frame from the search execution node apparatus. While the counting period of the timer depends on the size of the network, a sufficiently long period with respect to the time expected to be required for a frame to be delivered to a desired node (for example, about 30 seconds) is set. Then, when timeout of the timer or reception of the data frame from the search execution node apparatus is detected, the process shifts to step S1403.

In step S1404, the decision unit 111b decides whether or not the data frame from the search execution node apparatus is detected in step S1403. When the reception of the data frame is detected in S1403 by the decision unit 111b, the process shifts to step S1405. On the other hand, if timeout is detected in step S1403 by the decision unit 11b, the process shifts to step S1410.

In step S1405, the decision unit 111b of the higher layer processing unit 111 decodes the payload of the received frame.

In step S1406, the decision unit 111b decides whether or not the received frame is a search frame, according to whether the payload of the received frame includes data representing the alternative path search (search (or inspection)). When the payload decoded in step S1405 includes data representing the alternative path search (search (or inspection)), the decision unit 111b decides, in step S1406, that the received frame is a search frame, and the process shifts to step S1407.

In step S1407, the decision unit nib decides that an alternative path exists between the search request node apparatus and the search execution node apparatus. Then, the decision unit 111b outputs information representing the presence of an alternative path.

On the other hand, when the payload decoded in step S1405 does not include data representing the alternative path search (search (or inspection)), in step S1406, the decision unit 111 decides that the received frame is not a search frame, and the process shifts to step S1409.

Instep S1409, the decision unit 111b decides whether or not the received frame is a search result frame, according to whether or not the payload decoded in step S1405 includes data representing that no alternative path exists (dead end).

When the payload decoded instep S1405 includes data representing that no alternative path exists (dead end), instep S1409, the decision unit 111b decides that the received frame is the search result frame, and the process shifts to step S1410.

When the payload decoded in step S31405 does not include data representing that no alternative path exists (dead end), the decision unit 111b decides that the received frame is not the search result frame, and the process returns to step S1403.

In step S1410, the decision unit 111b decides that no alternative path exists between the search request node apparatus and the search execution node apparatus. Then, the decision unit 111*b* outputs information representing that no alternative path exists, and the process in FIG. 33 is terminated.

The decision result by the decision unit 111*b* is, for example, displayed on a display device of the search request node apparatus or a server computer connected to the search request node apparatus. Alternatively, the decision result by the decision unit 111*b* is stored in a storage device provided in the search request node apparatus or a server computer connected to the search request node apparatus. In addition, the decision result, the reason for the decision and the time of decision may be stored in the search history table 114 in association with the node ID of the search execution node apparatus. The node ID of the search execution node apparatus and the data stored in association with the node ID may be deleted from the search history table 114. According to this configuration, when a request to search an alternative path is made for a plurality of node apparatuses at one time, it becomes possible to select, from candidates of node IDs of the search execution node apparatuses stored in the search history table 114 that should be compared with GS of a received frame, node IDs for which the search result of the alternative path have not been obtained yet.

In step S1408, the response frame transmitting unit 111*c* generates data that represents the termination of the alternative path search (abort) for payload of the reception response frame. In addition, the response frame transmitting unit 111*c* specifies the search execution node apparatus as the GD (that is, final destination). Then the response frame transmitting unit 111*c* instructs the data frame processing unit 110 to generate the reception response frame.

Upon receiving the instruction from the response frame transmitting unit 111*c*, the data frame processing unit 110 performs procedures of the flowchart illustrated in FIG. 27, for example. In this example, the node F is selected as the LD in step S1110 in the flowchart of FIG. 27. By so doing, the following reception response frame having the format illustrated in FIG. 7 is generated and transmitted.
LD: F
LS: S
GD: X
GS: S
FID: a unique value managed by the node apparatus S (for example, a sequence number)
Type: D (data)
Length: payload length
Payload: data representing an alternative path search termination instruction (abort)

In the example, a frame is recognized as the reception response frame when the character string "abort" is included in the payload of the frame, however, an identification code including a specified value or a character corresponding to the termination of the alternative path search may be used.

As described, the search request node apparatus transmits a search request frame to the search execution node apparatus, and searches whether or not an alternative path exists between the search request node apparatus and the search execution node apparatus according to whether corresponding search frame is returned. Accordingly, the network administrator is able to easily know the presence/absence of an alternative path for the desired path (especially a path that has a risk of causing node isolation by disconnection of one link). Therefore, the isolation of a node may be prevented in advance.

Figure 34:
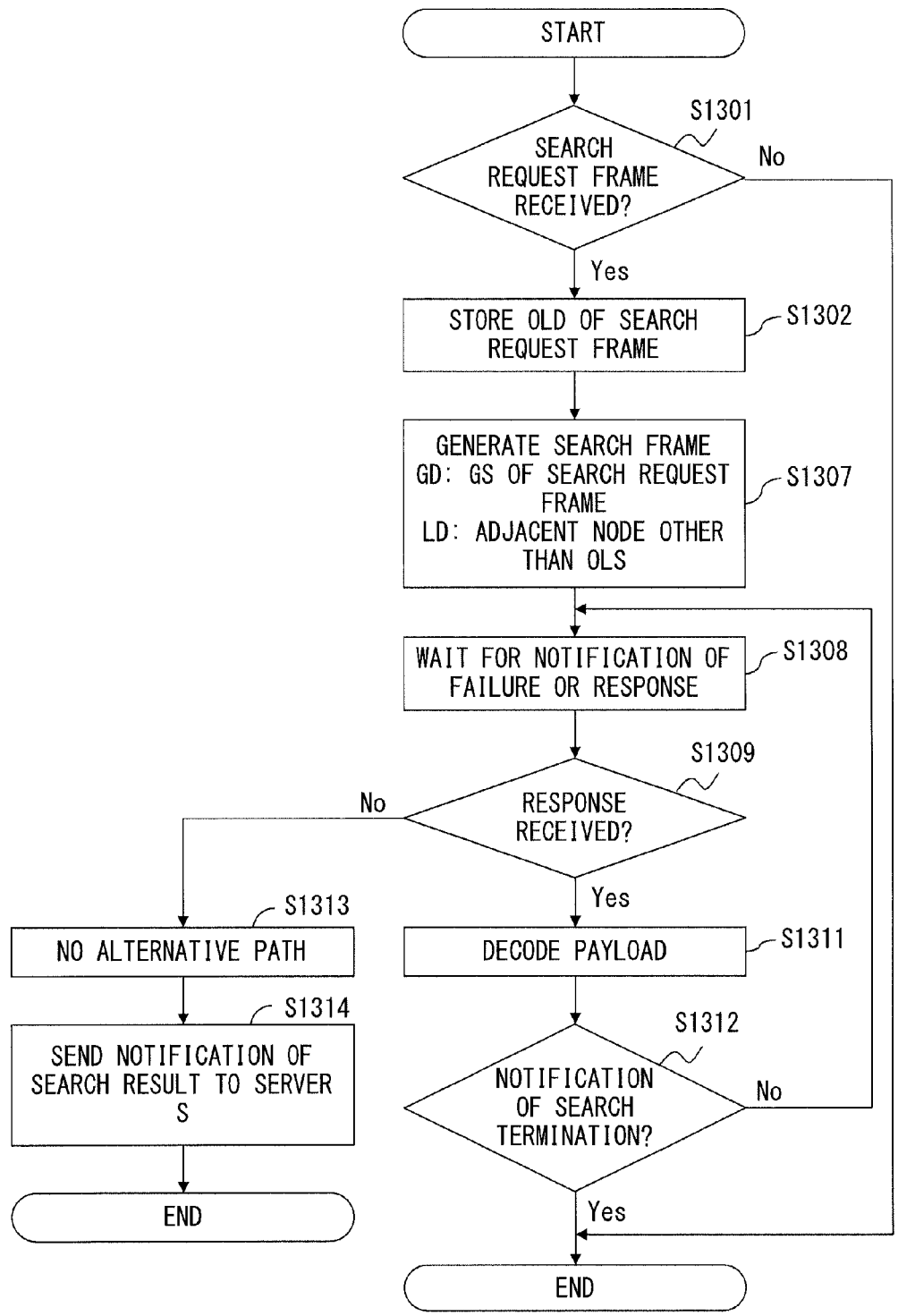
FIG. 34 is a flowchart illustrating the operation of the search execution node apparatus.

FIG. 34 is a flowchart illustrating the operation of the search execution node apparatus. The process is executed when a frame is received from an adjacent node, for example.

In step S1301, upon receiving a data frame, higher layer processing unit 111 decides whether or not the received frame is a search request frame. The search request frame is transmitted as a data frame in this example, as explained with reference to FIG. 33. Therefore, when the type of the received frame is "data", the data frame reception process in step S205 in the flowchart illustrated in FIG. 14 is performed. In the data frame reception process, as illustrated in FIG. 20, when GD of the received frame indicates the local node ID (that is, the search execution node apparatus), step S805 is performed, and the received frame is passed to the higher layer processing unit 111. Then, the higher layer processing unit 111 decodes the payload of the received frame, and checks whether the received frame is a search request frame, by checking whether or not the payload includes data representing an alternative path search request (search request (or inspection request)). When the received frame is a search request frame (S1301: Yes), the process shifts to step S1302. On the other hand, when the received frame is not a search request frame (S1301: No), the process in FIG. 34 is terminated.

In step S1302, the detection unit 111*d* detects the OLS (transmission source adjacent node) of the received search request frame. The OLS of the search request frame represents the adjacent node that transmitted the search request frame when the search request frame is first received. In addition, the transmission source adjacent node of the received frame is identified by "LS" specified in the header of the received frame. In the example illustrated in FIG. 32, the detection unit 111*d* of the search execution node apparatus X detects the node Y as the OLS of the search request frame. Then, the detection unit 111*d* stores GS (the node ID of the search request node apparatus) specified in the header of the search request frame and the detected OLS of the search request frame in the search history table 114.

In step S1307, the search frame transmitting unit 111*e* generates data representing the alternative path search (search (or inspection)) for the payload of the search frame. In addition, the search frame transmitting unit 111*e* specifies GD and LD of the search frame. The final destination (GD) of the search frame is the search request node apparatus identified by the GS set in the search request frame. The LD is selected among adjacent nodes other than the OLS of the search request frame saved in the search history table 114 in step S1302. Then the search frame transmitting unit 111*e* instructs the data frame processing unit 110 to generate the search frame.

Upon receiving the instruction from the search frame transmitting unit 111*e*, the data frame processing unit 110 performs procedures of the flowchart illustrated in FIG. 27, for example. However, LD of the search frame is selected among adjacent nodes of the search execution node apparatus other than the OLS. In this example, it is assumed that the node A is selected as the LD. By so doing, the following search frame having the format illustrated in FIG. 7 is generated and transmitted.
LD: A
LS: X
GD: S
GS: X
FID: a unique value managed by the node apparatus X (for example, a sequence number)
Type: D (data)
Length: payload length
Payload: data representing the alternative path search (search (inspection))

In the example, a frame is recognized as the search frame when the character string "search (or inspection)" is included in the payload of the frame, however, an identification code including a specified value or a character corresponding to the alternative path search may be used.

While details of the operation of the data frame processing unit 110 are omitted since they have been described already, when there is an alternative path bypassing a path (link) between the adjacent node of the search execution node apparatus that transmitted the search request frame to the search execution node apparatus and the search execution apparatus, the search frame is transmitted to the search request node apparatus via the alternative path. Then, when the search request node apparatus receives the search frame, "Yes" is obtained in step S1404 in FIG. 33. After that, by the search request node apparatus, in the process in steps S1407 and S1408 in FIG. 33, a reception response frame specifying the search request node apparatus as the transmission source (GS) and the search execution node apparatus as the final destination (GD) is transmitted. The reception response frame includes data representing the alternative path search termination instruction as described above.

In step S1308, the search frame transmitting unit 111e waits for the occurrence of either of events: reception of a data frame from the search request node apparatus, and notification of transmission failure of the search frame. The data frame from the search request node apparatus represents, in this example, a reception response frame specifying the search request node apparatus as GS and specifying the search execution node apparatus as GD. When the type of the received frame is "data", the data frame reception process in S205 in the flowchart illustrated in FIG. 14 is executed. In the data frame reception process, as illustrated in FIG. 20, when GD of the received frame is the local node ID (that is, the search execution node apparatus), by the process in step S805, the received frame is passed to the higher layer processing unit 111. By comparing GS of the received frame with the node ID of the search request node apparatus stored in the search history table 114, the decision unit 111f detects the reception of the data frame from the search request node apparatus.

The notification of transmission failure of the search frame corresponds to the notification of transmission failure in step S1113 in FIG. 28 or in step S830c in FIG. 29, when no alternative path exists. Then, reception of a data frame from the search request node apparatus or notification of transmission failure of a search frame is detected, the process shifts to step S1309.

In step S1309, the decision unit 111f checks whether the data frame from the search request node apparatus was detected. When the data frame from the search request node apparatus was detected, the process shifts to step S1311.

In step S1311, the decision unit 111f decodes the payload of the received frame. Then, in step S1312, the decision unit 111f checks whether or not the received frame is a reception response frame, according to whether or not the payload detected in step S1311 includes data representing the alternative path search termination instruction (abort).

When the payload decoded in step S1311 includes data representing the alternative path search termination instruction (abort), the decision unit 111f decides, in step 1312, that the received frame is a reception response frame (step S1312: Yes), and the process in FIG. 34 is terminated. The reception response frame is generated when the search frame reaches the search request node apparatus. That is, the reception response frame is generated when an alternative path bypassing a path (link) between the adjacent node of the search execution node apparatus that transmitted the search request frame to the search execution node apparatus and the search execution apparatus exists. Therefore, the decision unit 111f decides that an alternative path exists, when the decision unit 111f receives the reception response frame.

On the other hand, when notification of transmission failure of the search frame is detected in S1308, "No" is obtained in step S1309, and the process shifts to step S1313.

In step S1313, the decision unit 111f decides that an alternative path between the search execution node apparatus and the search request node apparatus does not exist. Then, the decision unit 111f outputs information representing the absence of the alternative path.

In step S1314, the decision unit 111f generates data representing the absence of the alternative path (dead end) for the payload of a search result frame. In addition, the decision unit 111f specifies the search request node apparatus as the final destination (GD) of the search frame. Then the decision unit 111f instructs the data frame processing unit 110 to generate the search result frame.

Then, according to the flowchart illustrated in FIG. 27, a search result frame is generated and transmitted. The search result frame is transmitted when the decision unit 111f decides that there is no alternative path, in this example. Therefore, in step S1110 in FIG. 27, the node identified by the OLS of the search request frame is obtained as the LD. For example, in the example illustrated in FIG. 32, the node Y is the OLS of the search request frame for the search execution node apparatus X. Thus, the node Y is obtained in step S1110 as the LD of the search result frame. The following search result frame having the format illustrated in FIG. 7 is generated and transmitted.

LD: Y
LS: X
GD: S
GS: X
FID: a unique value managed by the node apparatus X (for example, a sequence number)
Type: D (data)
Length: payload length
Payload: data representing that no alternative path exists (dead end)

In the example, a frame is recognized as the search result frame when the character string "dead end" is included in the payload of the frame, however, an identification code including a specified value or a character representing that there is no alternative path may be used.

The decision unit 111f may store the decision result, the reason for the decision and the time of decision in the search history table 114 in association with the node ID of the search request node apparatus. In addition, the decision unit 111f may delete data in association with the node ID from the search history table 114. According to such a configuration, when a request to search an alternative path is received from a plurality of node apparatuses at one time, it becomes possible to select, from candidates of node IDs of the search request node apparatuses stored in the search history table 114 that should be compared with GS of a received frame in step S1301, the node IDs for which the search result for an alternative path have not been obtained yet.

Then, upon receiving the search result frame from the search execution node apparatus, the search request node apparatus recognizes that there is no alternative path bypassing a path (link) between the adjacent node apparatus of the search execution node apparatus that transmitted the search request frame to the search execution node apparatus and the search execution apparatus between the search request node apparatus and the search execution node apparatus.

The operations of the node apparatuses other than the search request node apparatus and the search execution node apparatus are as descried with reference to FIG. 1-FIG. 30. Therefore, the node apparatuses are able to transfer the search request frame and the reception response frame transmitted from the search request node apparatus to the search execution node apparatus, by selecting path autonomously. In addition, the node apparatuses are able to transfer the search frame and the search result frame transmitted from the search execution node apparatus to the search request node apparatus, by selecting path autonomously.

In addition, in the example illustrated in FIG. 33-34, the search request node apparatus transmits the reception response frame to the search execution node, upon receiving a search frame. Then, the search execution node apparatus aborts the process to transmit the search frame upon receiving the reception response frame. However, the alternative path search method according to the embodiment is not limited to the procedure. That is, the search execution node apparatus may transmit the search frame to all the adjacent nodes (except the OLS of the search request frame), regardless of the reception response frame. In this case, whether or not an alternative path exists may be searched for all the adjacent nodes of the search execution node apparatus. In addition, the search request node apparatus does not have to transmit the reception response frame upon receiving the search frame. However, in this case, the search execution node apparatus is not able to recognize whether or not the search frame reached the search request node apparatus. That is, the search execution node apparatus the search execution node apparatus does not decide whether there is an alternative path.

In addition, while the search execution node apparatus transmits the search frame one by one sequentially to each adjacent node in the example described above, the alternative path search method according to the embodiment is not limited to this. That is, the search execution node apparatus may transmit the search frame to two or more adjacent nodes at the same time. The search execution node apparatus may transmit the search frame to all the adjacent nodes (except the OLS of the search request frame) at substantially the same time.

Furthermore, in the example described above, the alternative path search frame (search request frame, search frame, reception response frame, search result frame) is realized as a form of the data frame illustrated in FIG. 7. However, the alternative path search method according to the embodiment is not limited to this. That is, the alternative path search frame may be realized by a dedicated frame to which a different "type" from the data frame illustrate in FIG. 7 is assigned.

FIG. 35 is an example of an adjacent node managing table provided in the search execution node apparatus. The search execution node apparatus refers to the adjacent node managing table when the search execution node apparatus transmits the search frame and the search result frame.

FIG. 36 is a diagram illustrating the search procedure when an alternative path exists. Here, it is assumed that paths SF, FD, FY, FE, DY, EY, YX, XA, XB, AC, BC exist. In addition, while it is not represented in the topology map, it is assumed that communication is available between the node D and the node A. It is further assumed that the node apparatus S is the search request node apparatus, and the node apparatus X is the search execution node apparatus.

In this case, first, an alternative path search request (that is, search request frame) is transmitted from the search request node apparatus S to the search execution node apparatus X. At this time, the search execution node apparatus X detects the "node Y" as the OLS of the alternative path search request.

The search execution node apparatus X transmits a search frame specifying the search request node apparatus S as the final destination to an adjacent node other than the node Y. Here, the search execution node apparatus X transmits the search frame to the node A.

Upon detecting that the final destination of the search frame is not the node A but the node S, the node apparatus A performs a frame forwarding process. In this case, depending on the condition of the weighting table 104 of the node apparatus A, the node C may be selected as the forwarding destination, but here, in order to simplify the explanation, it is assumed that the node D is selected as the forwarding destination (that is, LD). Then, the node A forwards the search frame transmitted from the search execution node apparatus X to the node D.

The operations of the node apparatus D and other node apparatuses are substantially the same as that of the node apparatus A. therefore, the search frame transmitted from the search execution node apparatus X reaches the search request node apparatus S.

Upon receiving the search frame transmitted from the search execution node apparatus X, the search request node apparatus S decides that there is an alternative path that does not include the path YX, other than the path including the path YX, between the search request node apparatus S and the search execution node apparatus X. Furthermore, the search request node apparatus S transmits a search termination notification to the search execution node apparatus X using the reception response frame corresponding to the search frame.

The search execution node apparatus X receives the search termination notification corresponding to the search frame. Accordingly, the search execution node apparatus X is also able to recognize that there is an alternative path that does not include the path YX exists between the search request node apparatus S and the search execution node apparatus X. Then, the search execution node apparatus X terminates the alternative path search. That is, after that, the search frame is no longer transmitted.

Figure 37:
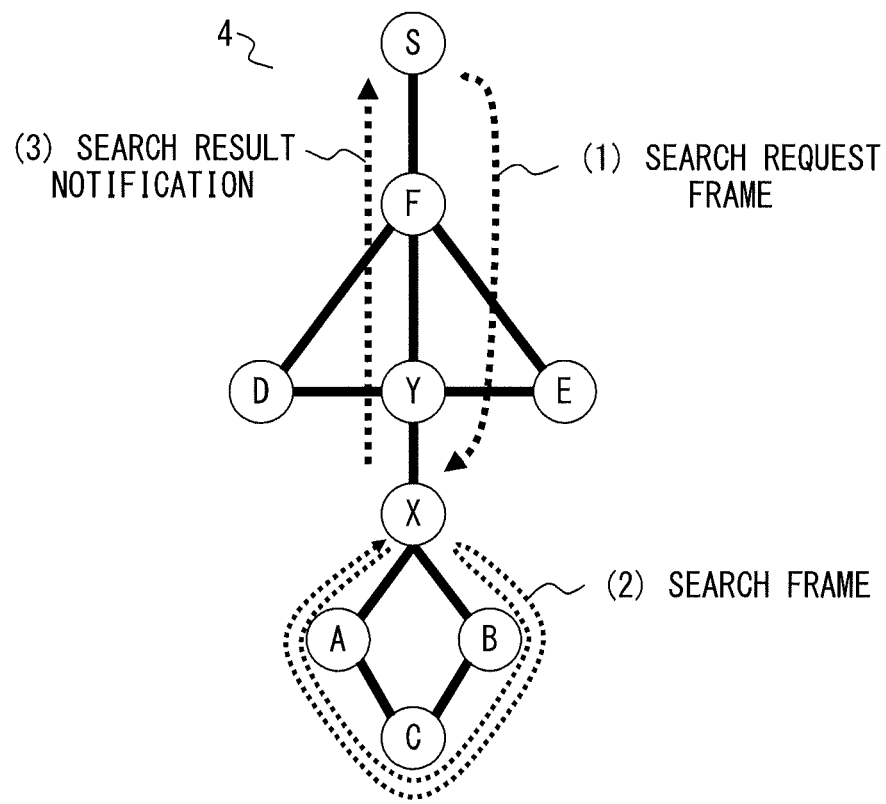
FIG. 37 is a diagram illustrating a search procedure in a case when an alternative path does not exist.

FIG. 37 is a diagram illustrating the search procedure when an alternative path does not exist. In this example, it is assumed that paths SF, FD, FY, FE, DY, EY, YX, XA, XB, AC, BC exist similar to the case illustrated in FIG. 36. However, in this example, it is assumed that no communication path exist between other nodes. That is to say, there is not a link between the node D and the node A. Then, in the same manner as in the procedure illustrated in FIG. 36, it is assumed that an alternative path search request (search request frame) is transmitted from the search request node apparatus S to the search execution node apparatus X, and the search execution node apparatus X transmits the search frame to an adjacent node other than the node Y.

The search execution node apparatus X refers to the adjacent node managing table 103 illustrated in FIG. 35, and selects an adjacent node to be a transmission destination of the search frame. In this example, nodes A, B, Y are recorded in the adjacent node managing table 103. However, the node Y is not selected as the transmission destination of the search frame since the node Y is the OLS of the search request frame. That is, the transmission destination of the search frame is nodes A, B. In this example, it is assumed that the search frame transmitting unit 111$d$ of the search execution node apparatus X selects the node A first. That is, the search frame is transmitted to the node A.

The node A performs the frame forwarding process, in the same manner as in the example illustrated in FIG. 36, upon detecting that the final destination of the search frame is not the node A but the node S. Here, it is assumed that the node apparatus A selects the node C as the forwarding destination. That is, the node A forwards the search frame transmitted from the search execution node apparatus X to the node C.

The operation of the node apparatus C and the node apparatus B are substantially the same as that of the node apparatus A. that is, the node apparatus C transfers the search frame to the node apparatus B, and the node apparatus B forwards the search frame to the search execution node apparatus X.

The search execution node apparatus X selects the forwarding destination of the search frame, upon receiving the search frame from the node apparatus B, by executing the processes in step S801 in FIG. 20 to step S817 in FIG. 21. During the processes, the weighting of the node A is changed to the maximum value in step S809. Here, nodes A, Y, B are adjacent to the search execution node apparatus X. Thus, the search execution node apparatus X selects the node B as the forwarding destination of the search frame, for the following reasons.

The node A is the LD when the search frame was first transmitted from the search execution node apparatus X, and is recorded in the FID managing table 105. Therefore, the search execution node apparatus X does not forward the search frame to the node A.

In addition, the node Y is the OLS of the search request frame transmitted from the search request node apparatus S, and is excluded from the transmission destination of the search frame. The procedure to exclude the OLS of the search request frame from the transmission destination of the search is realized, for example, by specifying the OLS in the higher layer processing unit 111 in step S1303 in FIG. 34, and obtaining LD that is different from the specified OLS in step S1110 in FIG. 27. Other than this embodiment, the higher layer processing unit 111 may temporarily set the weighting of the OLS of the search request frame in the weighting managing table 104 to the maximum value (=1.0) during the period in which the alternative path search is performed (the period in which the process in the flowchart in FIG. 34 is performed), for example. In this case, in the example illustrated in FIG. 37, in the entry "GD=node S" in the weighting managing table 104 provided in the search execution node apparatus X, the weighting corresponding to "LD=node Y" may be set to the maximum value. By so doing, the data frame processing unit 110 of the search execution node apparatus X does not select the node Y as the forwarding destination upon receiving a search frame from the node apparatus B.

The search frame is thus transmitted from the search execution node apparatus X to the node B. After that, the search frame goes through the node C and the node A, and returns to the search execution node apparatus X.

Upon receiving the search frame from the node apparatus A, the search execution node apparatus X searches the forwarding destination of the search frame by executing the processes from step S801 in FIG. 20 to step S817 in FIG. 22 again. During the processes, the weighting of the node B is changed to the maximum value in step S809. Therefore, no forwarding destination of the search frame remains other than the Y being the OLS of the search request frame in the adjacent node managing table 103. Thus, "Yes" is obtained in step S818 illustrated in FIG. 22. Here, since the search execution node apparatus X is the GS of the search frame, the flowchart in FIG. 29 is executed, and "Yes" is obtained in step S830a. As a result, by step S830c, notification of "transmission failure" is sent from the data frame processing unit 110 to the higher layer processing unit 111.

When notification of "transmission failure" is sent from the data frame processing unit 110 to the decision unit 111f of the search execution node apparatus X, "No" is obtained in step S1309 in FIG. 34. As a result, the decision unit 111f decides that there is no alternative path between the search execution node apparatus X and the search request node apparatus S in step S1313.

After that, the search execution node apparatus X sends notification of the search result to the search request node apparatus S. At this time, the search execution node apparatus X transmits a search result frame specifying the search request node apparatus S as the final destination to the node Y. Accordingly, the search request node apparatus S is able to recognize that there is no alternative path. The search request node apparatus S is also able to recognize that there is no alternative path, by failure to receive the search frame corresponding to the search request frame within a specified period of time.

In the example illustrated in FIG. 37, the decision that "transmission to the node A failed" is made when the search frame transmitted from the search execution node apparatus X to the node A sequentially goes through the nodes C, B and returns to the search execution node apparatus X. However, the search execution node apparatus X transmits the search frame to the node A, and also transmits the search frame to the node B to the forwarding procedure described above. Then, the search frame transmitted from the search execution node apparatus X to the node B sequentially goes through the nodes C, A and returns to the search execution node apparatus X. That is, the transmission to the node B also ended up as failure. Therefore, the search execution node apparatus X may decide that "transmission to both the node A and node B was failure", when a forwarding procedure illustrated in FIG. 37 is executed. In this case, the decision unit 111f of the search execution node apparatus X decides that there is no alternative path between the search execution node X and the search request node S, when a forwarding process illustrated in FIG. 37 is executed.

Thus, in the alternative path search method according to the embodiment, the target communication node specified by the network administrator executes the alternative path search according to the request from the monitoring server. According to this procedure, whether or not an alternative path exists between the monitoring server and the target communication node is searched. Therefore, the network administrator is able to determine the risk of isolation about a desired communication node. When a communication node with a high possibility of isolation is detected, the network administrator is able to prevent a communication failure in advance, by implementing a measure such as to add a communication node.

In addition, while in the explanation of this embodiment, by making the higher layer processing unit 111 execute the processes related to the alternative path search, the data frame processing unit 110 is able to focus on the forwarding process of the data frame without putting burden of the processes related to the alternative path search, various modifications are possible within the range that does not deviate from the gist of this embodiment. For example, the data frame processing unit 110 may execute a part or all of the processes related to the alternative path search.

In addition, while various frames related to the alternative path search is one of the data frames, the alternative path search method may prepare another "type" indicating the alternative path search. In this case, a frame related to the alternative path search is guided to the data frame processing unit 110 as the data frame in the type check of the frame in step S202 by the frame branching processing unit 106. By such a configuration, it becomes possible for the data frame processing unit 110 to refer to the frame type upon selecting a received frame that has not been processed yet from the buffer unit 109, and to distinguish the frame related to the alternative path search and the normal data frame and select/process either of them with priority. In addition, it becomes possible to identify the frame related to the alternative path search without decoding the payload at the decision unit 111*b* or the decision unit 111*f* of the higher processing unit 111.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A node apparatus used in a network including a plurality of node apparatuses, the node apparatus being one of the plurality of node apparatuses, the node apparatus comprising:
    a receiver configured to receive search request data from a first node apparatus adjacent to the node apparatus, a transmission source of the search request data being a second node apparatus, the first node apparatus being used in the network as one of the plurality of node apparatuses, the second node apparatus being used in the network as one of the plurality of node apparatuses;
    a first storage configured to store transmission feasibility information in association with a final destination of data, for each adjacent node apparatus of the node apparatus, the transmission feasibility information representing data transmission feasibility from the node apparatus to the final destination;
    a processor; and
    a transmitter; wherein
    the processor generates transmission data in which the second node apparatus is specified as a final destination,
    the processor selects one or more adjacent node apparatus for which the transmission feasibility information indicates that transmission is feasible from among the adjacent node apparatuses of the node apparatus other than the first node apparatus, based on the transmission feasibility information associated with the second node apparatus as the final destination,
    the transmitter transmits the transmission data to the selected one or more adjacent node apparatus of the node apparatus other than the first node apparatus, the adjacent node apparatus of the node apparatus being used in the network as one of the plurality of node apparatuses, without transmitting the transmission data to the first node apparatus,
    the processor decides that an alternative path that does not pass through the first node apparatus does not exist between the node apparatus and the second node apparatus, when the transmission data transmitted to all of the selected one or more adjacent node apparatus of the node apparatus other than the first node apparatus is returned to the node apparatus, or when the transmitter fails to transmit the transmission data to all of the selected one of more adjacent node apparatus of the node apparatus other than the first node apparatus,
    the processor refers to the transmission feasibility information associated with the second node apparatus as the final destination, and decides that the alternative path does not exist between the node apparatus and the second node apparatus, when the transmission feasibility information of all the adjacent node apparatuses, other than the first node apparatus, indicates the transmission to the second node apparatus is unfeasible,
    the transmitter terminates the transmission of the transmission data, when the node apparatus is specified as the final destination of received data received by the receiver and the received data includes reception response data representing that the second node apparatus received the transmission data.

2. The node apparatus according to claim 1, further comprising:
    a second storage configured to store data identification information to identify the transmission data and transmission destination adjacent node identification information to identify an adjacent node apparatus being a transmission destination of the transmission data, wherein
    the processor identifies, when the node apparatus receives the transmission data transmitted to adjacent node apparatuses other than the first node apparatus adjacent node identifying information corresponding to data identification information of the received transmission data, and updates, among the transmission feasibility information in the first storage for which the final destination is the second node apparatus, the transmission feasibility information of the identified adjacent node identification information to be transmission unfeasible state.

3. The node apparatus according to claim 1, wherein
    the processor generates the transmission data when the final destination specified in received data received by the receiver is the node apparatus.

4. The node apparatus according to claim 1, wherein
    the transmitter transmits notification data representing the alternative path does not exist between the node apparatus and the second node apparatus via the first node apparatus to the second node apparatus when the processor decides that the alternative path does not exist.

5. An alternative path search method used in a node apparatus in a network including a plurality of node apparatuses, the method comprising:
    receiving search request data from a first node apparatus adjacent to the node apparatus, a transmission source of the search request data being a second node apparatus, the first node apparatus being used in the network as one of the plurality of node apparatuses, the second node apparatus being used in the network as one of the plurality of node apparatuses;
    generating transmission data in which the second node apparatus is specified as a final destination;
    storing transmission feasibility information in a first storage in association with a final destination of data, for each adjacent node apparatus of the node apparatus, the transmission feasibility information representing data transmission feasibility from the node apparatus to the final destination;
    referring to the transmission feasibility information associated with the second node apparatus as the final destination;
    selecting one or more adjacent node apparatus for which the transmission feasibility information indicates that transmission is feasible from among the adjacent node apparatuses of the node apparatus other than the first node apparatus, based on the transmission feasibility information associated with the second node apparatus as the final destination;

transmitting the transmission data to the selected one or more adjacent node apparatus of the node apparatus other than the first node apparatus without transmitting the transmission data to the first node apparatus;

deciding that an alternative path that does not pass through the first node apparatus does not exist between the node apparatus and the second node apparatus, when the transmission data transmitting to all of the selected one or more adjacent node apparatus of the node apparatus, or when the transmitting fails to transmit the transmission data to all of the selected one or more adjacent node apparatus of the node apparatus other than the first node apparatus; and deciding that the alternative path does not exist between the node apparatus and the second node apparatus, when the transmission feasibility information of all the adjacent node apparatuses, other than the first node apparatus, indicates the transmission to the second node apparatus is unfeasible, wherein transmission of the transmission data is terminated when the node apparatus is specified as the final destination of received data and the received data includes reception response data representing that the second node apparatus received the transmission data.

6. The alternative path search method according to claim 5, further comprising:

storing data identification information to identify the transmission data and transmission destination adjacent node identification information to identify the adjacent node apparatus being a transmission destination of the transmission data in a second storage; and identifying adjacent node identifying information corresponding to data identification information of the received transmission data, when the node apparatus receives the transmission data transmitted to adjacent node apparatuses other than the first node apparatus; and updating, among the transmission feasibility information in the first storage for which the final destination is the second node apparatus, the transmission feasibility information of the identified adjacent node identification information to be transmission unfeasible state.

7. The alternative path search method according to claim 5, wherein the data generating generates the transmission data when a final destination specified in the received data is the node apparatus.

8. The alternative path search method according to claim 5, further comprising transmitting notification data representing the alternative path does not exist between the node apparatus and the second node apparatus via the first node apparatus to the second node apparatus when it is decided that the alternative path does not exist.

* * * * *